United States Patent [19]
Ferrel et al.

[11] Patent Number: 5,907,837
[45] Date of Patent: *May 25, 1999

[54] INFORMATION RETRIEVAL SYSTEM IN AN ON-LINE NETWORK INCLUDING SEPARATE CONTENT AND LAYOUT OF PUBLISHED TITLES

[75] Inventors: Patrick J. Ferrel, Seattle; Randy Kerr, Redmond; Krishna Nareddy, Bellevue; Krishna Uppala, Redmond, all of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/560,281

[22] Filed: Nov. 17, 1995

Related U.S. Application Data

[63] Continuation of application No. 08/503,343, Jul. 17, 1995.

[51] Int. Cl.[6] .................................................. G06F 17/30
[52] U.S. Cl. ........................ 707/3; 707/103; 707/104; 707/500; 707/517; 707/525; 707/522; 707/526
[58] Field of Search ...................................... 395/600, 614, 395/615, 610; 707/522, 104, 103, 3, 500, 517, 525, 526; 358/403

[56] References Cited

U.S. PATENT DOCUMENTS

| | | | |
|---|---|---|---|
| 3,670,310 | 6/1972 | Bharwani et al. | 340/172.5 |
| 4,255,796 | 3/1981 | Gabbe et al. | 364/900 |
| 4,642,762 | 2/1987 | Fisanick | 364/300 |
| 4,754,326 | 6/1988 | Kram et al. | 364/900 |
| 4,775,956 | 10/1988 | Kaji et al. | 364/900 |
| 4,845,659 | 7/1989 | Gifford | 395/563 |
| 4,939,689 | 7/1990 | Davis et al. | 364/900 |
| 5,197,005 | 3/1993 | Shwartz et al. | 364/419 |
| 5,251,316 | 10/1993 | Anick et al. | 395/600 |
| 5,491,818 | 2/1996 | Malatesta et al. | 395/600 |
| 5,491,820 | 2/1996 | Belove et al. | 395/600 |
| 5,493,728 | 2/1996 | Solton et al. | 395/250 |
| 5,513,126 | 4/1996 | Harkins et al. | 364/514 A |
| 5,546,577 | 8/1996 | Marlin et al. | 395/600 |

FOREIGN PATENT DOCUMENTS

| | | |
|---|---|---|
| 0 622 743 A2 | 11/1994 | European Pat. Off. . |
| 0 749 081 A1 | 12/1996 | European Pat. Off. . |

OTHER PUBLICATIONS

European Search Report dated Oct. 13, 1998, corresponding to EPO Application No. 96118399.3–2201.

(List continued on next page.)

*Primary Examiner*—Paul V. Kulik
*Assistant Examiner*—Jean M. Corrielus
*Attorney, Agent, or Firm*—Banner & Witcoff, Ltd.

[57] ABSTRACT

A information retrieval system wherein design and content are separated. Within a section of a title, a designer can layout pages with controls that define areas for content to be inserted into the pages. Two commonly used controls in the system are a static story control, wherein a preselected story is statically placed on a page in the area defined by the control, and a dynamic story control, wherein the designer defines search objects to retrieve stories. An information retrieval (IR) server indexes and searches stories in titles. Indexing takes place when a title is released to the network by a publisher workstation. The IR server interrelates title, section and story objects by their globally unique identifiers and creates a routing table which is used to locate objects across multiple database partitions. The IR search service is requested in two different ways at customer runtime. The first way is the resolution of the search objects to retrieve matching stories. The retrieved stories are concatenated and poured into the area defined by the dynamic control when the title is viewed. In the second way, the IR search service is requested when a search is initiated by a customer using a "find" dialog to search across all stories in one or more titles, both dynamic and static.

65 Claims, 24 Drawing Sheets

OTHER PUBLICATIONS

"Structured Documents" edited by J. André, R. Furuta & V. Quint, *Cambridge series on electronic publishing; 2,* First published 1989.

Williams, J.H. "An automatic Indexing On–Line Text Retrieval System" U.S. Government/NTIS, Jan. 1969.

Cove, J.F.; Walsh, B.C.; "ONline text retrieval via browsing" Information Processing & Management, Jan. 1988.

Macleod, I.A.; "A query Language for retrieving information from hirachic text structures" IEE/INSPEC, Jan. 1991.

Andre et al. "Structured Documents", Cambridge University Press, Jan. 1989.

C Thanos, "Multimedia Office Filing" Elsevier Science Publishing Company Inc, Jan. 1990.

Paul Nora "The Times they are a changin'"::The Los Angeles Times on the Web)(World Wide Web) Searcher, V4, n6 p38(10), Jun. 1996.

David K, Gifford "Polychannel systems for mass digital communication" Communications of the ACM, v33, n2, p71–83, Feb. 1992.

Hermann et al. "Retrieval of Document Images Using Layout Knowledge" IEE/IN SPEC pp. 537–540, Jul. 1993.

Salton, G "Information Storage and Retrieval" U.S. Government/NTIS, Jan. 1969.

Lee, Lydia, "Alert New Media news & products—Search Engines: Keys to the Web Kingdom," New Media, Aug. 1995, p. 22.

Rupley, Sebastian, "Trends: Trends & Technology Shaping the Personal Computer Market—Taming the Text Tiger," PC Magazine, Jun. 13, 1995, p. 29.

Rupley, Sebastian, "Trends: Folio's On–Line Business Library," PC Magazine, May 16, 1995, p. 32.

Weiss, Aaron, "Hop, Skip, and Jump: Navigating the World–Wide Web," Internet World, Apr. 1995, pp. 41–44.

December, John, "New Spiders Roam the Web," Computer–Mediated Communication Magazine, vol. 1, No. 5, Sep. 1, 1994, 3 pages.

Routing Search Objects to Databases

IR INDEXING

RESOLVING SEARCH OBJECTS

INFORMATION RETRIEVAL SYSTEM IN AN ON-LINE NETWORK INCLUDING SEPARATE CONTENT AND LAYOUT OF PUBLISHED TITLES

This application is a continuation of application Ser. No. 08/503,340 filed on Jul. 17, 1995.

BACKGROUND OF THE INVENTION

1. Field of the Invention

The present invention relates to information retrieval systems and more particularly, to a system and method for indexing, querying and retrieving information in an on-line network.

2. Description of the Related Technology

Microsoft Network, Internet, Compuserve, Prodigy, and America Online are examples of on-line networks. End users typically access these networks using a microcomputer equipped with a modem. During an on-line session, a user can use a variety of information-related services and communications services, including news services, weather services, bulletin board services, E-mail, and the like.

While on-line services are becoming increasingly popular, today's on-line applications are still in their infancy. In fact, significant problems continue to block independent content providers or publishers from deploying the type of sophisticated and compelling services that are necessary to provide a sustainable on-line business. At the same time, providers of existing on-line services are working to find the right technical business model and usability solutions that will promote acceptance beyond just an early-adopter audience.

In any large city, it is impossible for a single individual to keep up with the activities and events unfolding in the community. Consequently, people turn to writers, reporters, editors, critics, and others, for help in understanding and structuring the information available. In a related trend, broadcast media are increasingly unable to satisfy the needs of a diverse populace. Consequently, in most markets, narrowcast media (media that have tailored and distributed their content to smaller, well defined audiences) have become increasingly popular and profitable. In the on-line community this trend will be correspondingly more important.

One problem content providers encounter when creating applications for the mass market is the diverse audience. For example, some customers will be interested in games, some in business, some in computer technology, and some in movies. What information should content providers deliver to keep their customers satisfied? What is needed is a system that enables a content provider to create applications that blend the content provider's editorial voice with individual customization. For example, from within a particular application, a customer could indicate an interest in the computer business and/or classical music, and be able to acquire additional information focused on these areas. Similarly, an on-line publication might automatically synthesize and prioritize content based on different consumer preferences.

Current publication systems include software for electronically publishing stories across on-line networks such as CompuServe, America On-Line, or the Internet. Most of these systems create and display stories that are formatted in a Standard Generalized Markup Language (SGML) or Hypertext Markup Language (HTML). Both the HTML and SGML are standards for tagging text in documents to be displayed in an on-line network. Documents that are formatted in HTML or SGML can be viewed by several widely distributed browsers such as Mosaic and Netscape for the Internet. These browser programs read SGML and HTML tagged documents and display them with proper formatting. However, the formatting information is stored with the browser and is not distributed by the publisher.

Computer users look for information in disk-based computer systems and in on-line environments. In a personal computer environment, most personal computer users are used to a browsing model of navigating through content. On a personal computer the hard disks have been fairly large, but they have been of a manageable size until now. Users assembled the content on their disk themselves, so it is a finite structure that users are fairly comfortable searching through. The hard drive content has known context because of the way things are located side-by-side; it gives good organization to the material and it also permits casual searching. Users don't have to have a specific goal in mind but can browse and find things in a serendipitous manner. But the problem with this is that it doesn't scale well for large amounts of information.

With going on-line, just the sheer volume of content makes it unreasonable to browse in this way. Therefore, what is needed is a searching strategy that enables people to specify more of a criteria or a specification to some facility or agency that will actually go off and do the matching for them. When the search results or hits are received by the user, there will be a reasonable size of results that a user can actually browse. Some of the problems with this approach are that these results are often brought out of context, the user does not have any idea about the adjacent material, and it requires the user to be very goal directed.

Some on-line systems, such as Microsoft Network (MSN), Prodigy, Compuserve and America Online have a type of a department structure. In this structure there is a top level categorization of business and finance or certain special interests, which provides one editorial view of slicing content as a way to organize information for people to search. The problem with this approach is, of course, that everyone's conception of where a certain topic resides may differ. For example, one person may look in one area for things on scuba diving and someone else may look under a totally different categorization. Because people conceive of topics stored in different places, there is often a mismatch in finding things when one browses according to someone else's classification or categorization.

Another on-line system is the Internet World Wide Web (WWW). The WWW provides a rich medium by virtue of how links are constructed between related information. By utilizing links and citations, many different editors can propagate different ways of looking at content. So the WWW is not one structure but many structures. A user will often identify with a certain directory service that matches the way they conceive of information which makes it easier to browse. The problem is, just because of the sheer size of the Web, it cannot be browsed exhaustively. A user is always left with a sense there's something else out in the Web. A user doesn't have a very good sense of completion in actually searching.

Some of the techniques to actually search the Internet are crawler-based full-text indices. This type of indexer actually goes around traversing the different Internet sites, building up an index as it travels, so that on some basis of updating, people can search and see what new content appears on the Web. But here again, users are often left with the sense of not knowing how complete a search is. Different indices may have access to some sites that others may not. There is no real clear way of finding all the desired content. WAIS provides an Internet server that indexes and retrieves text strings over multiple databases. This server is based on the evolving 239.50 search protocol used with WAIS and Gopher sites.

An example of a WWW crawler-based indexer is the Web Crawler. Another WWW indexing engine is known as Lycos. The Lycos engine makes a weighted random choice of which links to follow in a document, biased towards documents with multiple links pointing at them (implying popularity) and links with shorter path names (URLs), on the theory that short path names tend to imply shallower Web links and, therefore, more breadth. Lycos tries to make a summary of a document to preserve its content while alleviating the inefficiency of cataloging it in its entirety. The Lycos search language does not support Boolean queries (AND, OR, and so forth) or adjacency searches.

Another WWW indexer under development is the Harvest project. Harvest provides a means of gathering and distributing indexing information; supports the construction of different types of indexes for each information collection; and provides caching and replication support.

Another problem of the current indexers is that it takes a lot of time to try to traverse the servers on the Web. When new content is added to a server that has just been accessed by a current indexer, it may be a long time period before the indexer returns to index the server again. Alternately, content may be removed from a server, but the indexer has no way to know this event until the server is revisited. These indexers are also vulnerable to "robot exclusion" that prevent a Web server from being indexed. A "No Robots" standard is applied to some Web servers, which prevents any of the content on the server from being included in the index. What is desired is an indexing and search component of an information retrieval service that is always up-to-date and can index all the content on the system or on-line service.

Getting content to an on-line service will not be a major problem, but once all this content swells to an enormous size, the problem is going to be the user's ability to wade through all of the content to find the specific things they want. The on-line industry needs the ability of content providers to tag their information and target their customers to make this connection from both sides to make the content delivery a success. So to depict this problem with the traditional on-line services, an administrator may go with the approach of providing a new service that will be put on-line and will locate it in a couple of spots. The problem that frequently occurs is that a user may think the service resides somewhere else and therefore, a connection is not made. What is needed therefore is a way of full-text based searching across an entire on-line service. This searching should allow searches over text like the properties (e.g., for images, stories, sound clips) and titles of different available services, as well as searching within the titles, e.g., within an article or story. Thus, for example, a user would have the ability to search over services by a description of properties.

A publisher could define a search object to retrieve content matching desired criteria. The publisher could also specify where to search. Thus, a system and method for indexing structured titles and search objects would be an advance in the industry.

The above disadvantages are overcome by the present invention.

SUMMARY OF THE INVENTION

An information retrieval (IR) server indexes and searches stories and other content objects, such as images and sound clips, in titles in an on-line network. Indexing takes place when a title is released to the network by a publisher workstation. If a content object is deleted from the network server, the IR server is notified. Thus, the IR server has a current index of all the content on the network as soon as the content is published or deleted.

The IR server interrelates title, section and story objects by their globally unique identifiers and creates a routing table which is used to locate objects across multiple database partitions. A partition is source and date range specific. An IR search service is requested in two different ways by the title viewer at the customer workstation. First, a search is requested for each dynamic control or display region in a title. A dynamic control is associated with stories retrieved on the basis of a search query defined by the publisher. Second, a search can be initiated by a customer who uses a "Find" dialog to search across all stories in a title, both dynamic and static. The IR function is made possible by the decomposition of a title into content and design objects and it satisfies the need for fast and efficient search over a low-bandwidth communication path, e.g., 9600 baud.

One aspect of the present invention is a method of computerized searching, comprising the steps of: storing a plurality of content in a publication storage; publishing a title to the publication storage, wherein the title comprises separate content and layout, wherein the layout includes a search query associated with a control, and wherein the control defines a region for displaying results of the search query; retrieving content satisfying the query from the publication storage; and displaying the retrieved content in the control.

Another aspect of the present invention is a computerized information retrieval system, comprising: a publication storage, comprising: a content storage, an indexer for indexing the content, and a searcher for satisfying queries on the indexes; a designer providing a title with one or more search objects, wherein each search object defines a query; and a viewer accessing the title and causing the search objects to retrieve content to be displayed.

Yet another aspect of the present invention is, in a computer network, an indexing system of a title having a title layout and content, wherein said title layout includes search objects, each of said title layout, content and search objects having an associated object identifier, and said content having search properties, the system comprising: an index server receiving the title; a catalog database containing tables associating object identifiers with other information including search properties; an index service executing on the index server and accessing the catalog database; and a database server storing index associations between the search properties and object identifiers provided by the index service.

Still another aspect of the present invention is a computer-implemented method of searching a title, comprising the steps of: storing content in a publication storage; publishing a title comprising separate content and layout to the publication storage; and retrieving content from the publication storage satisfying a user query.

Another aspect of the present invention is a method of computerized searching, comprising the steps of: publishing a title to a publication storage containing content, wherein the title comprises separate content and layout, and wherein the layout includes a search query; retrieving content satisfying the search query from the publication storage; and displaying the retrieved content.

Still yet another aspect of the present invention is a computerized method of electronic publication, comprising the steps of: creating a title containing a search query; storing the title in a publication storage; displaying the title, wherein the search query retrieves content from the publication storage.

In a computer network, a search system, comprising: a search object server for storing the location of search objects in a title and search queries associated with the search objects; a search server for decomposing the search queries into a plurality of subqueries; and a database server for receiving subqueries from the search server and providing object identifiers responsive to each subquery.

Another aspect of the present invention is a computer-implemented method of searching a title using a search query, comprising the steps of: storing content in a publication storage; checking a search cache for the search query and results representative of content identification; retrieving the results of the search query from the search cache if the search query is present in the search cache; creating one or more subqueries based on the search query; checking the search cache for the presence of one of the subqueries and a result of the subquery if the search query is not present in the search cache; retrieving the results of the subquery from the search cache if the subquery is present in the search cache; applying the subquery to a database server; retrieving the results of the subquery from the database server if the subquery is not present in the search cache; and retrieving content from the publication storage corresponding to the retrieved results.

Yet another aspect of the present invention is, in a computer network, an information retrieval system, comprising: a publication storage, comprising: a story storage, an indexer for indexing the stored stories, and a searcher for satisfying queries on the indexes; a designer providing a title with one or more search objects, wherein each search object defines a query; and a viewer accessing the title and causing the search objects to retrieve stories to be displayed.

DETAILED DESCRIPTION OF THE PREFERRED EMBODIMENTS

Figure 1:
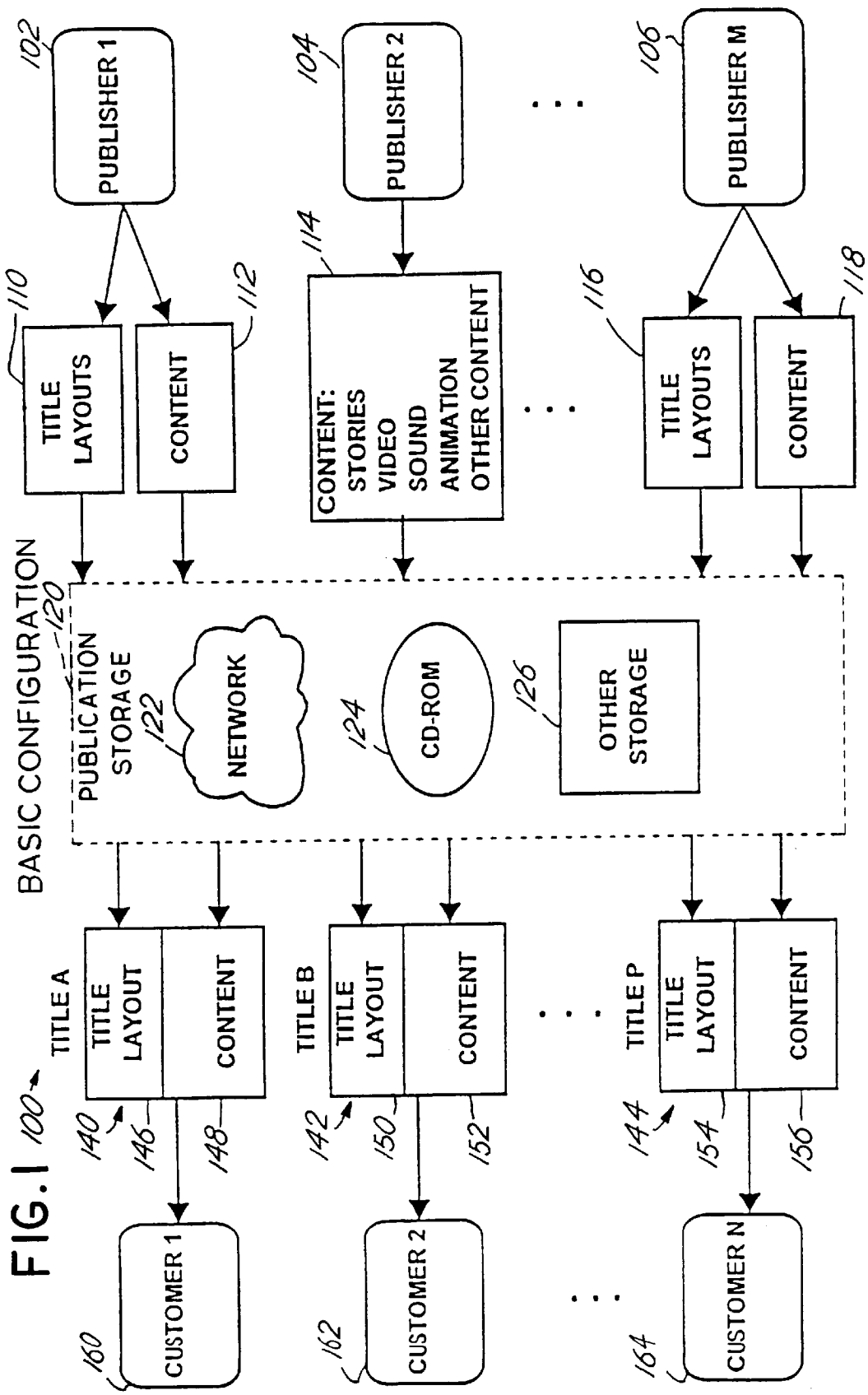
FIG. 1 is a block diagram of the basic system configuration of a multimedia publishing system (MPS), which is presently preferred underlying architecture for the present invention.

Reference is now made to the drawings wherein like numerals refer to like parts throughout. For convenience, the following description will be organized into the following principle sections: Acronyms, Advantages of the Information Retrieval System, Multimedia Publishing System Overview, Information Retrieval (IR) Overview, IR Indexing, Search Object Resolution, Customer Query Resolution and Conclusion.

I. ACRONYMS

The following list of acronyms is provided as a reference in reading the remaining sections.
BBS—Bulletin Board System.
MPML—Multimedia Publishing Markup Language
COS—Caching Object Store
DBM—Database Management System
DLL—Dynamic-link Library
GUID—Globally Unique Identifier
HTML—HyperText Markup Language
ICP—Independent Content Provider
IM—Information Magnet
IP—Information Provider
IR—Information Retrieval
LAN—Local Area Network
MP—Multimedia Publishing
MPC—Microsoft Network Procedure Call
MPS—Multimedia Publishing System
MFC—Microsoft Foundation Class
MSN—Microsoft Network
OCX—OLE Control
OLE—Object Linking and Embedding PDA—Personal Digital Assistant
SGML—Standard Generalized Markup Language
WAN—Wide Area Network
WWW—World-Wide Web

II. ADVANTAGES OF THE INFORMATION RETRIEVAL SYSTEM

The present invention can perhaps provide the most benefit by using an on-line network. Therefore, this and the following sections present background information on a preferred on-line publication system which is a foundation upon which the present invention can reside.

An important advantage of the MP system is the ability to dynamically find and display content at runtime. Using this technique a publisher can change a title on an ongoing basis by merely updating the content which has been placed into various folders or containers within the master title. When a page is displayed, it shows the updated content. This is dynamic title synthesis and allows content to be continually updated without any need to modify and update the title design consisting of the individual pages, controls and hand-placed content used to display the content. When publishers use dynamic synthesis, they create titles which contain placeholders that will be filled-in by the changing content. Dynamic synthesis is facilitated by the creation and resolution of search objects that find the desired content in the containers of the MP system. Search objects can be used to allow content providers or publishers to share content folders across multiple titles.

As an example of the use of search objects in constructing applications, consider the example of an on-line newspaper. The newspaper might consist of sections, including a Business Section. The newspaper designers, at design time, would place a search object within the Business Section of the newspaper. This search object would define the content folders from which to draw content. For example, the search object may be programmed (by setting its properties) to include within the Business section all stories in the Business content folder and all reports in the Stock Report content folder. A Find dialog allows customers, in essence, to personalize the business section, for instance by providing a query criteria that limits the scope of displayed business stories to a particular industry. Alternatively, the producer of the online publication might deliver targeted, customized versions of the publication to individual users by programmatically modifying the search object properties based on customer profiles or expressed interests.

The MP system further includes an indexing process to index properties and text of all content that is published. The Find dialog allows a customer to retrieve indexed content that matches a user search query. Other advantages and benefits of the MP system are discussed in detail below.

To provide more detail on the advantages of the MP system, the following section presents an overview of the Multimedia Publishing system.

III. MULTIMEDIA PUBLISHING SYSTEM OVERVIEW

This section presents an overview of the configuration and major components of the preferred Multimedia Publication System. Beginning with a description of the important concept of separating design (or title layout) and content, this section continues by discussing the major components and configuration of the MP system.

The objects utilized by the MP System include a project; title; content folder and, optionally, subfolder; section and, optionally, subsection; window; page; control; style sheet; and various content objects (such as stories, images, audio, so forth). These objects will be explained in more detail below in reference to FIG. 4. It is important to realize that these objects need to be stored in a non-volatile computer memory such as a hard disk drive.

Figure 2:
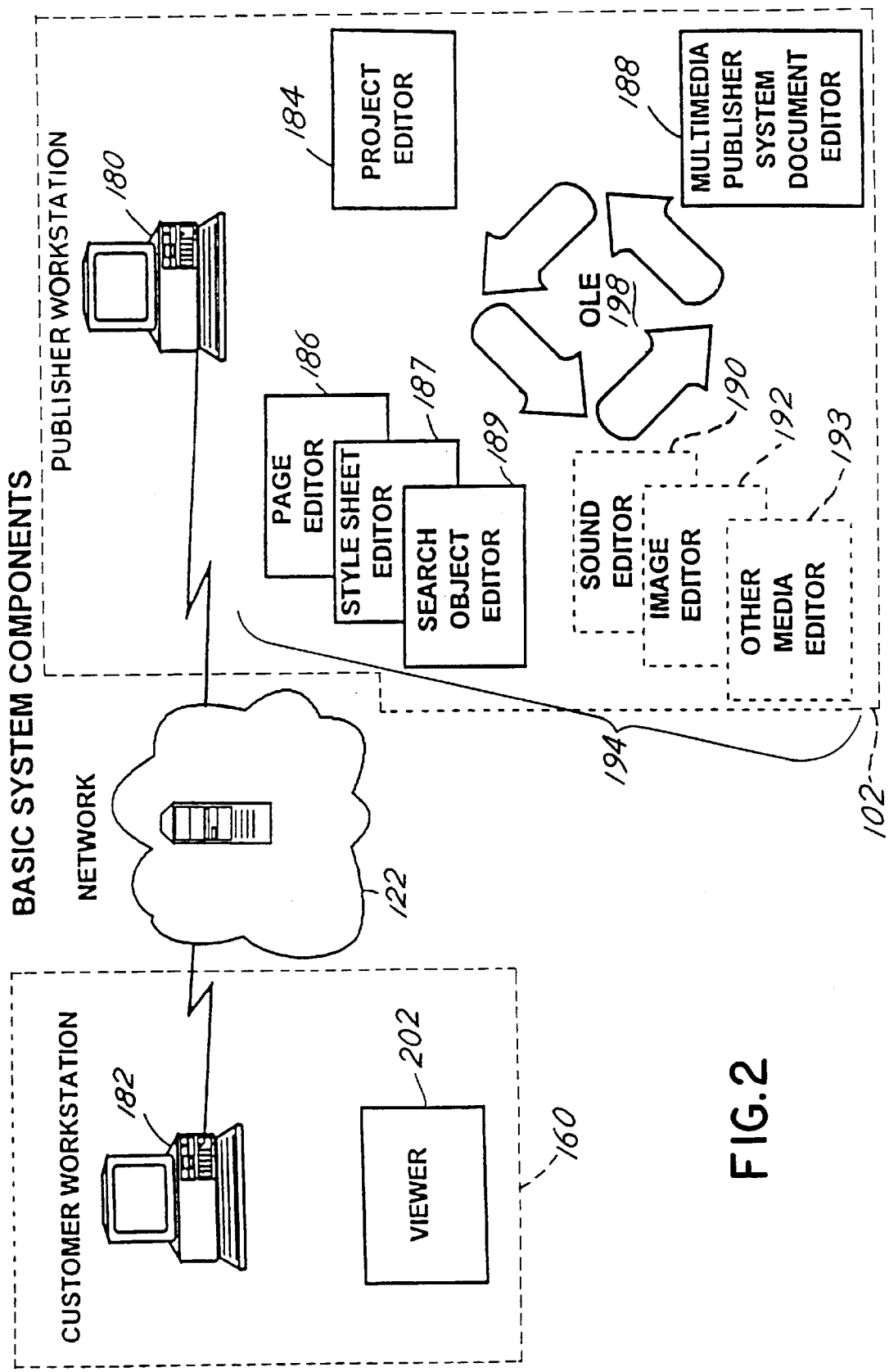
FIG. 2 is a diagram of the major system components of the MPS shown in FIG. 1, including a viewer and a designer.

The natural way of storing related and ordered objects is in a data structure, such as an acyclic graph. The presently preferred way of storing the MP system objects is called a caching object store (COS). In the presently preferred MPS, each title corresponds to a COS. There is least one COS at the publisher workstation and in each MPS server at the publication storage and distribution center (FIG. 2). Each customer workstation also has a COS so that the customer can store and retrieve MP system objects when assembling content into controls on pages.

A title may be broadly defined to encompass a publication (e.g., newspaper), service (e.g., stock quotations) or application (e.g., multimedia encyclopedia). When a title is viewed, the viewer opens a title file which represents the title. This title file is a COS file. Typically in the on-line scenario, this would be a skeleton title. A skeleton title is a COS file which contains only a root moniker and no actual objects. A moniker is an object used in the implementation of the COS and contains identification and status information about COS objects.

A superCOS is a COS file which contains more than one subordinate COS, known as a subCOS. For example, a superCOS at the customer workstation is used to cache objects which have been remotely retrieved from the host data center. As long as these cached objects are not out of date or flushed, the viewer will be able to quickly provide that object the next time it is requested rather than retrieving it from the data center again. This gives the MP system a tremendous speed advantage over other on-line systems.

Figure 4:
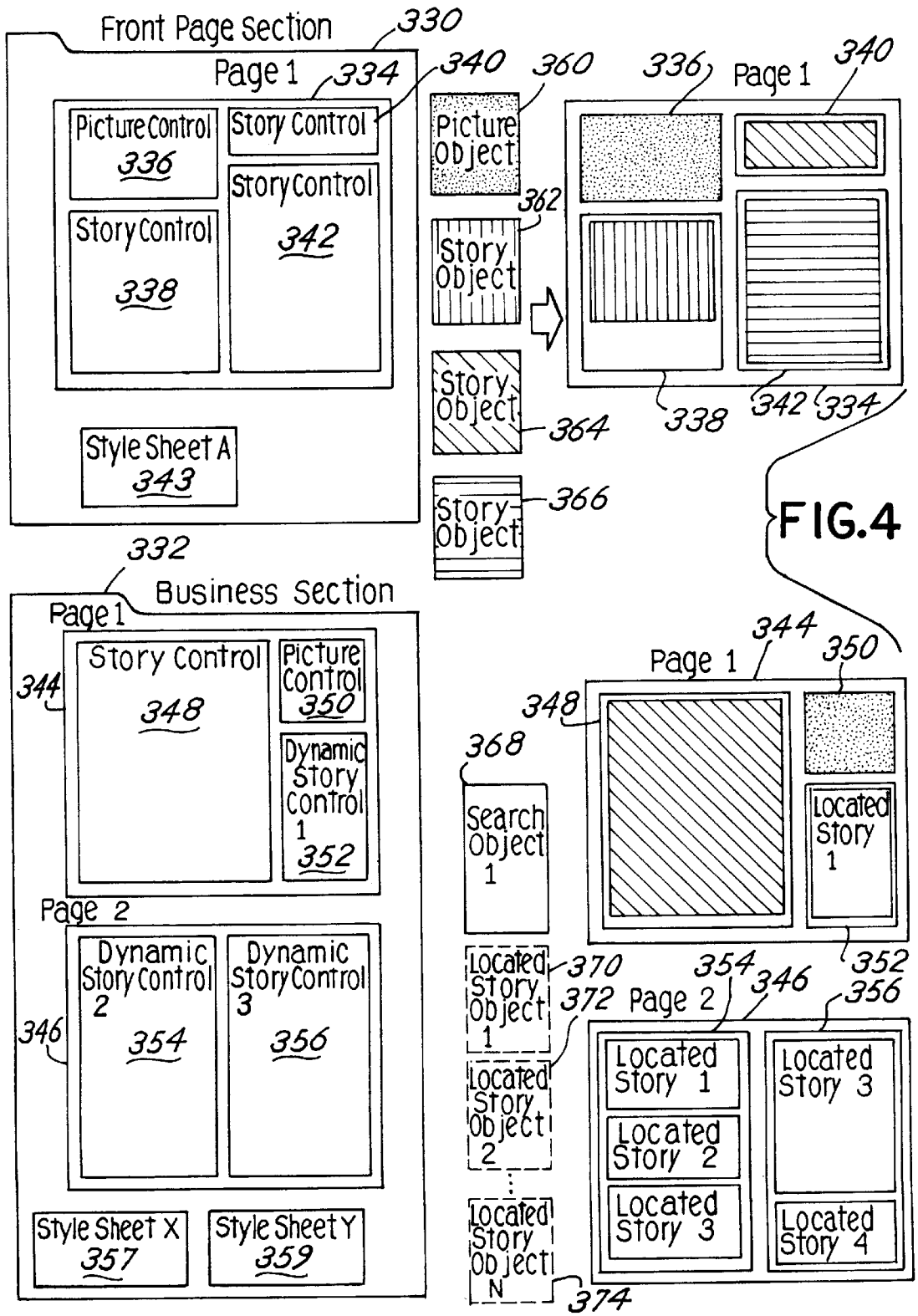
FIG. 4 is a block diagram of the interaction of page layouts, controls, style sheet and content objects at the viewer of FIG. 2.

An example of the rendering process and a query that are used to display the title to a customer is presented in conjunction with FIG. 4.

A. Separation of Design and Content in the Multimedia Publishing System

As discussed above, the MPS architecture maintains a clean separation between design information and the content to which that design will be applied. A publisher's collection of page layouts is in the form of one or more titles. A title is a collection of page layouts, in a particular sequence which relates to the order in which pages will be viewed. The page layouts describe how the client area of a window will appear when a page is rendered. Rendering refers to the creation of a bitmap of a display screen in memory prior to displaying the screen. A complete page layout is created by placing controls on a blank page layout, where each control delineates an area where some piece of content should be displayed. Settings on each control determine the proper place to look for the content to be displayed in that control.

The content takes the form of discrete objects, each of which compose one unit of information, e.g., a story or a picture. These content objects are of well-known and public data formats, and may be created using any tool that supports these data formats. Content objects generally do not have formatting information encoded within them.

When the publisher has created the title (with its page layouts) and the content objects, the title and content are published together to the public distribution point. Consumers download the title and content objects to their personal computer, where the MPS viewer software uses the page layouts in the title to compose the content in the visually rich form designed by the publisher.

B. System Configuration

Referring now to FIG. 1, the basic system configuration of the multimedia publishing system (MPS) 100, which is a preferred embodiment of the system 100, will now be described. By convention, the term title is used to describe the overall plan or instructions for assembling the complete on-line MPS application on a customer's computer.

Much of the power of the MP system 100 resides in its ability to fully separate design and content, unlike existing on-line and multimedia publishing tools which require a publisher or content provider, such as a first publisher 102, a second publisher 104, or a publisher M 106 to integrate design and content. In the MP system, titles, such as a title A 140, title B 142, or title P 144 can be divided into two parts: the content (148, 152, 156)—the information such as bitmaps, video clips, audio, animation, or stories that make up a title—and the title layout, also termed the design (146, 150, 154)—the overall look and feel of a title. To separate content and design using the MPS rather than placing content directly on a page, a publisher can place the content, such as a set of content objects 112, 114, or 118, in one or more containers of a title and then create sections or subsections having pages with special controls, such as a set of title layout objects 110 or 116, that dynamically find and display the content at runtime.

Using this technique a publisher can change a title on an ongoing basis by merely updating the content 112, 114, 116 which has been placed into various folders or containers within the master title. When a page is displayed, it shows the updated content. This is called dynamic title synthesis or dynamic synthesis, and allows content to be continually updated without any need to modify and update the title design consisting of the individual pages, controls and hand-placed content used to display the content.

When publishers use dynamic synthesis they are creating titles which contain placeholders that will be filled-in by the changing content. When dynamic synthesis is utilized, a title is used as a template and a pressing is the displayed, filled-in title. Each time the publisher updates the content in a title and makes it available for customers (also known as end-users or client end-users), such as a first customer 160, a second customer 162 or a customer N 164, the publisher is creating a new release of that title. When the customer starts to view that release, a "pressing" is made which contains part or all of the content in the release.

A major advantage of this approach is flexibility. Some parts of a title may be created by hand-placing content directly on a page, and other parts may be created using dynamic synthesis. Notice, however, that content hand-placed directly on pages is static—it changes only when the people involved in creating the title update the pages.

Returning to the creation of title layouts and content by the publisher, after creation, the title layouts 110, 116 and content 112, 114, 118 are released and stored in a publication storage 120. The storage 120 can be implemented in many forms, such as a network 122, CD-ROM 124, and other means of storage, such as bulletin boards, magnetic media, cable television and so forth.

The presently preferred network 122 is the Microsoft Network (MSN), which can be accessed, for example, by Microsoft Windows 95. Of course, the MPS is designed to be portable so that it can be used on any on-line network including but not limited to, Internet, America On-Line, Compuserve and Prodigy.

In the presently preferred embodiment of the storage 122 as the MSN, many customers will use a MSN Explorer tool to acquire and activate MPS applications.

The MSN Internet Explorer is the integrated navigation tool within Windows 95 which may be used to browse the MSN hierarchy and the Internet. Sophisticated customers may use other more advanced MPS features, such as search, scheduling, and automatic delivery, assuming these features have been activated by the publisher. Besides browsing via the Explorer or scheduling automatic home delivery, there are several additional ways customers can obtain MPS applications. For example, an individual application may be distributed via floppy disk or CD-ROM 124, it may be distributed through E-mail or bulletin boards, or the application may be directly accessible via a link in other applications (such as the Microsoft Network yellow pages system). In each of these situations, the MP system 100 acquires an application for the customer.

C. System Components

Referring now to FIG. 2, the preferred basic components of the MP system 100 will now be described. The system 100 includes a set of tools for designing, developing and viewing multimedia on-line applications. A publisher, such as the publisher 102, utilizes a publisher workstation (also known as a computer or machine) 180 and a Designer software environment 194 to create and publish the title layouts 110 and content 112. In the system 100, a publisher could possibly just create content and use the title layouts of another publisher. The title layouts and/or content are preferably stored in a network 122 that includes a high-performance server for hosting on-line applications. The preferred network 122 will be further described in conjunction with FIG. 3. A customer, such as customer 162, utilizes a customer workstation 182 and a runtime Viewer software component 202 to find and activate MPS titles, stored on the network 122, on a visual display at the workstation 182.

The Designer 194 is an extensible design and development environment that includes several preferred software components. These include a project editor 184 to manage tiles, containers, and objects; a page editor 186 to create and layout pages; a style sheet editor 187 to edit style sheets; a search object editor 189 to create search objects; a word processor, such as a MPS Document Editor 188, for creating content optimized for the MP system 100; and optional third-party tools, such as a sound editor 190, an image editor 192, and another media object editor 193 to create and modify sound, image, video, animation and other content objects. For authoring textual content, the preferred document editor is an enhanced version of the Microsoft Word® 6.0 word processing program for creating tagged, hypertext documents. Together, these programs form the Designer Component 194.

The project editor 184 is used to invoke a style sheet editor 187 that is used to create and edit style sheets. The style sheet editor 187, and portions of the project editor 184 and page editor 186 will be described in detail in subsequent sections of this discussion.

The MPS Designer 194 is a page or forms-based development system similar to Microsoft Visual Basic. The development environment is graphical and easy to use. Controls, which represent the components of a MPS application that will appear on-screen, are laid out within MPS pages. MPS pages and controls are preferably based on Object Linking and Embedding 198 (in FIG. 2) (OLE), Microsoft's component software technology. OLE, which presently is at version 2, is further described in *Inside OLE 2* and *OLE 2, Programmer's Reference*, Volumes 1 and 2, all of which are published by Microsoft Press. In addition, the System Overview chapter of *Class Library User's Guide for the MFC Class Library*, Microsoft Corp., 1993, provides further relevant information. However, other compound document architectures such as OpenDoc could be used as well.

A major feature of OLE is interoperability, the basis for integration between applications. This integration brings with it the need to have multiple applications write information to the same file on the underlying file system. OLE defines a model called OLE Structured Storage for treating a single file system entity as a structured collection of two types of objects; storages and streams. These objects act like directories and files, respectively.

The OLE Structured Storage model generally implements these objects; applications rarely, if ever, need to implement them. These objects, like all others in OLE, implement interfaces: IStream for stream objects, IStorage for storage objects.

A stream object is the conceptual equivalent of a single disk file. Streams are the basic file system component in which data lives; each stream has access rights and a single seek pointer. Through its IStream interface, a stream can be told to read, write, seek, and perform a few other operations on its underlying data. Streams are named by using a text string; they can contain any internal structure because they are simply a flat stream of bytes. In addition, the functions in the IStream interface map nearly one-to-one with standard file-handle-based functions such as those in the ANSI C/C++ run-time library.

A storage object is the conceptual equivalent of a directory. Each storage, like a directory, can contain any number of substorages (subdirectories) and any number of streams (files). Furthermore, each storage has its own access rights. The IStorage interface describes the capabilities of a storage object, such as enumerate elements (dir), move, copy, rename, create, and destroy. A storage object itself cannot store application-defined data except that it implicitly stores the names of the elements (storages and streams) contained within it.

The OLE Structured Storage technology solves problems associated with previous flat file systems through the extra level of indirection of a file system within a file. With OLE, a particular application can create a structured hierarchy where the root file itself has many substorages. Each substorage can have substorages within it, and so on.

This structure solves the problem of expanding information in one of the objects: The object itself expands the streams in its control, and the implementation of storage determines where to store all the information in the stream.

The MP system 100 includes a number of pre-packaged controls such as navigation controls, rich-text controls, multimedia controls, and other special controls specifically designed to support the creation of MPS applications. Because the MPS is based on OLE, third parties can also design their own controls for use within the MPS (using the Microsoft OLE Control Development Kit that is bundled with Microsoft Visual C++ 2.0). In this way, the MPS development environment is fully extensible so that customers can add new capabilities to their MPS applications by purchasing additional controls from third parties or by creating their own controls. The MPS development environment also includes a Visual Basic for Applications (VBA) scripting and debugging system.

While content is displayed within controls that have been laid out on MPS pages in the MPS Designer 194, content can be authored in any number of existing Microsoft and third-party tools. One such tool for authoring hypertext is the MPS Document Editor 188 that supports special MPS features for creating and tagging MPS text. Other existing tools for creating bitmaps, complex drawings, and other multimedia content can be used to create the content displayed within any particular OLE Control. In addition, most existing OLE Controls (.ocx executable programs) will work in the MPS environment although they may not be optimized for on-line applications. For example, a standard advanced video imaging (AVI) OLE Control could be placed in an MPS application.

The controls that are part of the MP system 100 are optimized for low bandwidth on-line delivery of data. However, the use of high bandwidth data delivery is within the scope of the present invention. The MPS 100 is designed to operate with information that can change from minute to minute, daily, or monthly. So while the MPS can be used for creating static titles that are hand-crafted and cannot be easily updated on an ongoing basis, the main focus of the MP system 100 is to provide an efficient, cost-effective mechanism to manage the creation and management of dynamic, continually changing on-line applications. At the same time, as an open development environment, many of the tools commonly used for creating static multimedia content can easily be incorporated into the MP system 100.

When activated by the customer, the Viewer 202 examines the components of a selected title to see if any of the information required to display the pressed title needs to be acquired. It then acquires this information from publication storage 120 or local storage at customer workstation 182 and organizes it so that it can be displayed to the customer 162. Thus a pressed title captures the set of information that is displayed to the customer at a given point in time. In other words, some titles might produce a new pressing every day, or more frequently, as the content changes. On the other hand, other titles may be static; when a static title is activated there is no need to do another pressing, since the content has not changed.

While pressing a static title may seem unnecessary, the process of organizing and displaying the pressing can take into account customer preferences and display device characteristics. For example, suppose a customer activates a static title on a laptop when using the laptop screen and then later activates the same title when the computer is attached to a larger display. The second activation will result in another pressing to take into account the much larger screen area, if the publisher has enabled such an option. When the title is activated, the MPS Viewer 202 determines if the title is out of date; acquires any needed information; and then, if necessary, creates and possibly personalizes the pressing.

The MPS Viewer 202 enables customers to perform the following actions within the limits defined by content providers: select and personalize the information a title acquires, modify the overall structural properties of titles, personalize the look and feel of titles, manage and archive the content customers acquire, and view billing and pricing information.

The requirement for the preferred publisher workstation 180 is a Windows 95 workstation with the minimum hardware configuration necessary to run the MSN sysop tools and to store and display the titles under development. The preferred Windows 95 workstation has, at a minimum, an Intel 486 processor running at 33 MHz or better with eight Megabytes of memory. A 9600 baud or faster modem is required to run the MSN sysop tools. For multimedia titles, this includes a MPC2 compliant (multimedia configured) workstation.

The MPS Viewer 202 should be installed on the customer workstation 182 before an MPS title is activated. The presently preferred customer workstation is capable of running Windows 95. To make this installation easy, the Viewer 202 is automatically installed onto the customer workstation 182 the first time the customer connects to MSN and the MP system 100 is enabled. MPS titles may include resources such as fonts, Dynamic Link Libraries (DLLs), and OLE controls that are placed into the resource container or folder of MPS titles. Before customers can view such titles, these resources are installed on their workstation 182.

D. Network Storage

Figure 3:
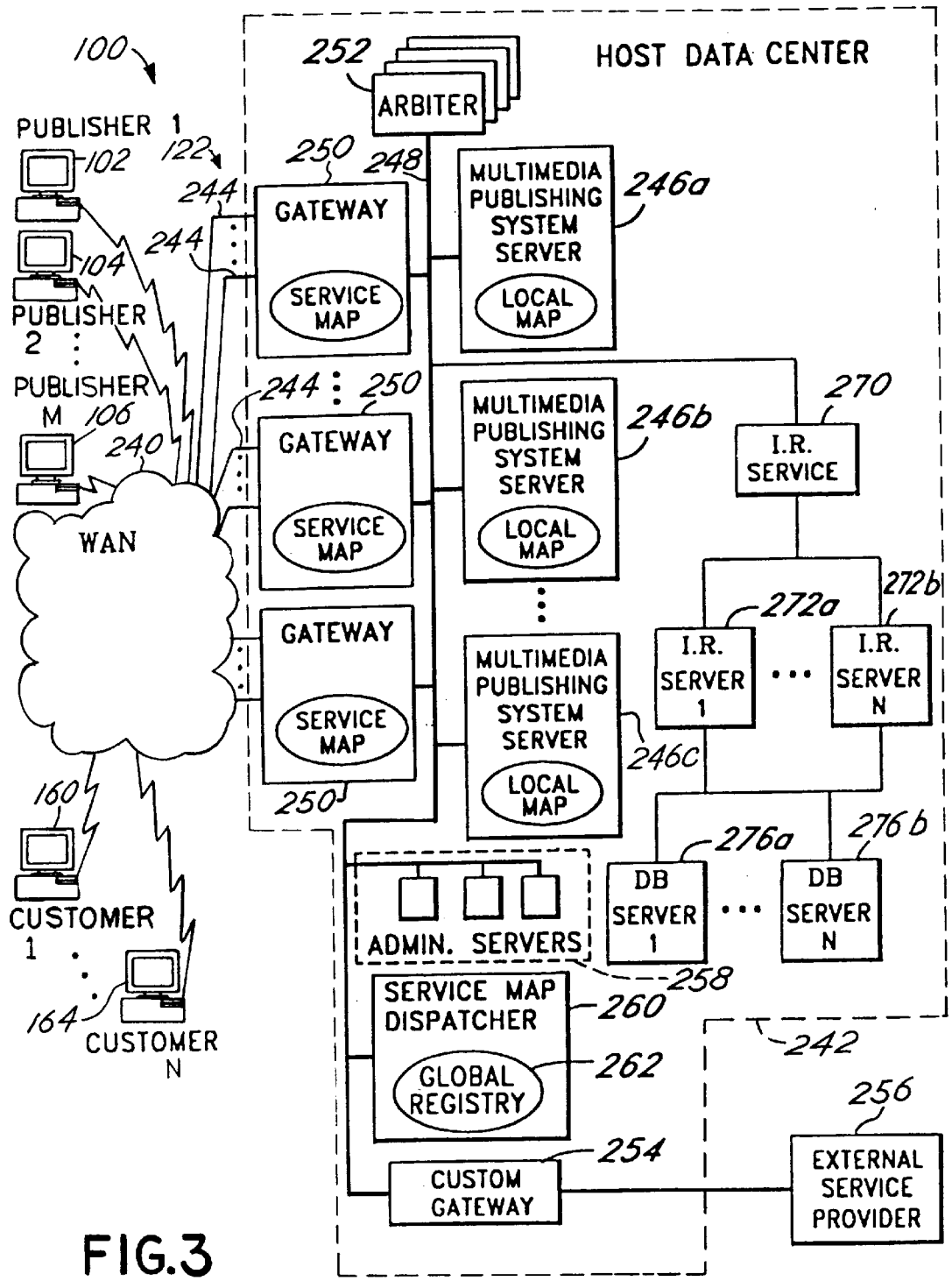
FIG. 3 is a diagram of an exemplary on-line system for publication storage and distribution.

Referring to FIG. 3, an exemplary network storage subsystem 122 will be described. FIG. 3 is a high level diagram illustrating the basic components of an on-line network 122 in accordance with one embodiment of the invention. Multiple workstations associated with publishers 102, 104, 106 and customers 160, 164 are connected to a host data center 242 by a wide area network (WAN) 240. The publisher workstations preferably have high speed connections to the WAN 240. The wide area network 240 includes WAN lines 244 which are provided by one or more telecommunications providers, and which allow end users (i.e., publishers and customers) over a wide geographic area to access the host data center 242 via modem. The WAN lines 244 preferably include both X.25 lines and ISDN (Integrated Service Digital Network) lines.

The host data center 242 comprises a plurality of application servers 246 connected to a high speed local area network (LAN) 248 (which may include multiple LANs). Each application server 246 has a unique server ID. As shown in FIG. 3, three of the servers 246 are MP System servers (246a, 246b and 246c). Also connected to the LAN 248 are multiple Gateway computers 250 also referred to as Gateways, which link incoming calls from end users to the application servers 246.

It is envisioned that the host data center 242 may advantageously have on the order of one hundred Gateways 250, and between several hundred to several thousand application servers 246. A host data center of this type will be able to handle tens of thousands of simultaneous user logon sessions.

As described below, the server side of each on-line service is preferably implemented using one of the following: (1) a single application server 246, (2) a set of "replicated" application servers (i.e., application servers which run the same service application or applications) that provide access to replicated (and locally-stored) copies of service "content" data (i.e., data provided to end user's of the service), or (3) a set of replicated application servers that provide access to server-specific (non-replicated) service content data.

The host data center 104 also includes multiple Arbiter computers 252 that monitor, record and process certain types of transactions to ensure consistency among replicated application servers. The host data center 104 also includes one or more custom Gateway computers 254 which link the host data center 104 to one or more external service providers 256, such as a credit card service that validates and executes credit card transactions.

The host data center 104 also includes a number of administrative servers 258. The administrative servers 258 perform administrative functions such as accounting, billing, network management, backup, system security, performance analysis, and server-to-service allocation.

To route user service requests to the appropriate servers 246, the Gateways 250 must have some way of determining the unique IDs of the servers that are currently handling the requested services. This is accomplished by means of a service map (not shown), which contains information about every service and server 246 in the host data center 242.

The service map is preferably generated by a service map dispatcher 260, which may be implemented on a single computer.

In addition to generating a service map, the service map dispatcher 260 maintains a central repository of information referred to as the "global registry" 262. The global registry 262 contains various information about the present configuration of the host data center 242. For example, for each service group, the global registry 262 indicates the IDs of the servers 246 of a service group, and the identity of the Arbiter computer 252 (if any) which is assigned to the service group.

One or more Information Retrieval (IR) services, such as IR service 270 are connected to the LAN 248. The IR services also are connected to each other IR service (if present). The IR services logically perform a IR gateway function to the rest of the IR subsystem. The IR service 270 further logically connects to a plurality of IR servers 1 to N, such as an IR server 272a, which could be a indexer server, and an IR server 272b, which could be a search server. Each IR server, such as servers 272a and 272b, is further connected to a plurality of database (DB) servers 1 to N (where the number of IR servers does not need to equal the number of DB servers), such as a DB server 276a, which could be, for instance, an SQL server, and a DB server 276b, which could be, for instance, a Fulcrum server. In the presently preferred IR subsystem, the IR servers, the DB servers, and a query cache (not shown) are physically connected to a MPS LAN (not shown). The MPS LAN physically connects to the COS and the IR gateway. The IR servers also physically connect to the LAN 248.

Further disclosure of the preferred network 122 is provided in a copending application also assigned to the assignee of the present application, Microsoft Corporation, entitled "Architecture for Scalable On-Line Services Network", Ser. No. 08/472,807, filed on Jun. 7, 1995.

E. Example of Rendering Process

Referring now to FIG. 4, the interaction of page layouts, having controls, and objects at the Viewer 202 (FIG. 2) of the customer's workstation 182 to render pages will now be described. The Viewer 202 supports the display of information through windows. The placement, organization, and number of windows is under the control of the publisher 102. Viewer windows are Windows 95 frame windows. These windows are completely under the control of the designer. The designer controls the Viewer 202 by creating a title. The title sets the size and standard elements (title bar, Min/Max buttons, caption, border, menu bar) of the various windows displayed by the Viewer 202.

The entire client area of a viewer window is used to display a series of pages. Each page contains a set of controls that are used to display content, to navigate through the title, and to gather information from the customer. In response to customers actions or other events, the page that is displayed may change during the course of running the title. This behavior is determined by the publisher 102. A title may have more than one window visible at any given time, and popup windows may be modal or modeless. Only one title may be displayed within a Viewer window at any given time.

FIG. 4 presents a diagram of a front page section 330 and a business section 332 for a title, such as a newspaper.

1. The Front Page Section

The front page section 330 contains a page 334 which has a picture control 336, and a set of static story controls: a first story control 338, a second story control 340, and a third story control 342. Each static story control or picture control is linked at publication time to just one object. Each of the controls on the page 334 references a style sheet 343 to provide formatting instructions on how the content is to be displayed.

As is known in the present software technology, a globally unique identifier (GUID) can be used in OLE object-oriented environments to identify an object with a unique string of characters. Normally, unique GUIDs are produced by concatenating the time, date and network card serial number of the computer at the time that the object is created. By using this method, it is virtually impossible for two objects to receive the same GUID. Thus, each object in the system can be identified, linked to, retrieved, and so forth by use of the object's GUID.

As shown in FIG. 4, a picture object 360 is linked to the picture control 336, so that upon rendering, the picture object 360 is displayed on the page 334 at a position determined by the control 336. Similarly, a story object 362 is linked to the static story control 338 and rendered into the position of the control 338 on the page 334.

Note that since the control 338 is a static story control, any area not used by the story object 362 in the area identified by the control will be blank. As shown, a story object 364 is linked to the story control 340 so that it is rendered in the area identified by the static story control 340 on the page 334. In this example, for instance, only the first paragraph of the story object 364 will be rendered on the page 334 due to the size of the control 340 (as selected by the designer). In this manner, the designer can choose to only display a portion of a linked story within a static story control by adjusting or sizing the control to only hold one paragraph, or other desired portion, of the story content. Normally, a static story control will allow scrolling of a story so that ultimately the entire story will be displayed.

Finally, a story object 366 is linked to the story control 342 so that it is rendered in the area identified by the static story control 342 on page 334. In this example, the entire story object 366 is rendered onto page 334.

It is important to note that each of these story objects makes reference to the style sheet 343 before being rendered on the page 334. When story objects are authored, they are given formatting tags that represent specific styles. As the story objects are rendered, they reference the style sheet that is linked to the appropriate control to retrieve formatting information. This formatting information includes properties of the paragraphs, fonts and embedded objects in the story that format the content as it was originally designed. Due to the separation of design and content in the MP system, the story objects themselves only have formatting tags, but do not contain a description of the particular format that corresponds to each tag. The descriptions of those tags is found in the style sheet that is linked to the control into which the story object becomes rendered.

2. The Business Section

As also shown in FIG. 4, the business section 332 contains a first page 344 and a second page 346. The page 344 has a single static story control 348, a single picture control 350, and a first dynamic story control 352. The second page 346 has two dynamic story controls, 354 and 356. In addition, a style sheet X 357 and a style sheet Y 359 are referenced by the different controls on pages 344 and 346. The pages in the business section 332 differ from the page 334 in the front page section 330 because they rely on a search object 368 to retrieve particular stories. On the page 334, the static controls were each linked to a particular story which was then displayed upon rendering. The search object 368 is affiliated with the dynamic story controls in the section 332.

As shown in this example, the static story control 348 and the picture control 350 on the page 344 reference or link to the story object 364 and the picture object 360, respectively, and display these objects as shown on the rendered page 344. The story object 364 is thereby shared between different sections, pages and controls in the title. The entire story object 364 is displayed on the page 344, whereas only the first paragraph was displayed on the page 334. By using a similar process, a designer can choose to display just the first paragraph of a story on the first page of a title, but include the entire story on another page within the same title. As shown in FIG. 4, the picture object 360 is also shared between the control 336 and the control 350. This sharing of content between separate sections and pages is an important feature of the MP system 100.

3. Dynamic Story Controls

The dynamic story control 352 uses the results of a query performed by the title to retrieve stories matching search criteria set by the publisher (as defined by the search object 368). The search object 368 locates story objects having specific properties or text. In the example of FIG. 4, the search object 368 returned many story objects 370, 372 and 374 corresponding to story objects 1 through N, respectively (where N=4 in this example). All of the retrieved story objects are concatenated together by the dynamic story controls and poured into the appropriate regions on the pages. The order that the stories become rendered into the control regions starts with the first dynamic story control on the page in the section and continues to other dynamic story controls contained within the section.

If enough pages to display all the located stories are not defined in the section, the last page used is repeated until all stories are rendered. Thus, the first located story 370 is poured into the area defined by the dynamic story control 352. Since it does not completely fit in that area, the located story 370 continues across the page boundary onto page 346 into the area defined by the dynamic story control 354. The located story object 372 then begins after the located story object 370 ends. The next located story object (located story object 3) begins after the story object 372 ends, continuing into the next control 356 on page 346, as shown in this example. The last located story object 374 retrieved by the search object 368 in this example is then rendered into the dynamic story control 356 within page 346.

As explained above, the dynamic story controls in the section 332 use the search object 368 to display the results of queries made for specific information. For example, the search object 368 may return content that contains the word "Microsoft". Each of the stories found by the search object 368 will be displayed in the areas defined by the dynamic story controls in the format designated by the style sheet 357 or the style sheet 359.

For example, if the dynamic story control 354 is linked to the style sheet 357, then all of the stories displayed by the dynamic story control 354 will appear in the format designated by the style sheet 357. However, the stories rendered by the dynamic story control 356, when this story control is linked to a different style sheet (for example, the style sheet 359), would appear differently than the formatted display corresponding to the dynamic story control 354. In this example, if the controls 354 and 356 use different style sheets, the located story 3 would be displayed using two formats when the transition from the area defined by the control 354 to the control 356 was made.

Style sheets and the style objects they collect are created by the designer (i.e., the person at the publisher workstation 180 shown in FIG. 2) using the Project Editor and the Style Sheet Editor. Once the style sheet has been created, it is stored in the caching object store (COS) along with the other objects in the project as described above in reference to FIG. 2. The style sheet objects support OLE serialization and are therefore based on the Microsoft Foundation Class (MFC) CObject class. These class definitions are publicly available from the assignee.

IV. INFORMATION RETRIEVAL OVERVIEW

This section presents an overview of the configuration and major components of the preferred Information Retrieval (IR) system. Beginning with a description of the major components, configuration and interrelationships of the MP and IR systems, a discussion of the software components follows. Then the structure of a story, and of a title are described, followed by an overview of the viewer processes and a customer query. This section ends with a discussion of the control flow for search objects and the Find dialog along with a discussion of the structures utilized by the search objects flow.

A. Information Retrieval Top Level

Figure 5:
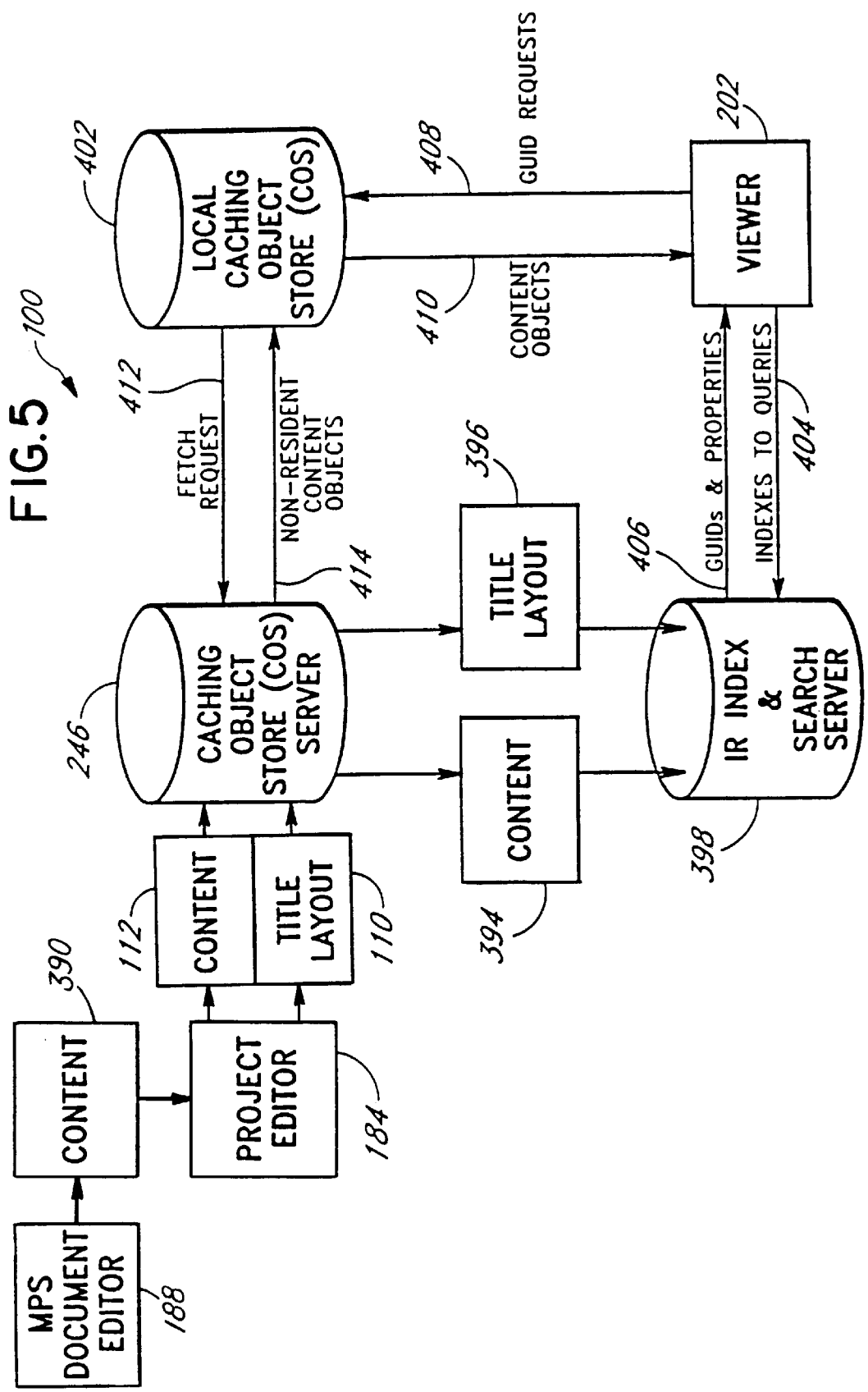
FIG. 5 is a block diagram showing the interrelationship of the Information Retrieval (IR) system and the MPS.

Referring now to FIG. 5 and also FIGS. 1–3, the interrelationship of the Information Retrieval (IR) system and the MPS are described. An independent content provider (ICP) or publisher 102 uses an MPS document editor 188 to generate one or more content objects 390. Other editors, such as sound editor 190 and image editor 192, could also be used to generate content 390. The publisher 102 uses project editor to associate either all or selected portions of the content 390 with a title layout 110. The title layout may include one or more search objects. Content 112 that is selected to be associated with the title layout 110 can be placed into a root content folder. When the publisher completes the title, the title layout and the content are published to an MPS Caching Object Store (COS) server, such as MPS server 246. A publisher can alternatively just publish a content folder having one or more content objects to the COS server 246. The publisher may publish new content objects or delete existing content objects at a later time.

Content objects may be stored in a title COS at the server 246 or they may be stored in the root content folder at the server 246. The COS server 246 copies the published content 394 and title layout 396 to the IR system 398 that comprises the IR services 270, the IR servers 272–274, and the DB servers 276–278. The IR system 398 includes an IRSV DLL, an IRUTS DLL and a IRIX DLL. As will be described hereinbelow, the IR system 398 builds indices which include the GUIDs and properties of the objects.

When a search object query or user query is initiated at the viewer 202, attributes of the query (here shown as indexes to queries 404), such as a title GUID, a section GUID, date range, keywords, and so forth are sent to the IR system 398. The IR system 398 performs a search of its databases to find objects which match the search criteria. The IR system 398 returns a list of GUIDs and properties, such as the date and source, of each content object returned to the viewer 202. The viewer 202 then issues GUID requests 408 for the actual content objects identified by the IR system 398 to a local (viewer) COS 402. If the requested content object is present in the local COS 402, the content object 410 is returned to the viewer 202. If the objects identified by the GUID requests are not in the local COS 402, a fetch request 412 is made to the COS server 246. Content objects 414 that were not resident in the local COS 402 are then transferred from the COS server 246 to the local COS 402 for further transfer to the viewer 202.

B. API/DLL View of System

Figure 6:
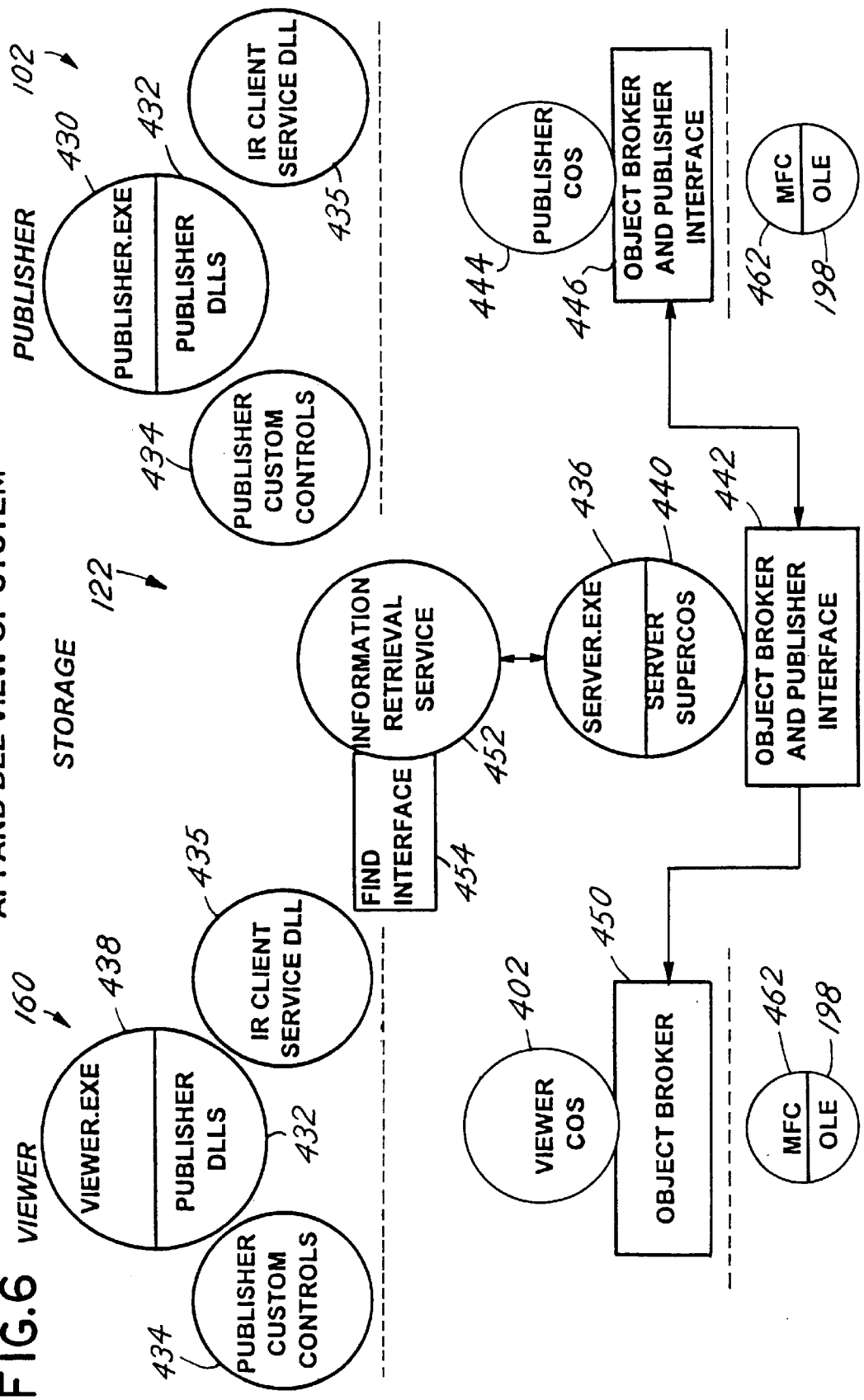
FIG. 6 is a block diagram of the major software components of the system shown in FIGS. 1, 2 and 5.

Referring now to FIG. 6, the major software components or modules used by the presently preferred implementation of the MP system 100 will be described. The modules are located at the publisher location 102 (also shown in FIGS. 1 and 2), at the network storage location 122 and at the customer location 160.

The modules at the publisher location 102 include a publisher executable 430, a set of publisher DLLs 432, a set of publisher OLE custom controls 434, a set of IR client service DLLs 435, a publisher COS 444 with a client object broker service and client publisher interface 446, OLE 198 and MFC 462.

The modules at the customer location 160 include a viewer executable 438, the set of common publisher DLLs 432, the set of common publisher OLE custom controls 434, the set of IR client service DLLs 435, the viewer (local) COS 402 with a client object broker service 450, OLE 198 and MFC 462.

The modules at the storage location 122 include a server executable 436, and the server COS 440 (also known as a superCOS) with a server object broker service and server publisher interface 442. A bidirectional interface from the server executable 436 and the server COS 440 connects with an information retrieval service 452 with its associated find interface 454.

The publisher executable 430 (also known as BBDESIGN.EXE) is an application which provides a mechanism for generating a design-time view of a project. It is utilized in the creation of objects within a project, and for establishing the relationships between the objects of a project.

The set of publisher DLLs 432 includes a forms DLL (FORMS3.DLL) that provides the implementation of the OLE Control Container class and supplies the data for the page object in a project. Also included is a view DLL (VIEWDLL.DLL) that provides a set of MPS Object definitions and the viewer engine for synthesizing the run-time view of a title. The MPS Objects include: CProject, CTitle, CSection, CFolder, CContentFolder, CRootContentFolder, CProxyTable, CContent, CFrame, CBForm, CVForm, CStyleSheet, and CMagnet.

The set of publisher OLE custom controls 434 (also known as BBCTL.OCX) is a DLL which provides the code for implementing instances of the OLE custom controls which are standard for the MP system 100.

The viewer executable 438 (also known as BBVIEW.EXE) is an application which provides a mechanism for initiating the run-time view of a title. It uses the publisher OLE custom controls 434 and the publisher DLLs 432, especially the viewer engine for synthesizing the run-time view of a title.

Each of the publisher 102, customer 160 and network storage 122 locations has a COS implemented by using a DLL (COS.DLL). The COS DLL provides a persistent storage mechanism for objects used by the MP system 100. The COS DLL uses OLE Storage technology to store sets of objects as a file system within a file. Each object placed into a COS is given a unique identity, referred to as a GUID. Each object identified by a GUID can be located independent of a path name in a file system. The server executable 436 (also known as MSNSERVER.EXE) is an application which provides a mechanism for managing the network server, which includes the COS. In addition to the COS DLL, the server has a DLL for COS access and object binding (OBSV.DLL), a MPS server service (BBOBSVC.DLL) and a memory management service (DFARBSV.DLL).

Each of the publisher 102, customer 160 and network storage 122 locations has an object broker service DLL (OBJBRK.DLL). The object broker service attempts to locate an object given its unique identity (GUID). The object broker first looks in its local object store (referred to as a superCOS), which is either the publisher COS 444 (at the publisher location 102), the server COS 440 (at the network storage location 122), or the viewer COS 402 (at the viewer location 160). If the object is not located at the COS wherein the request was made, and if the object broker resides on a client machine (either the publisher or customer workstation), it will attempt to remotely retrieve the object from the server COS 440 at the MSN Data Center 242 (FIG. 3). In another embodiment, other object stores may register with a given object broker as a source of objects, which the object broker will search in between the local and remote retrieval cases. Associated with the object broker 446 at the publisher is the client side of the publisher interface, and associated with the object broker 442 at the network server is the server side of the publisher interface. The publisher interface is used to manage the publication of new, deleted, and modified objects.

The capabilities of the object broker allow a publisher to test layouts or content that are shared with a different publisher. As an example, publisher A has a title layout A and publisher B has content that publisher B has agreed to share with publisher A. To test title layout A together with the content, publisher A could retrieve content provided by publisher B that is stored in the COS 440 by use of the object broker service.

A MPC Wrapper DLL (MWRAP.DLL) uses the Microsoft Network Procedure Call (MPC) protocol to communicate with the network storage 122, i.e., the MSN Data Center 242 in the presently preferred embodiment, and the MPS services, such as the object broker and COS. This wrapper specifically isolates the COS/Object Broker subsystem from the specific MPC protocol so that the MP system 100 can be easily ported to use other protocols in other embodiments.

C. Designer Environment

This section of the detailed description describes the designer environment at the publisher site. This section begins with a discussion of the presently preferred authoring subsystem used by the MP system 100. Then, a title designer subsystem component, namely the search object editor used in the creation of the title layout, will be described. Finally, a title tree structure, as developed at the viewer 202, is described.

1. Authoring Subsystem

Content is separated from design in the MP system 100. In the Viewer 202 (FIG. 2), content and design are brought together by controls to display a title as specified by the designer. As a result, these controls need to identify different elements in the structure of the content so they may format it correctly. This is done by creating structured content. The MPS authoring environment provides a way for authors to create structured documents.

The MPS authoring environment includes the MPS Document Editor 188, which supports the creation of structured documents, insertion of links and the application of properties to these documents for content retrieval. The MP system 100 uses SGML (Standard Generalized Markup Language) to define the scheme for creating structured documents. SGML is a standard for defining a markup language—a set of tags and attributes used to identify the structure of a document called a DTD (Document Type Descriptor). The MPS Document Editor 188 will support saving documents in a format which conforms to the MPS DTD (MPML—Multimedia Publishing Markup Language). This DTD will be published for use with other SGML authoring systems. As part of this environment, the MPS provides a pair of Document Editor converters for reading/writing MPML files, a template defining styles and macros used to create MPML files along with some OLE controls used to insert links and apply properties to these files.

To create content for the MP system 100 in the MPS Document Editor 188, an author creates a document based on the MPS template. This template provides a set of predefined styles along with supporting macros. The author applies these styles to the text to identify the different elements of the document (headline, abstract, body text, and so forth). Only the predefined styles should be used. When the document is saved in MPML format, these styles are mapped to SGML tags by the MPML output converter. The result is a tagged document which can later be parsed by the Viewer 202.

The MPML converters for the Document Editor 188 support mapping styles applied to the text to MPML tags. In addition, it will support graphics inserted with the "Insert Picture" command of the Document Editor 188. This will support both linked and embedded graphics and tag them appropriately. The converters also provide support for the MPS OLE controls provided to insert links and apply properties to the documents.

An important aspect of the authoring environment is that it is only to be used to generate tagged content. The author should not expect that the style definitions made or formatting applied in the Document Editor 188 will carry over to the Viewer 202 when the document is displayed.

As part of the authoring environment, several OLE controls are provided which interact with the MPS environment to help the author insert links and apply properties to documents. These controls are normal OLE objects which are extended to support rendering their data in MPML format. The MPML converters will be able to recognize OLE controls embedded in the Document Editor document and ask them for their MPML representation using a well-defined interface. When the converters encounter an OLE object, they will attempt to retrieve a MPML representation from them using this interface and insert it into the output MPML stream. OLE controls which do not support this interface will be ignored. The use of the interface allows extending the authoring environment with new OLE controls as needed.

a. Story Editor

A MPS story editor, which is part of the MPS Document Editor 188, is the main tool designers and authors use to create MPS story objects. A MPS story object consist of a stream of text with embedded objects such as links or pictures. MPS stories can also be tagged with Find properties so that the MPS Find system can easily and accurate locate stories.

The main tasks involved in the creation and delivery of a story are: author the story; set structural properties for the story; optionally, place pictures into the story; optionally, create links to other stories, and set summary properties (including Find matching criteria) for the story.

In addition to using the MPS Document Editor 188 to create stories, publishers can create MPS stories with other tools or with an automated process. For example, stock ticker stories probably will be created automatically.

MPS stories are structured, which means that the elements that make up the story are logically identified. This is useful because the MP system 100 can take advantage of this logical description to help present the information to users. The Document Editor 188 makes this easy, wherein authors merely apply the Document Editor styles. This process may also be performed automatically using filtering software that is supplied by Microsoft or by third parties.

The MP system 100 supports three main file formats. These are: (1) the MPS data file format, (2) MPML, and (3) the HyperText Markup Language or HTML. The MPS data file format is the native MPS story format. It is a standard OLE document file with separate streams for text and the various objects contained within the text stream. The MPML format is available to make it easy to import and export MPS stories. A MPML file is an ordinary text file that conforms to SGML. Because this file format is a simple text file, it is easy for publishers to automate the process of creating MPML files. Most publishers will not need to use MPML because the MPS tools automate the process. The MPML file format is only important because it can be easily converted to other formats, which ensures an easy migration path for publishers.

The MP system 100 can also import and export HTML text files. However, because HTML is fairly limited many advanced MPS features can not be represented in HTML.

The HTML and the MPML converters are constructed as a separate program that enables publishers to make batch translations of files.

Stories are usually linked to other appropriate content, and MPS Find properties are added to the story so the story can be found by the query subsystem. These steps can be performed using MPS or third-party authoring tools. If a publisher uses third-party tools to produce content, the results must conform to the MPS file formats to ensure that the Viewer 202 can interpret the content.

b. Find Properties

To help customers find stories that might be interesting, the MPS supports the specification of keyword or keyphrase matching criteria through the file properties option. A File\Properties dialog of the MPS Document Editor 188 is used to tag a story with retrieval attributes for search to find. Each field may be individually searched by the search editor. The Find dialog may search the title field uniquely, but the rest of the fields are searched as a whole when the 'Keywords' box in the dialog is selected.

In one preferred embodiment, the story properties that may be entered in the Properties dialog include the following:

Title—The title of the story

Topic—A list of topics that the story is about

Place—Geographical location(s) pertinent to the story

Person—Name(s) of person(s) involved in the story

Author—The writer of the story

Organization—Organization(s) name(s) involved in the story

Date of Event—The date when the story occurred or occurs

Priority—The importance of the story as it relates to how/where it is published in a title C. Creating a Multimedia Document File The following discussion is an overview of the process of creating a Multimedia Document File (MDF) and publishing it to a server. Multimedia files are then used to provide content for displayed on-line titles. A publisher 102 produces content for a title using the document editor 188 (FIG. 2). The publisher 102 then creates a MDF file and saves the created content to a storage. Once the content has been saved to a file, the publisher 102 selects saved content to link with a particular title. It should be noted that the publisher 102 may represent more than one individual. For example, an author could create an MDF document and save the content to a file while a designer would select the content to link to the title. It can be appreciated that any number of individuals associated with the publisher 102 can be responsible for creating content and releasing it to customers.

Once the content has been selected and linked to a particular title, a parsing process is begun. The actual process of parsing the content is discussed in more detail below in reference to FIG. 7. However, the parsing process that takes place converts the MDF file into a parsed content tree having a single root with multiple nodes and branches. This parsed structure increases the efficiency of transferring content across low-bandwidth lines.

Once the content has been parsed, it is stored in the publisher's local caching object store (COS) where it is available to be linked with many titles, if so desired. After the parsed content is linked to a title and stored in the local COS, the content and title layout can be published to a server.

Figure 7:
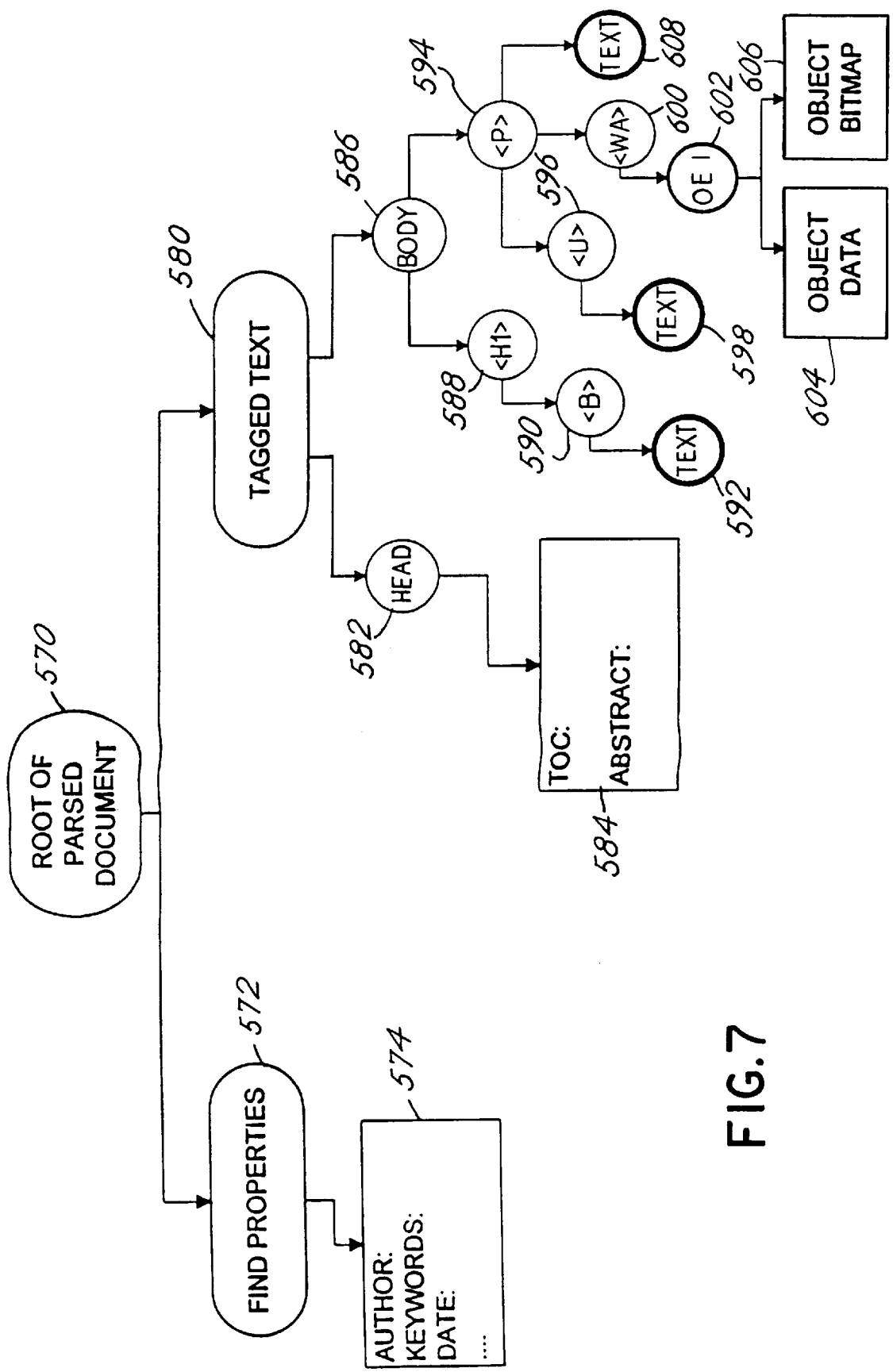
FIG. 7 is a diagram illustrating an exemplary MPS story having a root, find properties, text, and embedded objects.

The results of parsing a MDF file is shown in FIG. 7. The parse tree is a data structure representing the document and created by the designer when content is linked to a title. This is done in conjunction with a low-level parser and a high-level Document Type Descriptor (DTD) manager. The low-level parser is basically a state machine. It looks at each character in the input text and modifies its current state depending on the identity of the next character. As states change, "events" are returned to the DTD manager which interprets and acts on the event. Examples of events: start tag encountered, end tag encountered or attribute encountered.

For each tagged element in the parsed MDF file there exists a node identifying the tag and attributes whose data is the element that was tagged. In a Multimedia Publishing Markup Language (MPML) format, tags may be nested within each other. As a result, a node in the tree may point to other nodes representing the nested tags or to a node which contains the actual tagged text. This implies that only the "leaf" nodes of the parse tree actually point to tagged text.

d. Parsed Content

Referring now to FIG. 7, a root 570 of a parsed document is illustrated having a find properties storage 572 (an IStorage object) which contains a stream of data 574 corresponding to find property data. The find properties stream 574 contains data such as the author, keywords, title, data created and other information so that a search object in the multimedia publishing system can find this particular document.

The find properties stream 574 preferably includes the following properties and formatting. Note the angle brackets and backslashes are for readability only and are not part of the actual stream (see example below).

Title=<Title><space><Zero terminated string>

Subject=<Subject><space><Zero terminated string>

Author(s)=<Author><space><Semi-colon separated list of names as zero terminated string>

Keywords=<Keywords><space><Semi-colon separated list of key phrases as zero terminated string>

Comments=<Comments><space><Zero terminated string>

CreatedTime=<CreatedTime><space><Zero terminated string in yyyy/mm/dd hh:mm::ss format>

ModifiedTime=<ModifiedTime><space><Zero terminated string in yyyy/mm/dd hh:mm::ss format>

Priority=<Priority><space><Zero terminated string with numeric value between 1 and 5 inclusive>

Other find properties include Document ID, Source ID, Text Body, Abstract, Summary, Published Time and Date, Event Start Time and Date, Event End Time and Date, Headline, Place of Event, Person, Organization, Topic and Independent Content Provider ID (ICPID).

An example of find properties stream:

Title This is the title<null byte>Subject This is the subject<null byte>Author George Washington<null byte>Keywords Authoring, Word, Multimedia<null byte>Priority 5<null byte><null byte>

The find properties are stored in an IR index in the IR system 398 (FIG. 5). By use of the find properties, a customer can see a list of all files referring to George Washington, for example, but will not have to wait for all of these files in their entirety to be downloaded across the on-line system. Note that the list of file names are displayed to the user without necessarily downloading any of the files.

Also contained under the root object 570 is the tagged text 580 which has been parsed into a parse tree. As shown, the tagged text 580 has a storage 582 corresponding to the "head" data which can be found in the stream 584. The data stream 864 holds data corresponding to the table of contents (TOC), abstract, and other portions of the MPML tagged text which are not part of the main body of the document.

Also seen below the storage 580 of the tagged text is a body storage 586 which is the top node of a parse tree holding the parsed, tagged text of the body of the MPML document. As shown, the body storage 586 has a <H1> node 588. Below the node 588 is a <B> node 590 which has a text stream 592 containing text that has been tagged with the styles of node 590 and 588. Similarly, the body storage 586 has a node 594 holding a <P> tag. Below this node in the tree is a node 596 which holds <U> tag indicating that the text below it should be underlined. Below the node 596 on the tree is a stream of text 598 which is formatted as tagged by the node 596 and the node 594.

Also below the node 594 is a node 600 with a tag <WA> indicating a wrap advertisement style for an embedded object. As shown an object 602 is placed in a leaf node below node 600. The object 602 contains object data 604 and an object bitmap 606 as is standard in the OLE structured storage system. Also found below the node 594 is a text stream 608 which holds text formatted in the <P> style. Thus, FIG. 7 illustrates the structure of a parsed document after it has been linked to a title by a publisher.

After a content object is published to the data center 242 (FIG. 3), it is stored in the COS server (such as 246a) and is transferred to the IR system 398 in a parsed document structure format exemplified in FIG. 7. Note, however, that the find properties are stored in the IR system 398, but are not stored in the COS server 246.

2. Title Designer Subsystem

This section describes a portion of the MPS title design environment, with emphasis on the Search Object Editor tool 189 (FIG. 2).

a. Search Object (Magnet) Editor

The Search Object Editor 189 (FIG. 2) is a modified version of the customer Find Dialog 690 (shown in FIG. 10 and further described in the Customer Query Resolution section hereinbelow). Since the Search Object Editor 189 is to be used by designers for title construction, there are a few differences:

The Search Object Editor 189 is a modal dialog that behaves as the property sheet of a Search Object in the title designer. In the presently preferred embodiment, the Search Object Editor does allow the designer to "Find Now" and test the query. After the criteria has been entered, the dialog is either committed with "OK" or dismissed with "Cancel".

The "In:" checkboxes give the designer more precise control than the customer when retrieving stories.

In comparison to the "Look In:" field that appears in the Find Dialog and denotes what finished title(s) to search, the "Source:" field specifies the repository (root content folder) of stories to search for stories to be flowed into a title. These sources are accessed via the "More . . . " option at the bottom of the dropdown that launches a tree view of all content sources on the MSN 122. These sources are only visible to title designers and do not appear to the general MSN public.

The search may be limited to retrieve no more than a certain number of stories to prevent a section from running too long. The designer simply specifies a maximum number in a provided spin control.

b. Title Structure

Figure 8:
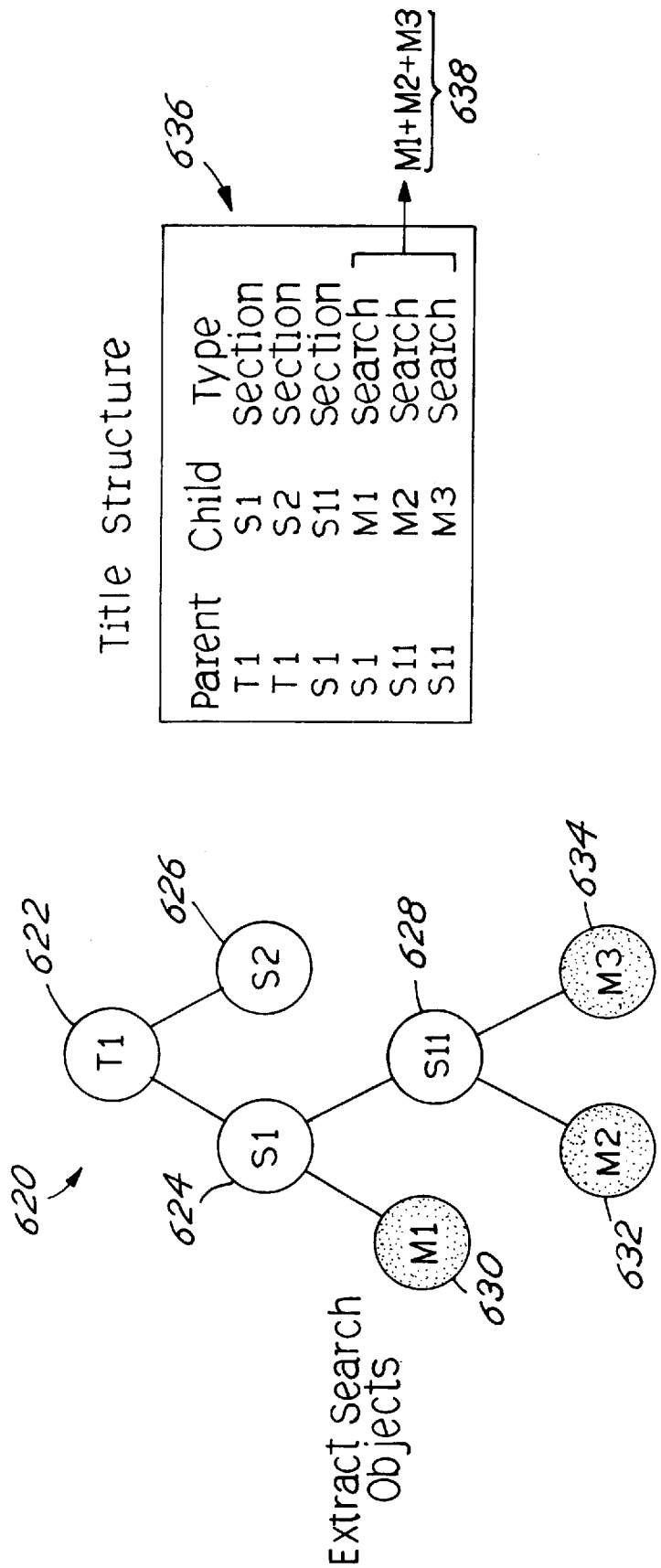
FIG. 8 is a diagram of an exemplary title tree generated at the viewer component shown in FIG. 2.

Referring to FIG. 8, an exemplary title tree 620 will now be described. A title tree is an in-memory representation of objects of a title in the MP system 100, wherein the objects are streams and storages in a COS. The title tree is utilized by the viewer component 202 to facilitate the viewing of a title by the customer. The title tree 620 comprises a root node and a series of nodes arranged below the root in a tree format to present a hierarchy of information. A tree is a well known software data structure. Each of the title, the sections, the subsections (if present), the search objects and the roots of the stories are the OLE storages, previously described. Each of these storages has a GUID assigned to it. Beneath a story root is the parsed tree representation of content that has been stored to a COS, i.e., the MPML parse tree as described in conjunction with FIG. 7.

At the base of the MPML parse tree are nodes, known as leaf nodes, that are the streams that store the data, such as text or embedded objects. Other leaf nodes are search objects, as shown in FIG. 8. Nodes above the leaf nodes are the storage nodes.

The title tree begins with a title root 622. Associated with the title root 622 is a GUIDa that uniquely identifies the title. Below the root, at the next level of the title tree, are a series of sections. Section 1 is represented by a node 624 and has a GUIDb associated with it that uniquely identifies the section. Section 2 is represented by a node 626 and has a GUIDc associated with it. Section 1 further has a Subsection 11 represented by node 628 and has a GUIDd associated with it.

In this example title tree 620, Section 624 has a Search Object M1 represented by node 630. Subsection 628 has a Search Object M2 represented by node 632 and a Search Object M3 represented by node 634.

As shown in FIG. 8, the relationships between the title, section, subsections and search objects are captured in a table 636. The use of tables in the IR system 398 (FIG. 5) will be discussed below. The IR system 398 utilizes the title layout relationships and the search objects 638 extracted from the title tree to resolve the search objects.

C. Viewer at Designer Functions

The publisher is able to view a title at the designer environment 194 (FIG. 2). Certain functions of the viewer 202 are available in the designer environment 194 to facilitate for example, the testing of how a title would appear to an end user. The publisher can check the operation of the search objects in the designer environment 194. The designer environment 194 includes an expanded version of the Find dialog to allow a User Query (Find) to be tested.

D. Top level Viewer Process

Figure 9:
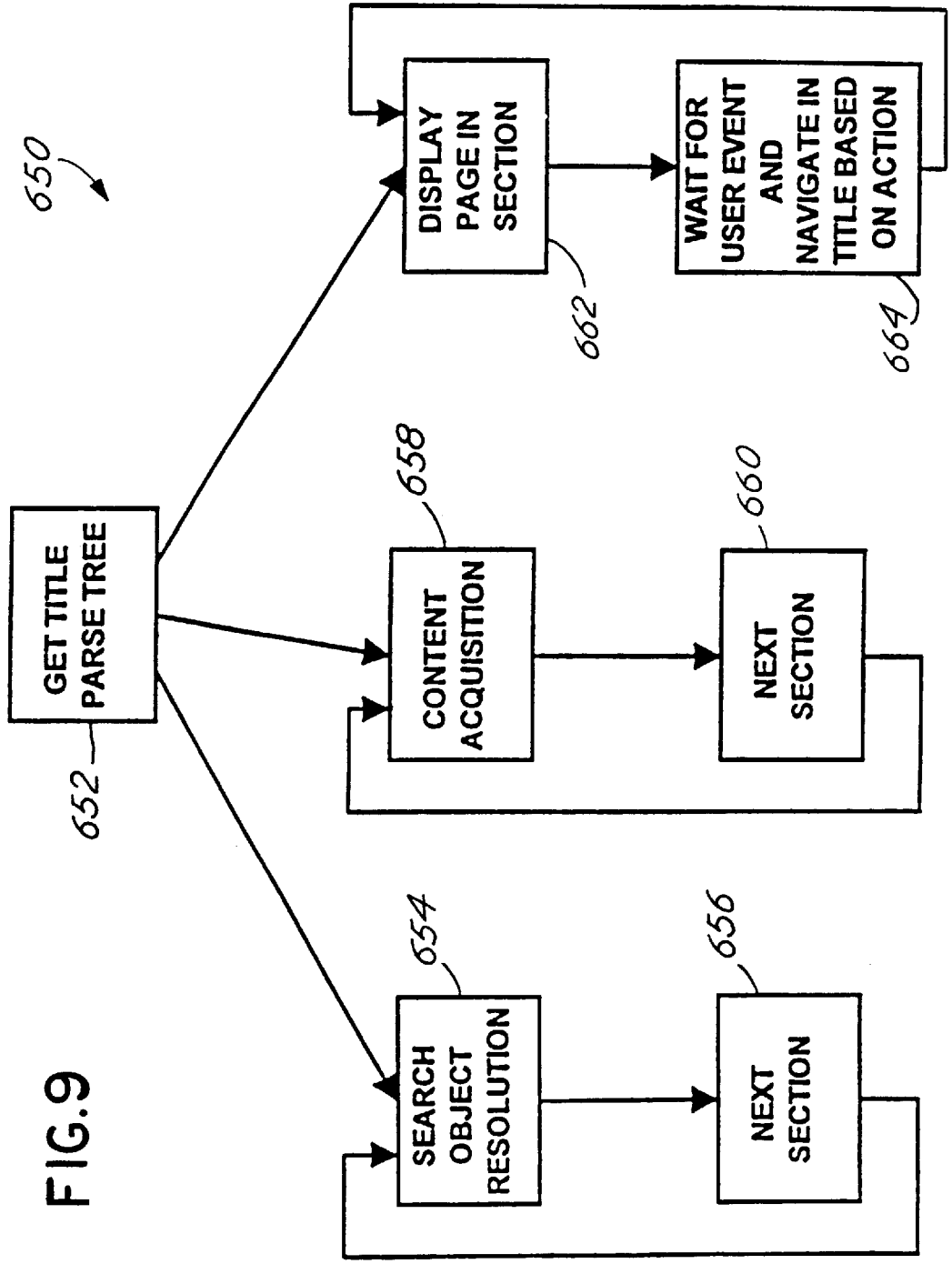
FIG. 9 is a top level flow diagram of the viewer process for the viewer component shown in FIG. 2.

Referring now to FIG. 9, a top level flow 650 of the viewer processes for viewing a title will be described. The viewer 202 (FIG. 2) at the customer computer begins at a state 652 by creating a title parse tree, such as title tree 620 (FIG. 8). Next, a set of parallel threads are spawned.

The first thread begins at state 654 wherein the first section having a search object is accessed and the search objects in that section are resolved. Search object resolution is described in conjunction with FIGS. 11, 12, 17 and 18. Moving to state 656, the next section having search objects is accessed and the thread loops to state 654 to resolve the search objects in that section. The first thread ends when all the sections having search objects are processed.

The second thread begins at state 658 wherein the first section having a valid page to view is accessed and the content objects in that section are acquired. A content parse tree is acquired from either the title, the local COS 402 (FIG. 5) or the COS server 246. Moving to state 660, the next section (or subsection) in the title is accessed and the thread loops to state 658 to acquire the content in that section. The second thread ends when all the sections having content are processed.

The third thread begins at state 662 wherein the first section having a valid page to view is accessed and the first page in that section is displayed. If this page included search objects, the results of resolving the search objects and acquiring the content are flowed into the dynamic control associated with that search object. Moving to state 664, the viewer 202 waits for the customer to select an action, such as "go to next page" or "go to section XYZ". The viewer 202 processes the action, navigates to the part of the title indicated by the user action and determines which page is to be viewed. The third thread loops to state 662 to display the new page as determined at state 664. The third thread ends when user completes viewing the current title.

Further disclosure of the preferred viewer operation is provided in a copending application also assigned to the assignee of the present application, Microsoft Corporation, entitled "MULTIMEDIA PUBLISHING SYSTEM", Ser. No. 08/503,343, filed on Jul. 17, 1995.

E. Customer Query

Figure 10:
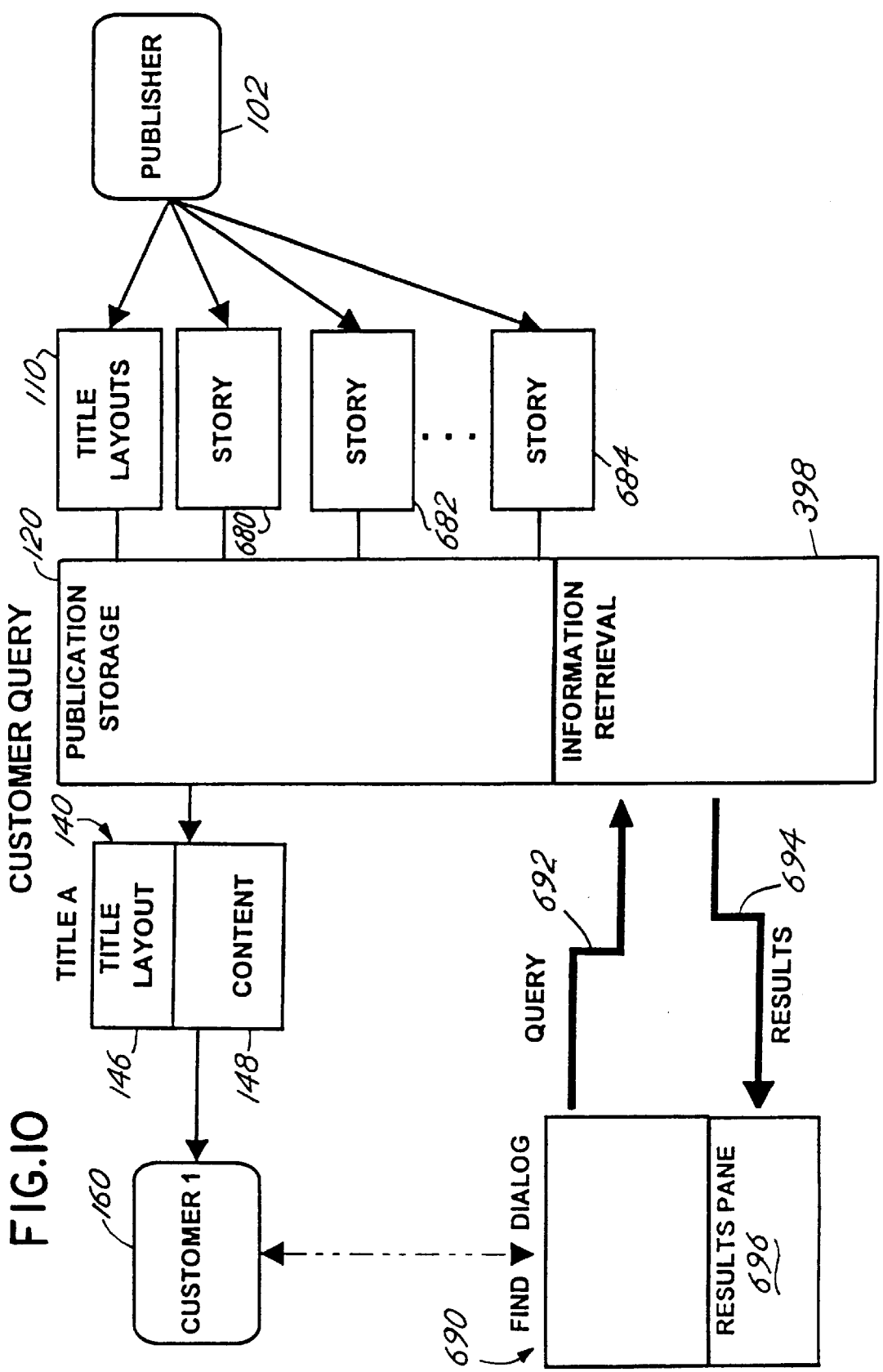
FIG. 10 is a diagram illustrating a query performed by the customer using a "Find" dialog on the system shown in FIGS. 1 and 5.
Figure 23:
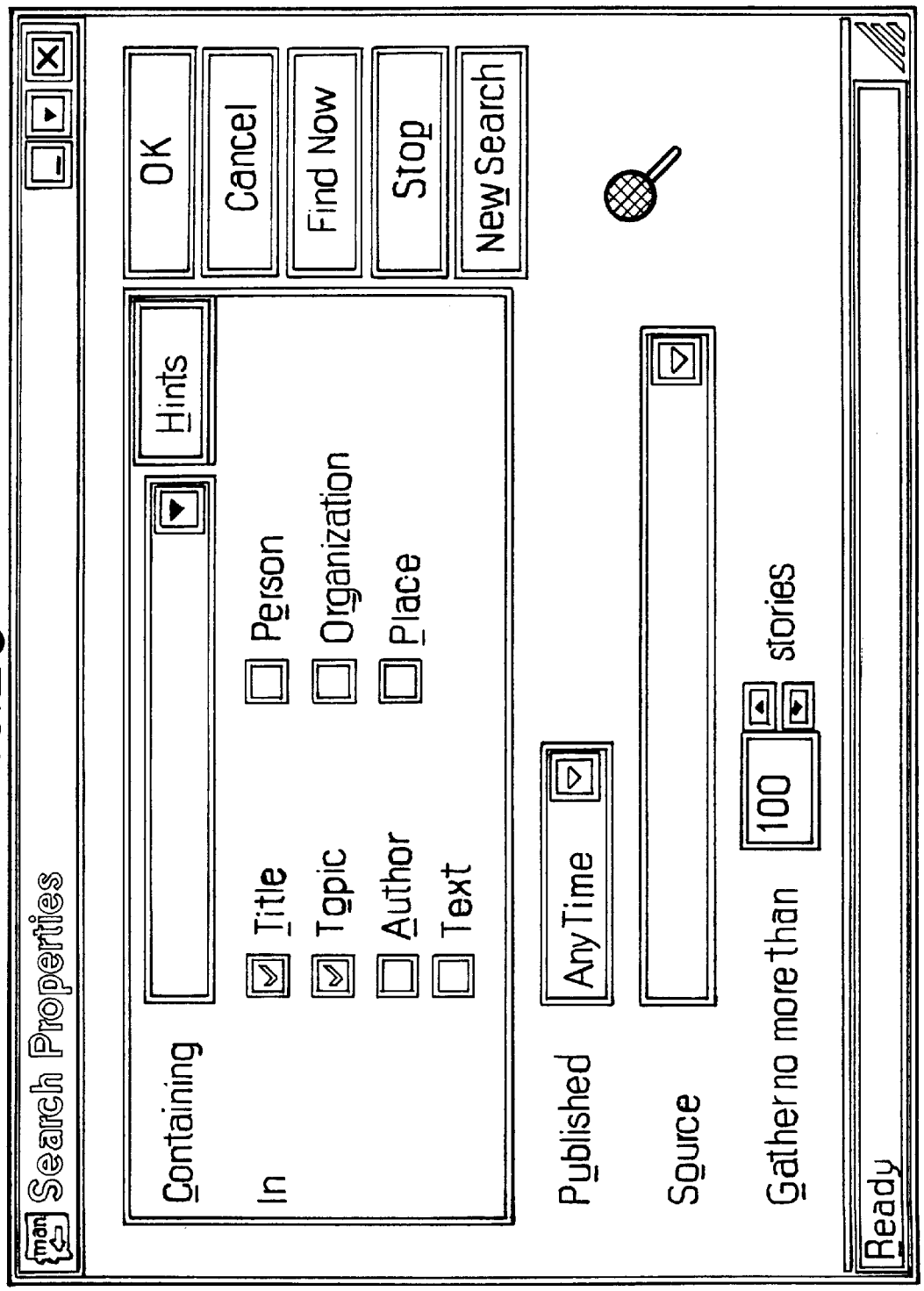
FIG. 23 is a diagram of an exemplary search properties screen display which is displayed by the publisher shown in FIG. 2.
Figure 24:
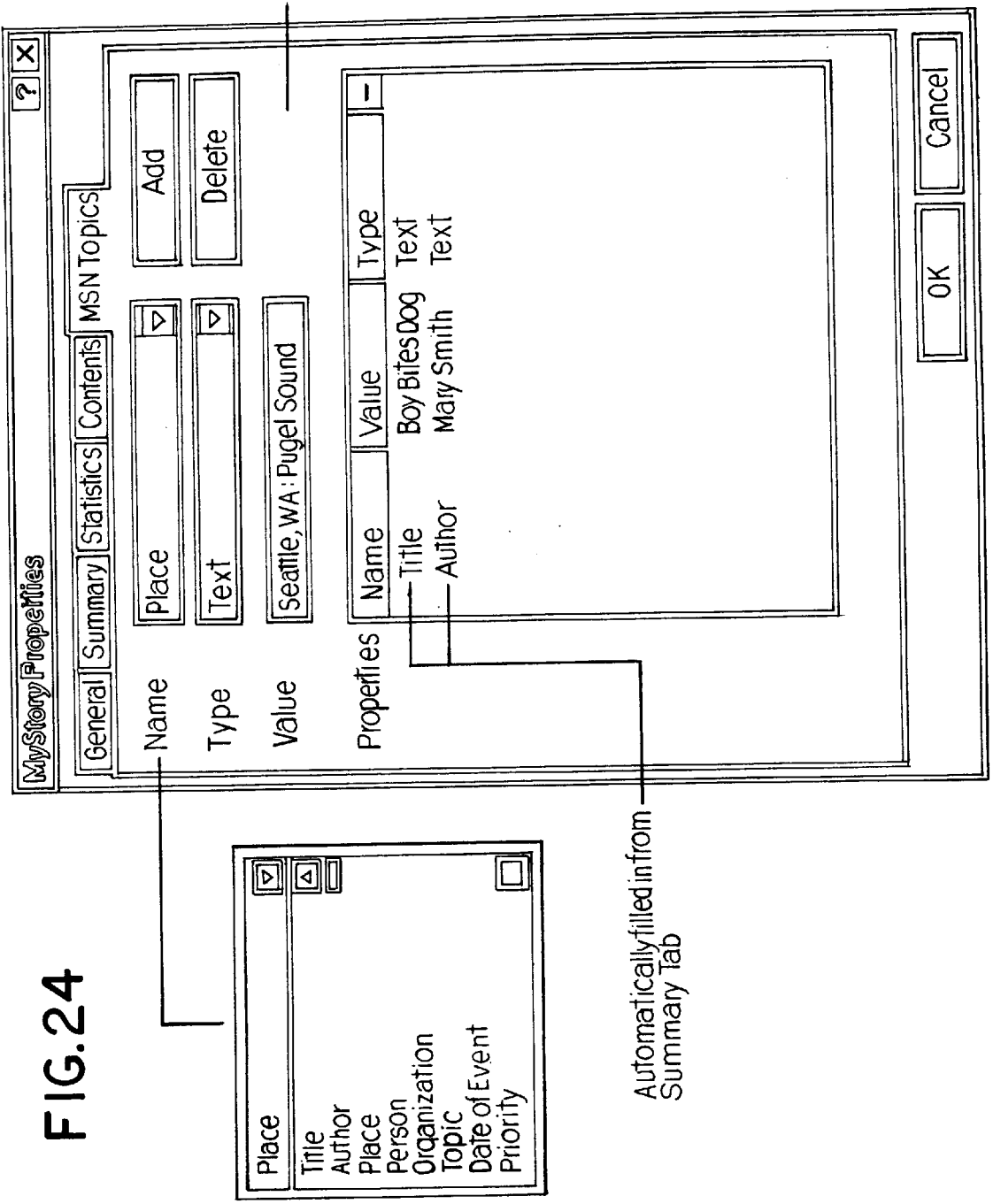
FIG. 24 is a diagram of an exemplary document editor's properties dialog screen display which is displayed by the publisher shown in FIG. 2.

Referring now to FIG. 10, a query path from a "Find" dialog through the information retrieval system 398 to the content database at the publication storage 120 will be described. The query components for both publishers 102 and end-user customers 160 are defined as follows: a MPS Document Editor Properties dialog—for tagging content with keywords to aid in retrieval (see FIG. 24); a Search Object Editor—for title designers to create and modify search objects (also known as information magnets) (see FIG. 23); and a Find dialog 690—a customer interface for ad-hoc and saved searches (see FIG. 22).

Content, such as stories 680, 682 and 684, is tagged using the MPS Document Editor's Properties dialog and is placed in the MPS content database in the publication storage 120. Content is then further passed on to the Information Retrieval system 398 for indexing. Search objects gather stories which match a particular criteria (as defined in the Search Object Editor) and "flow" them into the appointed sections of a title in the Viewer 202 (FIG. 2). The Search Object Editor is the query tool which designers use to define search objects that are used to retrieve and flow relevant stories into the title. The customer 160 uses the Find Dialog 690 within the MPS Viewer 202 to issue one or more user queries 692 against all the stories of a particular title (i.e., those stories the title has retrieved using one or more search objects or static stories placed in a title).

The queries 692 issued by the customer 160 in the Find dialog 690 are joined with the criteria of the title's searches due to the search object(s) and then the aggregate is queried against the content database in the publication storage 120 and the IR system 398. Results 694, including GUIDs (representative of stories matching the queries and search objects) and properties, are transmitted back to the customer and appear in a results pane 696 of the Find dialog 690. Combining the query 692 with the search object queries restricts the results to be within the title structure rather than from any arbitrary source in the content database. The Find dialog 690 does allow the customer to select one or more titles other than the title the customer is currently viewing. In this situation, the search objects for these titles are resolved and joined with the customer's query criteria.

F. Viewer Search Object and User Query Flow

Figure 11:
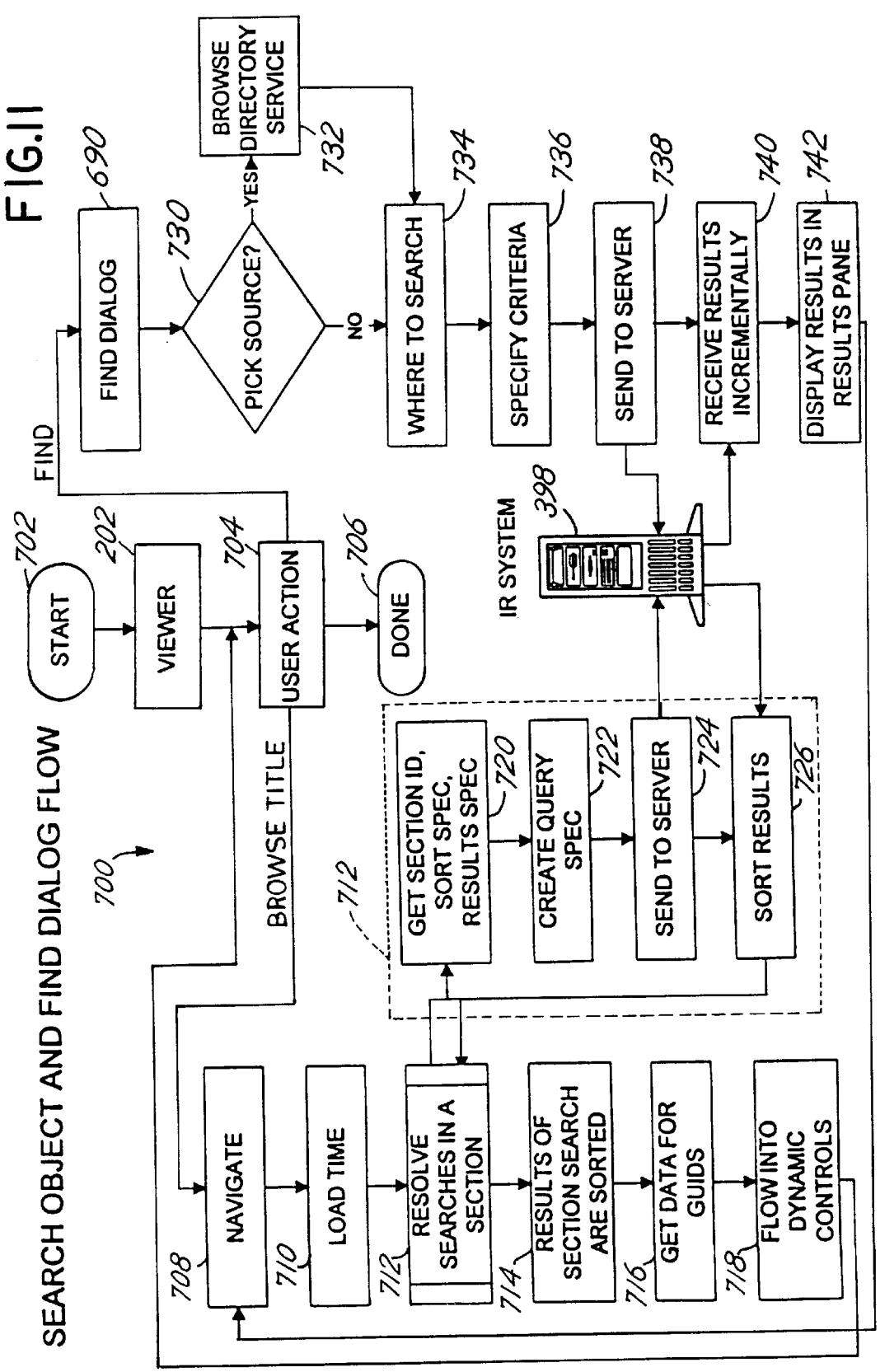
FIG. 11 is a flow diagram of the viewer interaction with the IR system as shown in FIGS. 5 and 10.

Referring now to FIG. 11, the presently preferred interaction of the viewer 202 with the IR system 398 as flow diagram 700 will be described. FIG. 11 expands on the viewer operation described in FIG. 9, and additionally includes a user query (Find) flow.

Beginning at a start state 702, the viewer component 202 (FIG. 2) is invoked. As previously described, the viewer 202 is located at the customer computer 182, but certain viewer functions are also available at the publisher workstation to allow, for example, the publisher to view titles within the designer environment. Moving to state 704, the viewer 202 determines what action is selected by the customer. The customer may choose to browse a selected title (starting at state 708), to perform a user query (Find dialog 690) or terminate the viewer 202 at state 706. The Find dialog 690 for a user query may be invoked within a selected title or it may started without having selected a title (which utilizes a separate application program).

Figure 12:
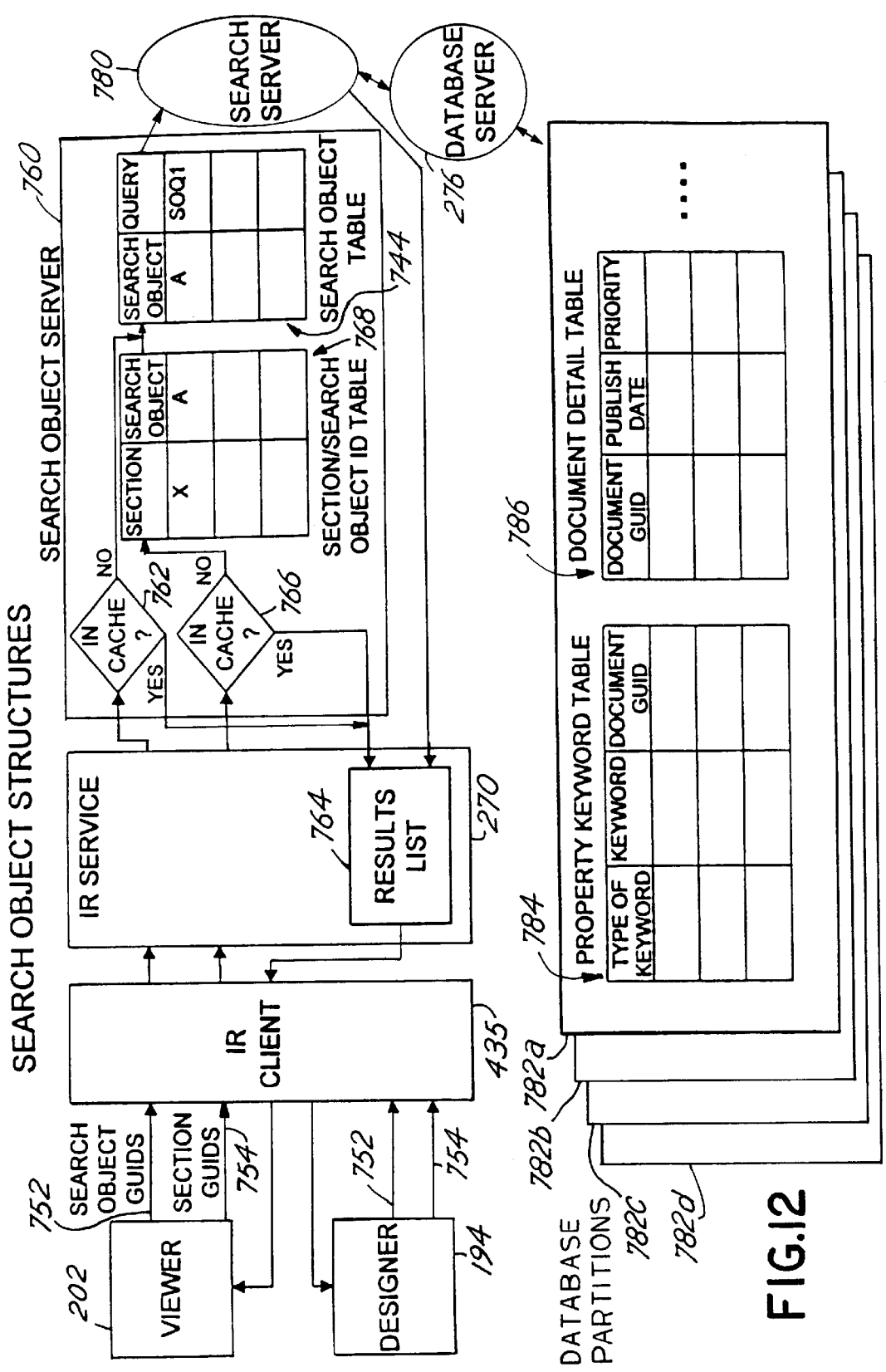
FIG. 12 is a diagram of the IR system data structures and servers associated with search objects.

If the user desires to browse the title, the viewer 202 navigates to the first section with a valid page to view at state 708. Moving to state 710, the viewer accesses the current section and retrieves all search objects in the section (if present). Proceeding to function 712, the search objects in the current section are resolved by the IR client services 435 (FIGS. 6, 12). The operation of the IR client 435 for function 712 is discussed hereinbelow. The IR system operation for resolving search objects is discussed in conjunction with FIGS. 17 and 18. Continuing at state 714, the IR client 435 sorts the results of the search object resolution for the current section. When a search object finds content objects matching the search object criteria, it returns a GUID and selected find properties, e.g., timestamp of publication, priority, ID of the ICP, of each content object. When all the search objects for the section are resolved, the IR client 435 preferably sorts the selected properties of the content objects by a predetermined set of properties. In the preferred embodiment, the IR client 435 uses the priority and timestamp properties for the sort. Moving to state 716, the content object data corresponding to the returned GUIDS is acquired by the viewer 202. The content object data is then flowed into the dynamic controls for the current section at state 718 and the first page in the section is displayed to the user. The viewer then loops to state 704 to await the next user action.

The above text described search objects placed in a section. In another embodiment, an MPS control (within an MPS page) can have a search object affiliated with the control. This capability allows the search object results to be sorted at a control level of granularity, rather than at the section level, as described above.

Returning now to function 712, the IR client 435 (FIGS. 6, 12) performs states 720–726 to resolve the search objects in the current section. At state 720, the IR client 435 gets the GUID of the current section, a sort specification and a results specification from the viewer 202. The sort specification determines how the search object results are sorted for the current section. The results specification determines the properties of interest, such as, for example, the content object GUID, context information, and subject of the content object. In the present embodiment, the results specification is predetermined to be ICP ID, content object GUID, priority, and content object modification date and is coded into the viewer software. In the present embodiment, the sort specification is predetermined to be the publish timestamp and priority (both of which are find properties) and is coded into the viewer software. Of course other attributes could be used for the sort specification and results specification. Moving to state 722, a query specification is created based on a set of criteria for the search object chosen by the publisher and one or more sources (root content folders) on which the criteria is evaluated. The query specification is parsed into a tree structure. The parser is further described in the Customer Query Resolution section below.

Continuing function 712 at state 724, the search object query is sent to the IR system 398. The results of the search object query are returned to the IR client 435 and collected at state 726. The states 720–726 are repeated for each search object in the current section. The results of each of the search objects in the current section are then passed on to state 714, as previously discussed.

If the user desires to issue a user query, the viewer 202 invokes the Find dialog 690. The Find dialog uses an IRFind DLL. Moving to a decision state 730, the viewer 202 determines if the user desires to pick the title(s) on which to search against. If viewing a title and the user desires to redirect the search to another or different titles, the viewer 202 proceeds to state 732 wherein a MSN content tree (directory service) containing only MPS services and titles is preferably presented to the customer. The customer can browse the directory service and select one or more titles for the search. Returning to decision state 730, if the customer is viewing a title and does not desire to redirect the search, i.e., the search is to be done on the current title, or at the completion of state 732, the viewer 202 proceeds to state 734.

At state 734, the user selects the portions of a content object, such as an article, on which the search is to be performed. In the preferred embodiment, the user can select one or more of the following portions of the content object to be searched: Title, Keywords, and Text. Continuing at state 736, the user specifies a boolean text search expression, e.g., published date, as the search criteria. The search expression is further described in the Customer Query Resolution section below. State 736 is presently implemented by a FindView class. Moving to state 738, the title(s) and selected portions of the content objects to be searched along with the search criteria are sent to the IR system 398 as the user query. States 738 and 740 use an IRCS DLL. State 738 is presently implemented by CCMDQuery::Execute( ), wherein the format is Class::optional NestedClass::Function. As hits against the user query are determined by the IR system 398, the result are incrementally sent back to the Find dialog 690 at state 740 and are displayed in the results pane 696 (FIG. 10) of the Find dialog at state 742. State 740 is presently implemented by CCM-DQueryExec::HandleRcvdObj. In the preferred embodiment, the results include the title field of the content object, such as an article, the source (title) of the article and the time of publication of the article. The Find dialog user interface is further described in the Customer Query Resolution section below.

As results are displayed in the results pane at state 742, the customer can select one of the articles, for example, and instruct the viewer to navigate (at state 708) to the section of the current title containing the article or to go to the corresponding title and section of the selected article if the article is not in the current title (if being viewed).

G. Search Object Structures

Referring now to FIG. 12, the internal structures of the IR server 272 (FIG. 3) used in resolving search objects will be discussed. The IR server 272 has two major components: a search object server 760 and a search server 780. These components are described below.

A search object query may be initiated by the viewer 202 at the customer site 160 or the designer 194 at the publisher site 102, both of which are shown in FIG. 2. The designer 194 includes functions of the viewer. The publisher creates the search objects at the designer 194 and may desire to test the operation of the search objects, for which the viewer functions are utilized, for example. As discussed in conjunction with FIG. 11, when a title is viewed, search objects defined by the publisher in the title need to be resolved. If the title is not divided into sections, the viewer 202 (or the designer 194) sends a list of one or more search object GUIDs 752 to the IR client 435. The viewer 202 (or designer 194) also sends the sort specification and results specification, described in conjunction with FIG. 11, to the IR client 435. The sort specification is used by the IR client 435 to sort the incoming results from a results list 764.

The IR client 435 then passes the search object GUIDs 752 on to the IR service 270, which sends the GUIDs 752 to the search object server (SOS) 760. The IR client 435 and IR service 270 function to provide the software to communicate across the network between the client computer (e.g., at 160, 102) and the IR servers. The IR client resides on the client computer.

Figure 20:
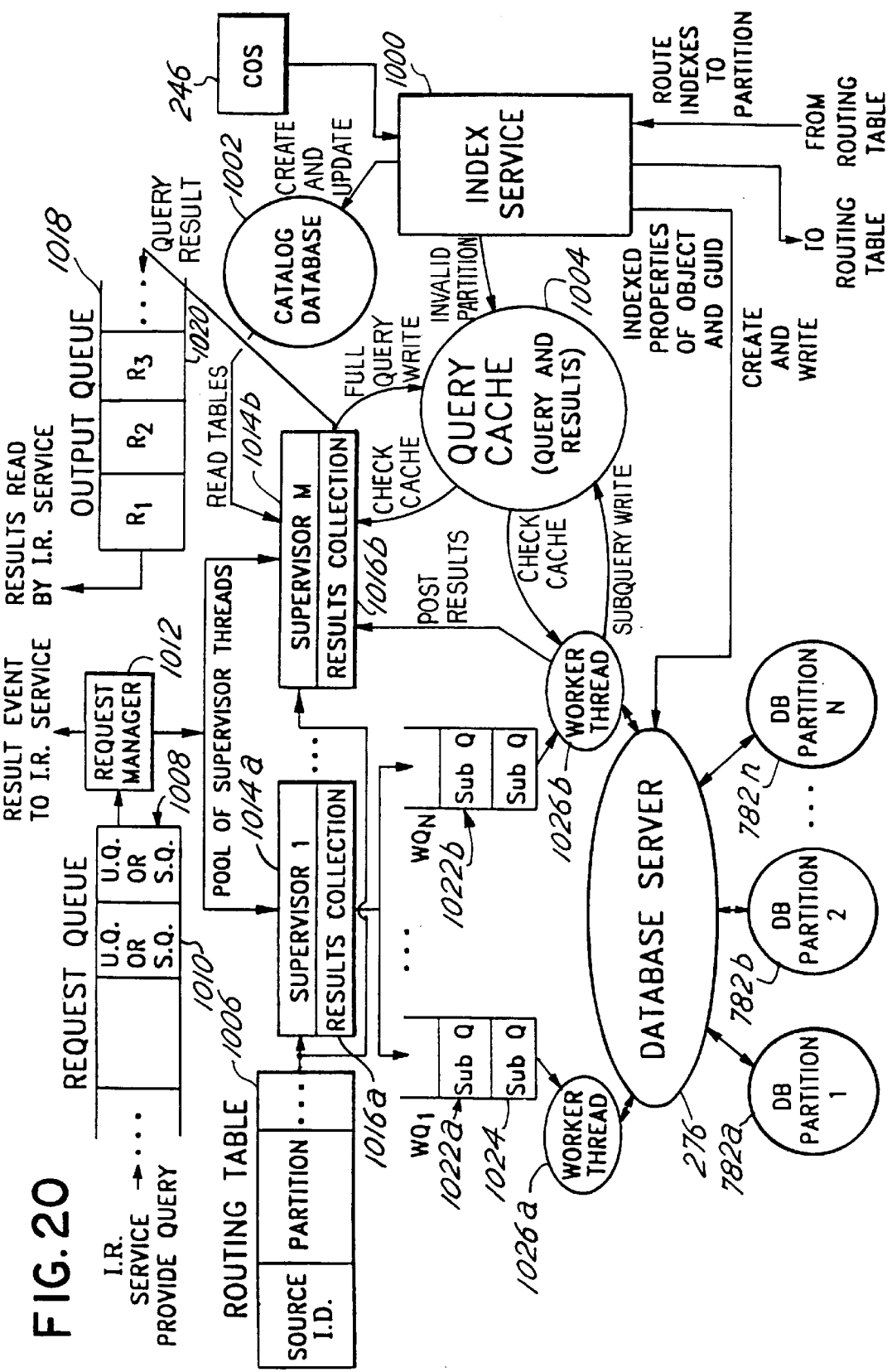
FIG. 20 is a diagram of the components and structures of the IR system shown in FIGS. 3 and 5.

When the search object GUIDs 752 are received at the SOS 760, a check is made at a decision state 762 to determine if the search objects have been previously resolved and are stored with their results in a query cache 1004 (FIG. 20). If so, the results, which include GUIDs and properties of the matching content objects, are sent from the query cache 1004 to the results list 764 in the IR service 270. The results list 764 is sent back through the IR client 435 to the source of the search object query, viewer 202 or designer 194. The use of the query cache 1004 (FIG. 20) provides many performance advantages. For popular MPS titles, the search object query and the query results will likely be in the query cache, thus eliminating having to access the search server 780, database server 276 and database partitions 782.

Alternatively, if the title is divided into sections, the viewer 202 (or the designer 194) sends a GUID 754 for a section containing search objects through the IR client 435 and the IR service 270 to the SOS 760, as described above. Not that only sections that have search objects have their GUIDs sent to the IR. When the section GUID 754 is received at the SOS 760, a check is made at a decision state 766 to determine if the search objects in the section 754 have been previously resolved and are stored with the search object results in the query cache 1004 (FIG. 20). If so, the results, which include GUIDs and properties of the matching content objects for the section GUID 754, are sent to a results list 764 in the IR service 270. These results list 764 is sent back through the IR client 435 to the appropriate requester, viewer 202 or designer 194.

If the decision state 766 is false, i.e., the search objects and the results of the search objects for the section GUID 754 are not in the query cache 1004, the section GUID 754 is used to access a Section/Search Object ID table 768, which is a part of the Container table in the catalog database 1002 (FIG. 20). The Container table will be further described in conjunction with FIG. 14. The section GUID is used to access the Section/Search Object ID table 768 to locate all search objects in a particular section. Each search object is then mapped to the search object query by a Search Object table 774. An alternate path to the Search Object table 774 is from decision state 762 if the search objects and search object query results are not in the query cache 1004 (FIG. 20). Each search object includes a search criteria and a source list, i.e., a list of one or more sources (root content folders) on which the search criteria is executed.

Figure 21:
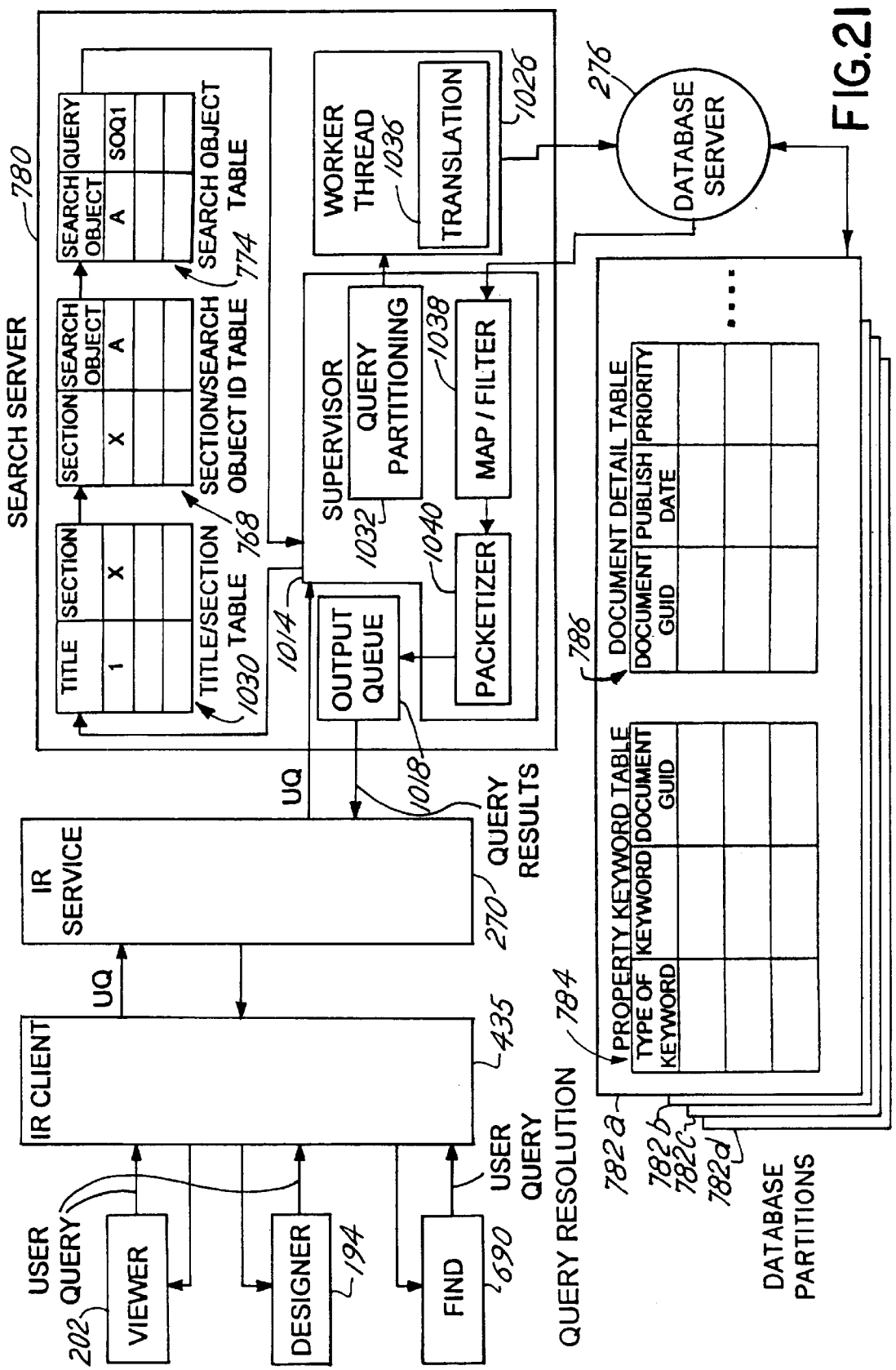
FIG. 21 is a diagram of the IR system data structures and servers associated with a customer query.

The search object query is then sent to the search server 780 which provides one or more subqueries to the database server 276. The query is partitioned in a query partitioning function 1032 (FIG. 21) based on the search criteria and sources. Each subquery is assigned to a worker thread 1026 as shown in FIG. 21. The worker thread includes a translation function to translate a general form of the query into a server specific query. The server specific query is fed to the database server 276 by the worker thread.

The database server 276 uses the indexes of the query to access tables, such as a Property Keyword table 784 and a Document Detail table 786, stored in a number of database partitions 782. The database is segmented into partitions for efficiency. The database server 276 accesses the specific tables using the indexes provided in the query and returns search results in the form of content object GUIDs and properties to the search server 780. The query results are passed out of the IR server 780 to the client computer via the IR service 270 and IR client 435, as previously described. Information (properties) about the retrieved stories such as title and date are presented to the source of the user query, i.e., the viewer 202 or designer 194.

V. CONTENT INDEXING

After a title is published to the MPS COS server 246 (FIG. 3) at the data center 242, the title is transmitted to the IR system 398 (FIG. 5). A portion of the IR system 398 includes an index service 1000 (FIG. 20), which could reside on IR server 272a, an indexer server, for example. This section begins with a description of the data center view of the publishing process as it concerns the IR system followed by a description of the indexing process.

A. Title Publishing

Figure 13:
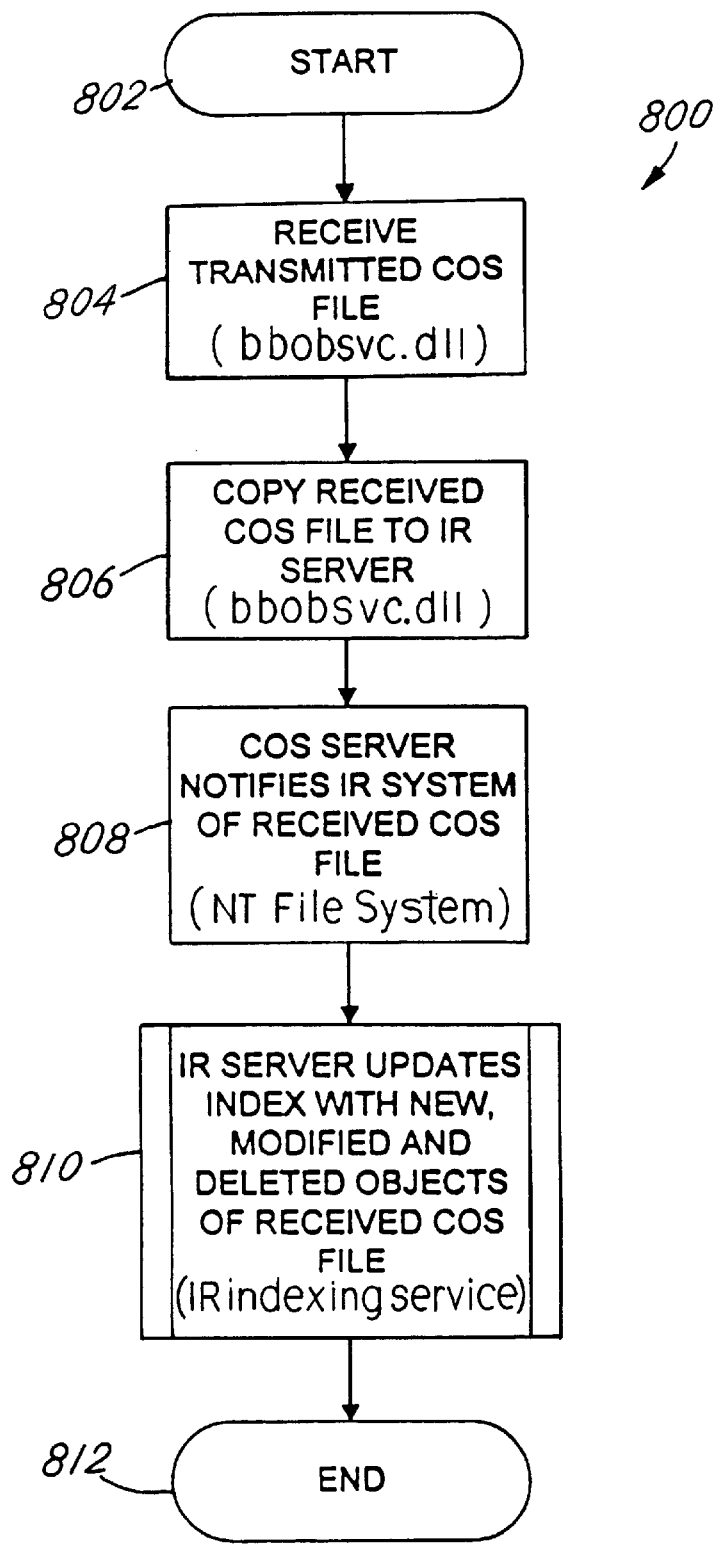
FIG. 13 is a flow diagram of a title publishing process at the IR system of FIG. 5.

Referring now to FIG. 13, the IR system view of the title publishing process 800 will be described. Beginning at a start state 802, the process 800 moves to state 804 wherein the COS server 246 (FIG. 3) receives the COS file transmitted from the publisher 102 (FIG. 2). This state uses the BBOBSvc DLL. Moving to state 806, the received COS file is copied to the IR server 272. This state uses the BBOBSvc DLL. In a presently preferred embodiment of the invention, the COS file is copied to a shared disk drive on the network accessed by the IR server 272. At state 808, the COS server 246 notifies the IR system 398 of the received COS file so as to begin processing the file. This state is performed by the Windows NT File System. After notification is received at the IR system at state 808, the IR server 272 updates the indexes in the database servers 276 and the IR system tables with any new, modified or deleted objects of the received COS file at process 810. This process is the IR indexing service and uses the IRIX and IRUTS DLLs. After the indexes and tables are updated at process 810, process 800 completes at an end state 812.

B. IR Indexing

Figure 14:
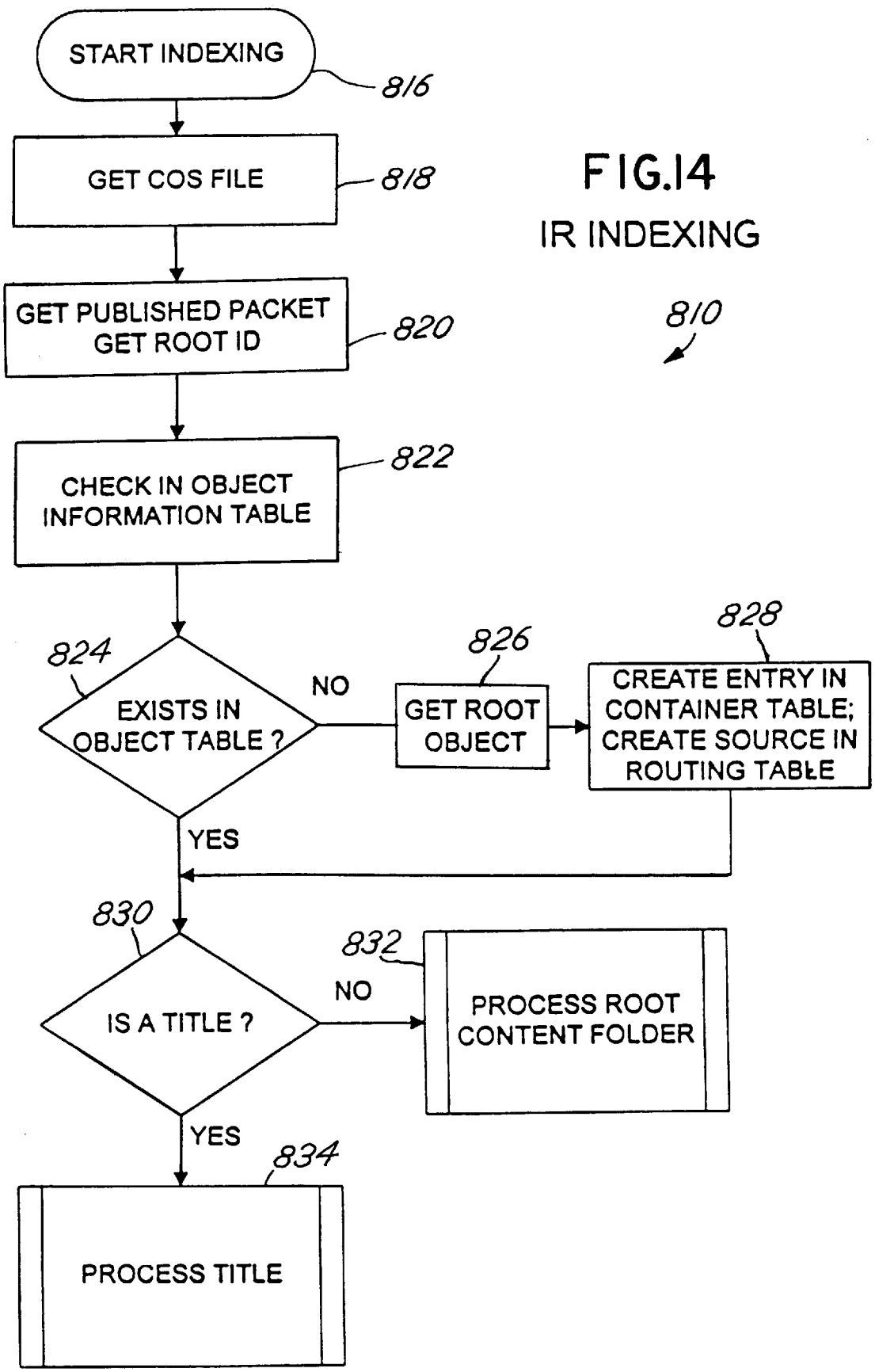
FIG. 14 is a flow diagram of the IR indexing process shown in FIG. 13.
Figure 15:
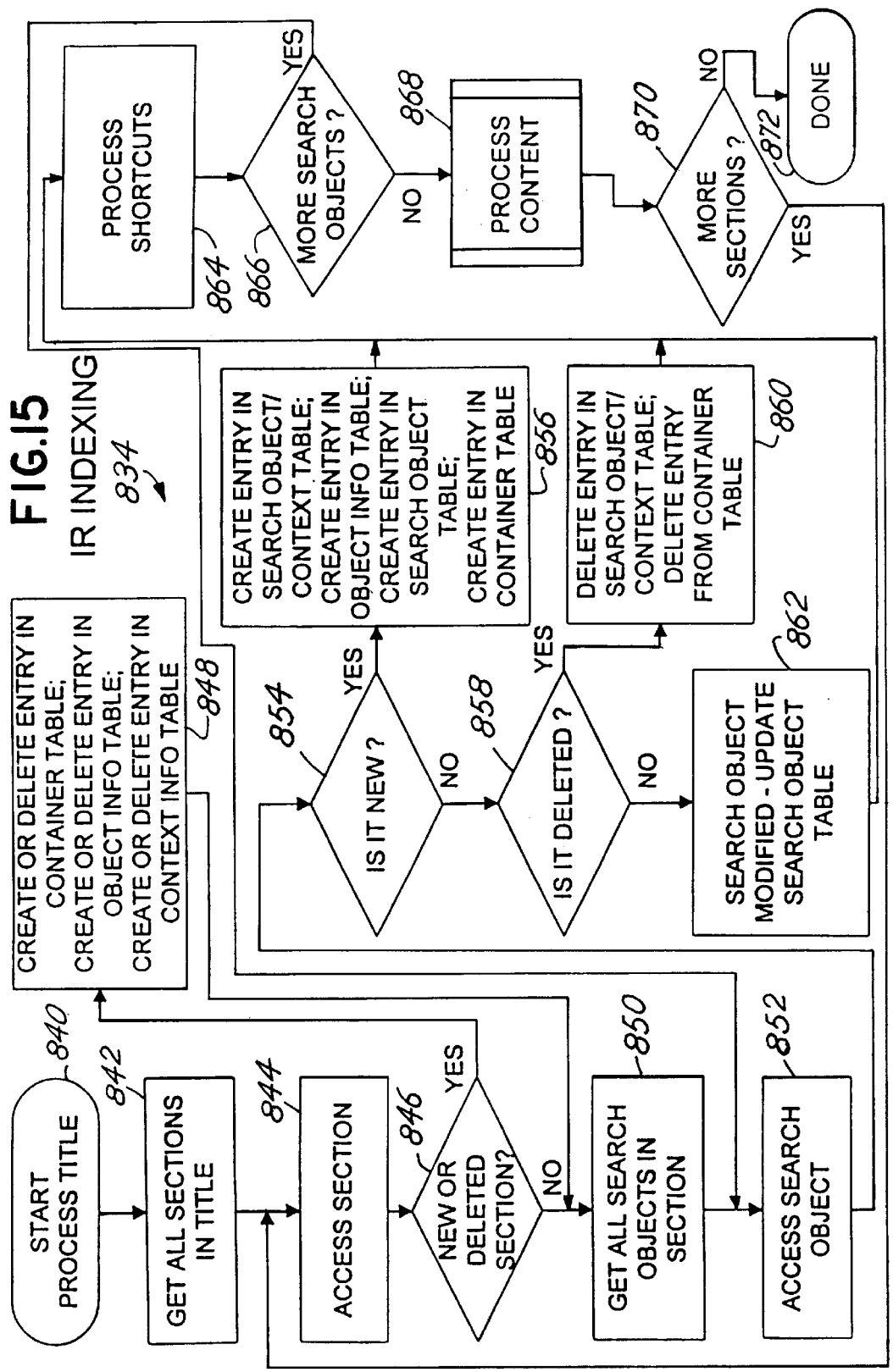
FIG. 15 is a flow diagram of the process title function shown in FIG. 14.
Figure 16:
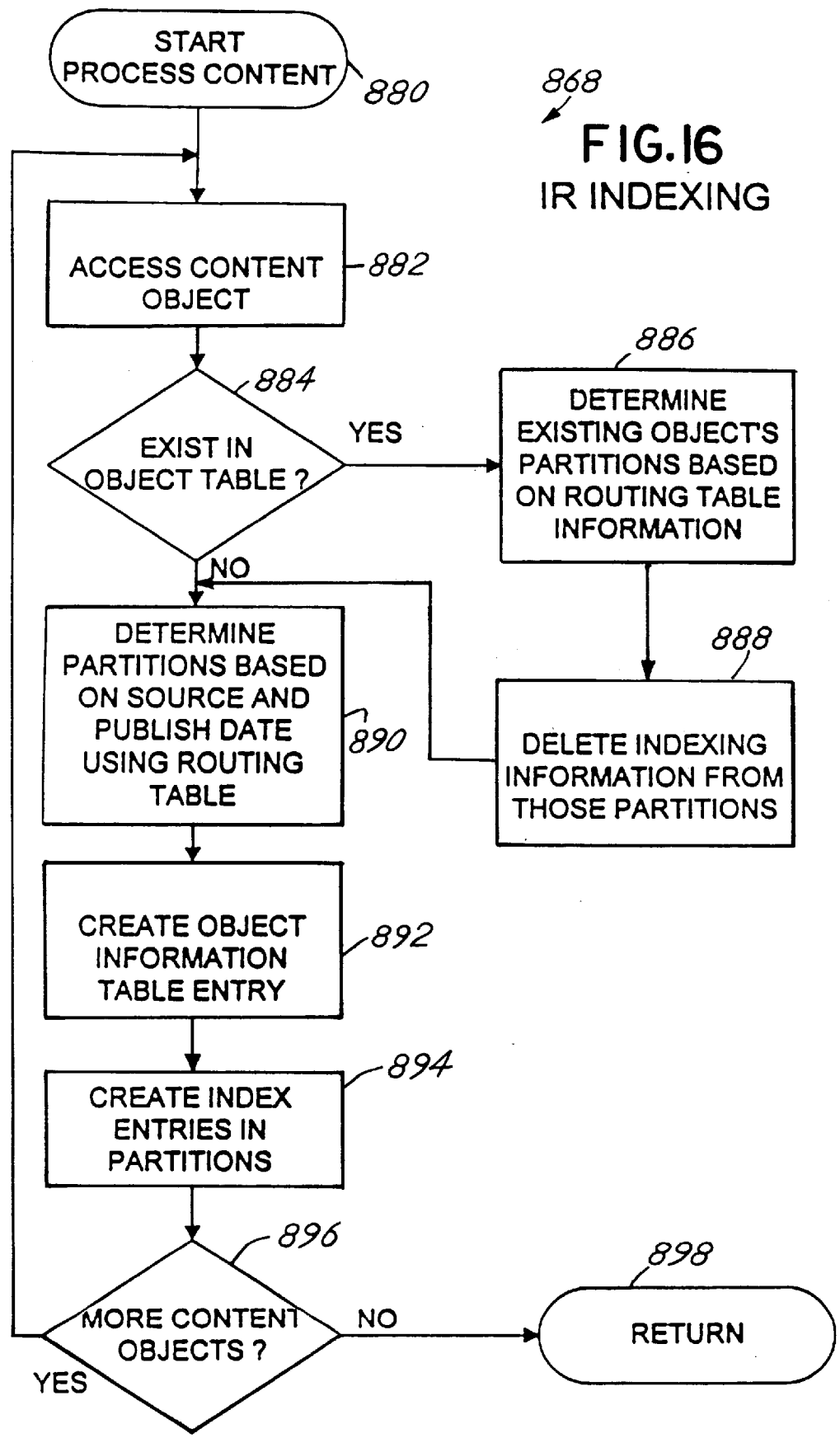
FIG. 16 is a flow diagram of the process content function shown in FIG. 15.

Referring now to FIGS. 14–16, the IR indexing process 810 to index a COS file will be described. Process 810 uses the IRIX DLL and the IRUTS DLL. Beginning at a start state 816 on FIG. 14, the process 810 moves to state 818 to access the published COS file. State 818 is presently implemented by CBBXParser::UpdateIndexFromCOS. Proceeding to state 820, the process 810 obtains the published packet which is a property of the published COS file. The packet includes the root ID (a GUID) of the title or root content folder and the ID of the publisher or ICP. Continuing at state 822, process 810 checks to see if the root object ID is in an Object Information table, which is one of the tables of the catalog database for the IR system 398. The Object Information table is updated during the indexing process. The Object ID field contains the ID, for example, of a title or a document, such an a story. The types of objects in the Type of Object field include, for example, search object, story, title, section, root content folder and so forth. The fields of the Object Information table, along with exemplary data, are shown in Table 1 below:

TABLE 1

OBJECT INFORMATION TABLE

| Object ID | Source ID | ICP ID | Publish Date | Type of Object | Context ID (DWORD) |
|---|---|---|---|---|---|
| 100 | 1500 | 300 | 10/10/95 | Document/ Story | 1000 |
| 500 | 1501 | 300 | 10/10/95 | Search Object | 1200 |
| • | | | | | |
| • | | | | | |
| • | | | | | |

If decision state 824 determines that the root ID is not in the Object Information Table, the process 810 moves to state 826 and gets the root object from the COS file. State 824 is presently implemented by CBBXParser::IndexCOS1. Proceeding to state 828, process 810 creates an entry for the root object in the Container table, which is one of the tables of the catalog database for the IR system 398. The fields of the Container table, along with exemplary data, are shown in Table 2 below:

TABLE 2

CONTAINER TABLE

| Relation | Root Container GUID | Container GUID | Containee GUID | Context ID |
|---|---|---|---|---|
| Title-Section | 1501 | 1501 | 8000 | 1011 |
| Section-Search OBJ | 1501 | 8000 | 8010 | 1011 |
| Title | 800 | 800 | 000 | 1000 |
| • | | | | |
| • | | | | |
| • | | | | |

The Relations field is used to define the relationship between the Container and Containee fields, such as, for example, title to section, section to subsection, section to search object, title to search object, and so forth. In the presently preferred embodiment, the Root Container field contains the GUID for a title or a root content folder.

Also at state 828, a source in a Routing table is created. The fields of the Routing table, along with exemplary data, are shown in Table 3 below:

TABLE 3

ROUTING TABLE

| ICP ID | Source ID | Start Publish Date | End Publish Date | Database Partition | Number of Connections that Machine Supports | Type of Index-- e.g., SQL Fulcrum |
|---|---|---|---|---|---|---|
| 100 | 1000 | 10/8/85 | 10/13/95 | Server1, DB5, Table6 | 50 | FULCRUM |
| 100 | 1000 | 10/8/95 | 10/20/95 | Server2, DB6, Table 100 | 100 | SQL Server |
| • | | | | | | |
| • | | | | | | |
| • | | | | | | |

In the presently preferred embodiment, the Source ID field in the Routing Table includes either a title GUID or a root content folder GUID. The Database Partition field may include a machine name, a database name, and portions of a table name. The Number of Connections field defines the number of parallel connections on a particular search server, where a connection is a pipe between machines.

After the completion of state 828, or if the root ID is in the Object Information Table, the process 810 continues at a decision state 830 to determine if the root object is a title. If so, the process 810 moves to a process title function 834. Function 834 is presently implemented by CBBXParser-::ProcessTitle. However, if decision state 830 determines that the root object is a root content folder, the process 810 proceeds to a process root content folder function 832. Function 832 is presently implemented by CBBXParser-::ProcessRootCF.

Referring to FIG. 15, the start process title function 834 which was defined in FIG. 14 will now be described. Function 834 uses the IRIX DLL and is presently implemented by CBBXParser::ProcessTitle. Beginning at a start state 840, the process 810 moves to a state 842 to get all the sections in the title. State 842 is presently implemented by CBBXParser::CollectCosObjs. Proceeding to state 844, process 810 accesses the first section in the title. Continuing to a decision state 846, the process 810 determines whether the section is a new or a deleted section. This situation occurs if the publisher has modified the title by either adding or deleting a section to the title. If it has been determined, at decision state 846, that a new or deleted sections exists, process 810 moves to a state 848. If a new section exists, process 810 creates an entry in the Container table previously described in conjunction with FIG. 14. Also at state 848, an entry is created in the Object Information table also described in conjunction with FIG. 14. Finally, an entry is created in a Context Information table, which is one of the tables of the catalog database for the IR System 398. The Context Information table is used to map a given context (ICP ID, source ID, Section ID) to a unique DWord (four bytes), such as during a user (find) query. Fields of the Context Info table, along with exemplary data, are shown in Table 4 below:

TABLE 4

CONTEXT INFO TABLE

| SOURCE/TITLE ID | SECTION ID | ICP ID | CONTEXT ID |
|---|---|---|---|
| GUID | GUID | GUID | DWORD |
| 1000 | 1010 | 10 | 2397 |
| 1000 | 1011 | 10 | 2398 |
| • | | | |
| • | | | |
| • | | | |

If a determination is made at decision state 846 that a section is deleted, process 810 moves to state 848 and deletes the entry for that section in the Container table, in the Object Information table, and in the Context Information table. At the completion of state 848, or if it was determined at decision state 846 that a new or deleted section does not exist, process 810 moves to a state 850. At state 850, process 810 gets all the search objects in the section. State 850 is presently implemented by CBBXParser::CollectCosobjs. Moving to state 852, process 810 accesses the first search object in the section. Continuing at a decision state 854, process 810 determines if the search object is a new search object. If so, process 810 moves to a state 856. State 856 is presently implemented by CBBXParser::ProcessMagnet. At state 856, process 810 creates an entry in a Search Object/ Context table. Fields of the Search Object/Context table, along with exemplary data, are shown in Table 5 below:

TABLE 5

SEARCH OBJECT/CONTEXT TABLE

| SEARCH OBJ ID | CONTEXT ID |
|---|---|
| GUID | DWORD |
| 12875 | 2350 |
| 10999 | 2051 |
| 10999 | 2053 |
| • | • |
| • | • |
| • | • |

In addition, an entry is created in the Object Information table, previously described, and an entry is created in the Container table, also previously described. Finally, an entry is created in a Search Object table, which is one of the tables of the catalog database for the IR System 398. The Search Object Query field contains the query data for the search object, which, in the preferred embodiment, includes criteria and one or more sources or root content folders on which the criteria are applied. Fields of the Search Object table, along with exemplary data, are shown in Table 6 below:

TABLE 6

SEARCH OBJECT TABLE

| SEARCH OBJ ID | SEARCH OBJ QUERY |
|---|---|
| 12875 | Binary Data Representing (sports and basketball) in source A |
| 13000 | Binary Data Representing (inline skating) in source B and source C |
| • | |
| • | |
| • | |

If it has been determined at decision state 854 that the search object is not new, the process 810 proceeds to a decision state 858 to determine if the search object is deleted. If so, process 810 moves to a state 860. At state 860 the entry for the search object is deleted in the Search Object/Context table and also in the Container table. State 860 is presently implemented by CBBXParser::Process-Magnet. If it is determined at decision state 858 that the search object is not deleted, the process 810 proceeds to a state 862 because the search object is modified, i.e., not new and not deleted. At state 862, process 810 updates the Search Object table to reflect the modified search object.

At the completion of either state 856, state 860 or state 862, process 810 moves to a state 864 wherein shortcuts are processed, i.e., the object that the shortcut links to is instantiated. A shortcut points to an object in the current title or content folder. This object could be a story, a search object, a picture and so forth. By processing the shortcuts at state 864, the process 810 will be able to add the information for a search object associated with the shortcut to the tables as defined in states 856, 860 or 862, as appropriate. State 864 is presently implemented by CBBXParser::ResolveShort-Cuts.

At the completion of state 864, process 810 moves to a decision state 866 and determines whether there are more search objects in the current section. If so, process 810 loops back to state 852 to access the next search object in the section. However, if there are no additional search objects in the current section, process 810 proceeds to a process content function 868 to process any content objects in the section. Function 868 is presently implemented by CBBX-Parser::ProcessObject. The process content function 868 will be described in conjunction with FIG. 16. At the completion of the process content function 868, process 810 proceeds to a decision state 870 to determine if there are additional sections in the title. If there are no additional sections in the title, process 810 moves to a done state 872. If there are additional sections in the title, process 810 loops back to state 844 to access the next section in the title.

Referring now to FIG. 16, the process content function 868, defined in FIG. 15, will now be described. Beginning at a start state 880, the process 810 moves to a state 882 to access the first content object in the section. Proceeding to a decision state 884, process 810 determines if the access content object exists in the Object Information table, previously described. If so, process 810 proceeds to state 886 and determines the existing objects partitions based on Routing table information. State 886 is presently implemented by CBBXIndexer::XIndexer::GetIndexCopies. Once the objects partitions have been determined, process 810 moves to state 888 and deletes the indexing information in the database servers 276 from the identified partitions. State 888 is presently implemented by CBBXIndexer::XIndexer::<Obj>Delete.

At the completion of state 888, or if the access content object does not exist in the Object Information table, as determined at decision state 884, process 810 moves to a state 890. At state 890, process 810 determines the partitions for the current content object based on the source and publish date using the Routing table. State 890 is presently implemented by CBBXIndexer::XIndexer::Add. Advancing to state 892, process 810 creates an entry in the Object Information table for the current content object. State 892 is presently implemented by CBBXParser::ProcessObject and CBBXIndexer::Add. Moving to state 894, process 810 creates index entries in the partitions located at the database servers 276 identified at state 890. State 894 is presently implemented by CBBXIndexer::XIndexer::Add. Continuing at a decision state 896, process 810 determines if there are any additional content objects in the current section. If so, process 810 loops to state 882 to access the next content object in the section. However, if there are no additional content objects in the current section, process 810 moves to state 898 and returns to the process title function 834 in FIG. 15.

The process root content folder function 832 is essentially the same as the process content function 868, described above. Thus, a further description of function 832 is not necessary.

VI. SEARCH OBJECT RESOLUTION

The process of resolving search objects at the IR system 398 (FIG. 5) is described in this section. The viewer search object flow 700 was previously described in conjunction with FIG. 11. This section describes the process at the IR server 272 (FIG. 3) and DB server 276 after the viewer 202 or designer 194 (FIG. 2) sends the search object query.

A. Resolving Search Object Flow

Figure 17:
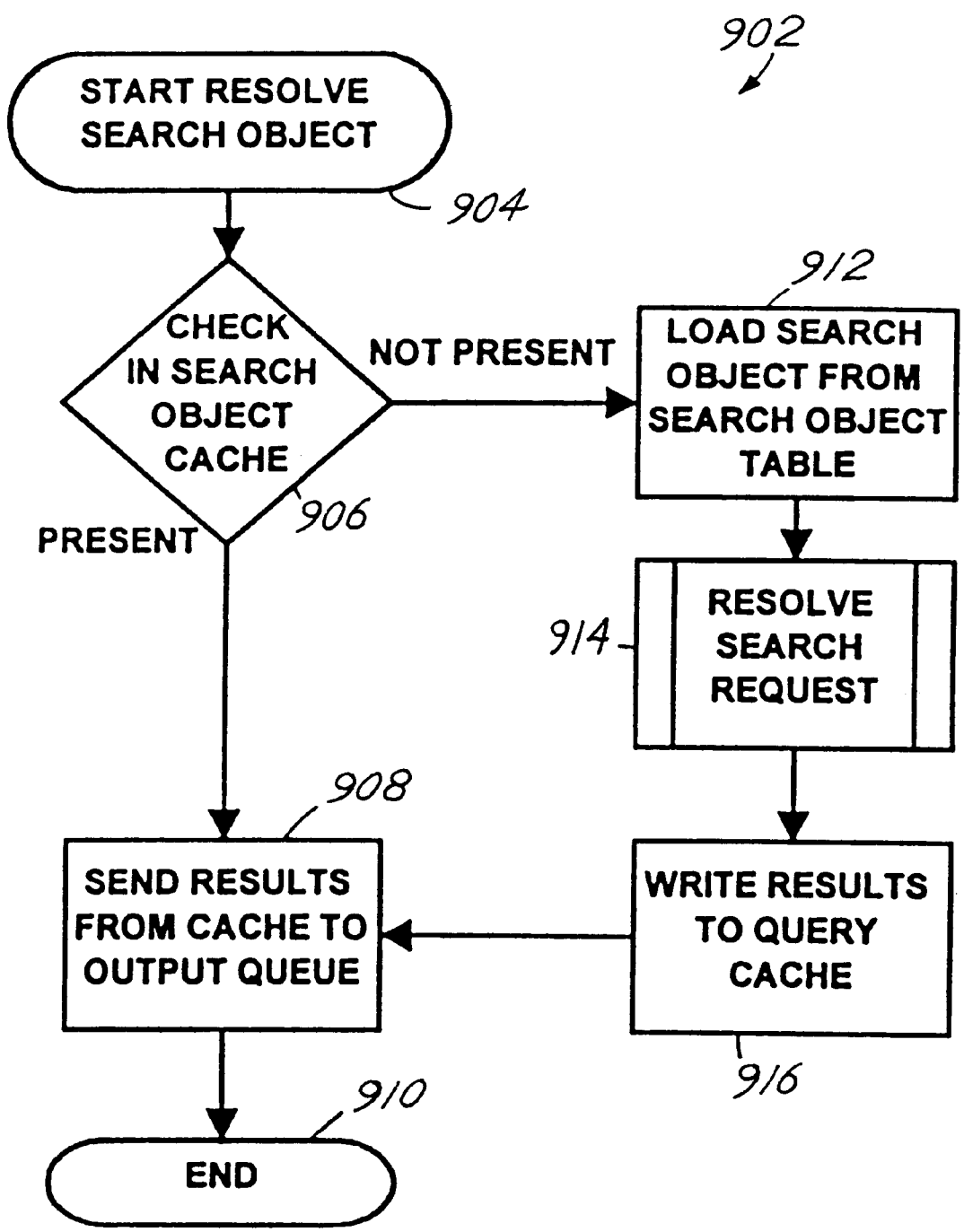
FIG. 17 is a flow diagram of the resolve search object process shown in FIG. 11.
Figure 18:
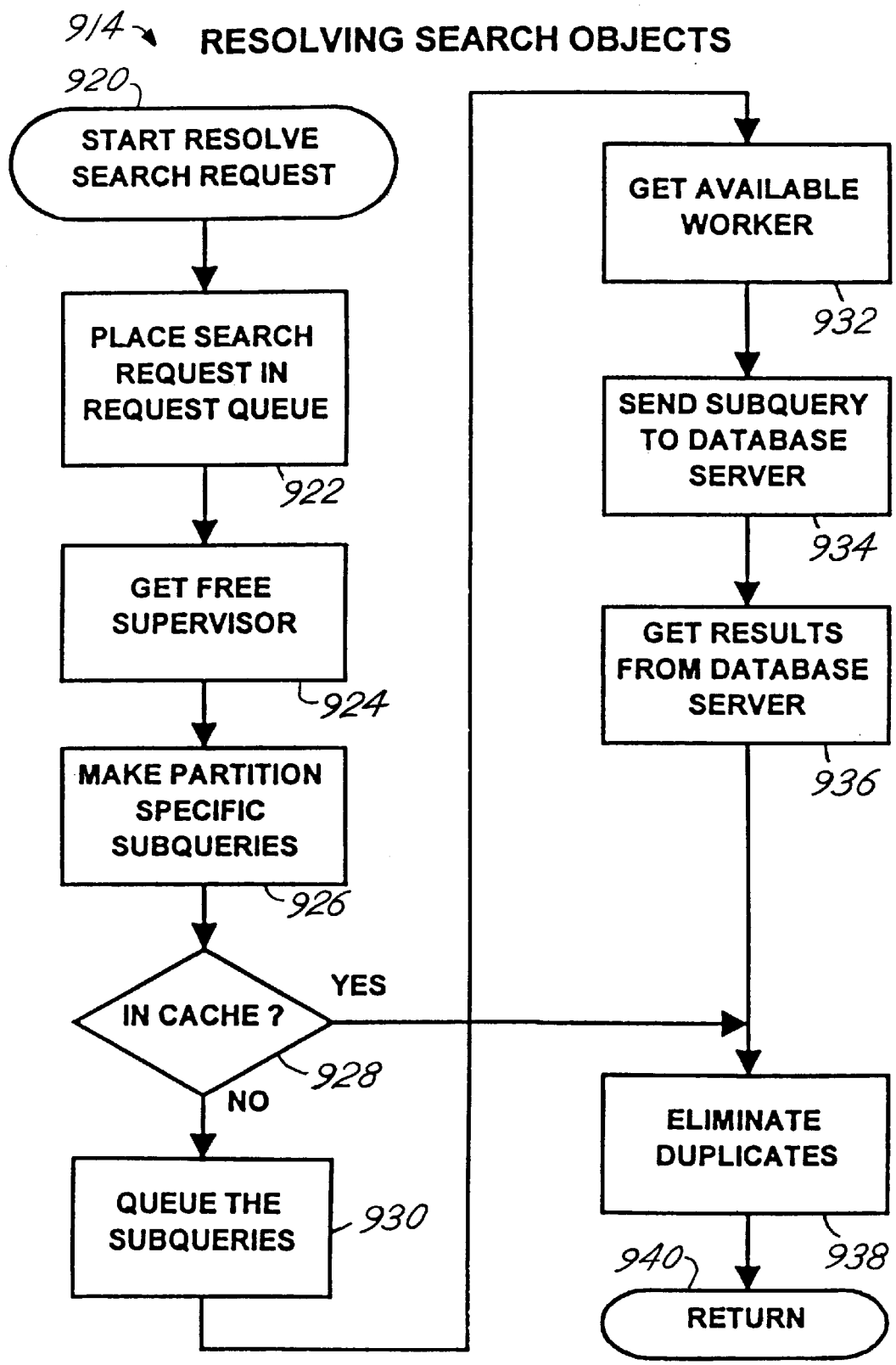
FIG. 18 is a flow diagram of the resolve search request function shown in FIG. 17.

Referring now to FIGS. 17 and 18, a process 902 for resolving search objects at the IR System 398 (FIG. 5) will now be described. Process 902 uses the IRSV DLL. Beginning at a start state 904 of FIG. 17, process 902 proceeds to a decision state 906 and determines whether the search object and the corresponding search object results are present in the query cache (also known as the search object cache) 1004 (FIG. 20). If it is determined that the search object and results are present in the query cache 1004, process 902 proceeds to state 908. At state 908, process 902 sends the results from the query cache 1004 to the output queue 1018 (FIG. 20). Process 902 completes at an end state 910. However, if the check of the query cache 1004 at decision state 906 reveals that the search object and results are not present or if the query is dirty, i.e., the query has been modified, process 902 advances to a state 912. At state 912, process 902 loads the search object from the Search Object table, previously described. Process 902 then moves to a resolve search request function 914. Function 914 is presently implemented by CBBIRServer::XBBIRServer::ExecuteQuery. Function 914 will be described in conjunction with FIG. 18 below. At the completion of the resolve search request function 914, process 902 continues to a state 916 wherein the search request results are written to the query cache 1004 (FIG. 20). Proceeding to state 908, the search request results are sent from the cache to the output queue, as previously described.

Referring now to FIG. 18, the resolve search request function 914 defined in FIG. 17 will now be described. Beginning at a start state 920, process 902 moves to a state 922 and places the search request in the request queue 1008 (FIG. 20). State 922 is presently implemented by CRequestManager::XRequestManager::AddRequest. Moving to state 924, process 902 gets a free supervisor 1014 (FIG. 20). Proceeding to state 926, process 902 makes partition specific subqueries based on the search object criteria and the one or more sources associated with the search object. State 926 is presently implemented by CSupervisor::ProcessRequest. Continuing at a decision state 928, process 902 determines if the partition specific subqueries (and the subquery results) identified at state 926 are in the query cache 1004 (FIG. 20). If all the subqueries are in the cache, as determined at decision state 928, process 902 proceeds to state 938 wherein any duplicates between the subqueries are eliminated. A situation where duplicates between the subqueries could exist is when a source exists across multiple partitions. After the completion of state 938, function 914 is complete and returns at a return state 940 to process 902 (FIG. 17).

Returning to decision state 928, for any of the partition specific subqueries (and results) that were not in the query cache 1004 (FIG. 20), the process 902 proceeds to state 930 to queue these subqueries. State 930 is presently implemented by CWorkUnitQueue::XWorkUnit-Queue::QueueRequest. Any partition specific subquery that is in the cache is not queued at state 930 but the results are saved for use at state 938. After the subqueries have been queued in a worker queue 1022 (FIG. 20) at state 930, process 902 continues at state 932. At state 932, process 902 gets available worker thread 1026 (FIG. 20). Proceeding to state 934, the worker thread 1026 sends the subquery to the database server 276 (FIGS. 3, 12, 20). States 934 and 936 are presently implemented by CWorker::ProcessCriteria. Continuing at state 936, process 902 obtains the results from the database server 276 and then continues to state 938 to eliminate any duplicates, as previously described. State 938 is presently implemented by CSupervisor::ProcessResults. Any specific subqueries (and results) that were determined to be in the cache at decision state 928 are also utilized in the elimination of duplicates at state 938.

B. Query Resolution Components

FIG. 20 shows the internal data structures and process threads utilized by the search server 780 shown in FIG. 12. The COS 246 provides title and content objects to an index service 1000. The index service 1000 creates and updates a catalog database 1002. The catalog database includes the following tables: Container table, Object Information table, Global State Registry, Search Object table, Context table, Source ID-to-Short Name Mapping table. The Container table, Object Information table, Search Object table, and Context table have been previously described above. The Global State Registry table is not germane to the IR system invention. The Source ID-to-Short Name Mapping table is used to map a 16-byte source GUID to a 4-byte unique number for generating partition names from their source ID. The fields of the Source ID-to-Short Name Mapping table are shown in Table 7 below:

TABLE 7

| SOURCE ID TO SHORT NAME MAPPING TABLE | |
|---|---|
| SOURCE ID | DWORD |
| GUID | DWORD |
| • | |
| • | |

Since the COS server 246 only provides new, modified or deleted objects to the index service 1000, the index service 1000 must invalidate a portion of the query cache 1004. Initially, the index server 1000 creates a Routing table 1006 which provides a database partition reference for a specific source ID. This information is provided by the database server 276, also shown in FIG. 12, after the index properties of the object and the GUID have been stored.

The database server 276 manages a number of database partitions 1 through N 782 as was shown in FIG. 12. If a source ID has already been associated with a partition, then the index service 1000 utilizes the Routing table 1006 to route indexes to the partition 782. The index service 1000 continues to write to the database server 276 to update the catalog database 1002 and write to the Routing table 1006 as new content and titles are released to the publication storage 120 (FIG. 1).

The IR service 270, shown in FIG. 12, provides a user query or search object query 1010 to a request queue 1008 in the search server 780 (FIG. 12). Each query in the request queue 1008 is read by a request manager 1012. The request manager 1012 assigns one of a pool of supervisor process threads 1014 to an individual query. Each supervisor thread 1014 includes a results collection function 1016. Results collection 1016 checks the query cache 1004 to determine whether results corresponding to the current query exist. Results located in the query cache 1004 are packetized and fed into an output queue 1018 containing results packets 1020. Results collection 1016 notifies the request manager 1012 of the new result packet and a result event is fed to the IR service 270 (FIG. 12). The IR service 270 (FIG. 12) then reads result packets from the output queue 1018.

For the case where the query cache 1004 does not contain the query, the supervisor 1014 partitions the query 1010 into a number of subqueries 1024. The subqueries are fed into a pool of workunit queues WQ1 to WQn 1022. Each workunit queue 1022 is associated with a physical database server. In effect, database queries are now queued for execution against database servers. A pool of worker threads 1026 service the workunit queues 1022. The worker thread 1026 checks the query cache 1004 to determine whether the subquery 1024 and its results exist. If they do, the results are posted to the results collection function 1016 in the supervisor thread 1014 and are fed to the output queue 1018 as discussed above. All available worker threads 1026 are used to service all available workunit queues 1022. This allows for efficient use of worker threads and efficient use of physical database server machines. As an optimization, whenever possible, subqueries that use the same type of index are merged and are sent to the same physical machine to form a single workunit. In an alternative embodiment, workunit queues could be associated with a partition of the indexed content.

The pool of worker threads 1026 and supervisor threads 1014 allow for load balancing and also extensibility. In an alternative design, where load balancing is less of a concern, the request manager supervisor threads and/or worker threads could be merged into a single process. For instance, a particular worker thread 1026 may operate in SQL native mode, Fulcrum native mode or any other database query language or search type.

The worker thread 1026 submits a subquery in a specific native mode and to a specific database server 276. The database server 276 accesses a specific database partition or partitions to satisfy the subquery. The query results are fed back to the worker thread 1026 from the database server 276 and the query and results are written together to the query cache 1004. The results are also posted to the results collection function 1016 of the supervisor 1014 which partitioned the original query into subqueries. The query results are then fed to output queue 1018 as discussed above.

The subqueries can be submitted by each supervisor 1014 to the worker queues 1022 either serially or in parallel. To provide a balanced resource allowance the supervisor 1014 will submit a subquery, wait for the results, and then submit another. However, if processing speed allows, e.g., there are few queries for the given server resources, then multiple subqueries may be submitted at the same time. Given subquery 1 and subquery 2, for instance, subquery 1 would be queued to one worker queue and subquery 2 would be queued to another.

VII. CUSTOMER QUERY RESOLUTION

The process of resolving a customer query at the IR system 398 (FIG. 5) is described in this section. The viewer user query (Find dialog) flow 700 was previously described in conjunction with FIG. 11. This section describes the process at the IR server 272 (FIG. 3) and DB server 276 after the viewer 202, designer 194 (FIG. 2), or Find dialog 690 (FIG. 10) sends the user query.

A. Resolving User Query Flow

Figure 19:
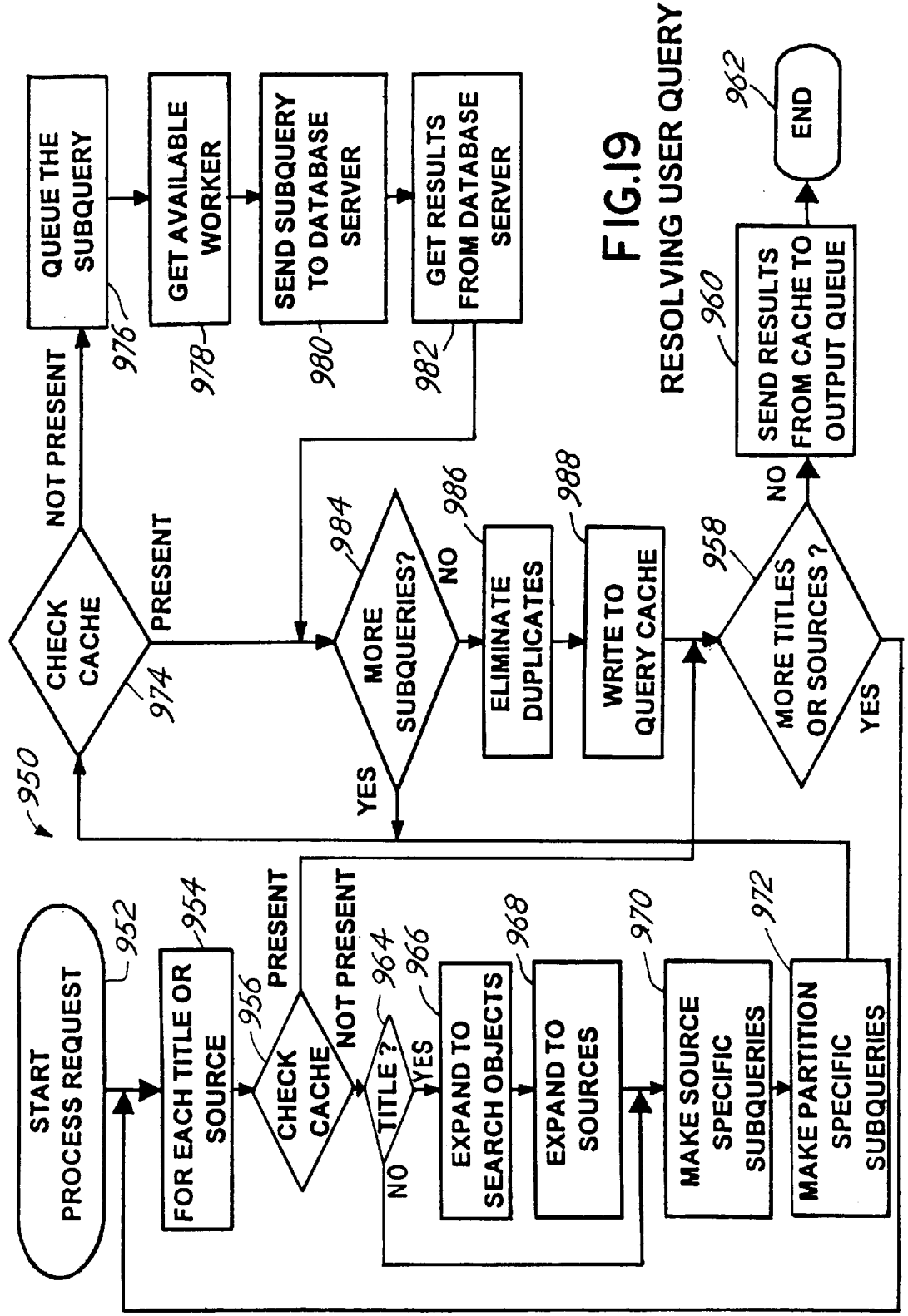
FIG. 19 is a flow diagram of the process request function shown in FIG. 18.

Referring now to FIG. 19, a resolving user query process 950 will now be described. Process 950 uses the IRSV DLL. Beginning at a start state 952, process 950 proceeds to state 954 to begin a loop for each title or source identified with the query, wherein a source in this context is a root content folder. Note that in the presently preferred embodiment, the publisher 102 in the designer environment 194 (FIG. 2) can specify and search both titles or root content folders, but the customer cannot specify and search root content folders. Proceeding to a decision state 956, process 950 determines whether the user query and query results for the current title or source are present in the query cache 1004 (FIG. 20). If the user query and results are present in the query cache 1004, process 950 proceeds to a decision state 958 to determine if there are additional titles or sources associated with the current user query. If there are more titles or sources associated with the current user query, process 950 loops back to state 954 to access the next title or source associated with the user query. However, if there are no additional titles or sources associated with the current user query, process 950 proceeds to state 960. At state 960, process 950 sends the query results from the query cache 1004 (FIG. 20) to the output queue 1018 (FIG. 20). At the completion of state 960, process 950 ends at an end state 962.

Returning to decision state 956, if it is determined that the present user query and results are not in the query cache 1004, process 950 proceeds to a decision state 964 to determine whether a title or a root content folder is currently being processed. If it is determined at decision state 964 that a title is currently being processed, process 950 proceeds to state 966 to expand to the search objects within the title. Process 950 accesses the Container table, previously described, to obtain the search objects contained within the title. From the Container table, the process 950 then accesses the Search Object table to obtain the search object query. Proceeding to state 968, the search object query is expanded to the sources contained therein. The search object contains a list of sources as a source specification. The criteria from the source objects is combined (by a boolean AND operation) with the user specified criteria and applied to the relevant sources in the source specification. States 966 and 968 are presently implemented by CSupervisor::ProcessTitle. At the completion of state 968 or if it was determined at decision state 964 that a source was currently being processed, process 950 moves to state 970. At state 970, process 950 creates source specific subqueries. Proceeding to state 972, the source specific subqueries are further refined by creating partition specific subqueries. In one presently preferred embodiment, this further refinement is done by utilizing the date of publication of the source. Another embodiment uses a different criteria. States 970 and 972 are presently implemented by CSupervisor::ProcessSources.

At the completion of state 972, process 950 proceeds to a decision state 974 and checks the query cache 1004 (FIG. 20) to determine if the first subquery and the corresponding subquery results are present. If the subquery and results are present, as determined at decision state 974, process 950 continues to a decision state 984 and determines if additional subqueries, generated at states 970 and 972, must be checked at decision state 974 to determine whether they are present in the query cache 1004.

If it is determined at decision state 974 that the current subquery is not present in the query cache 1004, process 950 continues at a state 976, wherein the current subquery is queued in a worker queue 1022 (FIG. 20). State 976 is presently implemented by CWorkUnitQueue::XWorkUnit-Queue::QueueRequest. Proceeding to a state 978, process 950 obtains an available worker thread 1026 (FIG. 20). Continuing at state 980, worker thread 1026 sends the current subquery to the database server 276. Moving to state 982, worker thread 1026 obtains the results from the database server 276. States 980 and 982 are presently implemented by CWorker::ProcessCriteria. At the completion of state 982, process 950 proceeds to decision state 984 to determine if there are additional subqueries for the current user query. If it is determined at decision state 984 that all subqueries for this current query have been resolved, process 950 proceeds to state 986 wherein all duplicate results from the subqueries are eliminated. State 986 is presently implemented by CSupervisor::ProcessResults(). Proceeding to state 988, the subqueries and the subquery results are written to the query cache 1004. At the completion of state 988, process 950 proceeds to decision state 958 to determine if there are any more titles or sources for the current user query that have not yet been processed, as previously described.

B. User Query Structures

FIG. 21 shows the internal structure of the search server 780, in an information retrieval environment, which is necessary to resolve a user query. A user query may be initiated by the viewer 202 or the designer 194, both of which are shown in FIGS. 2 and 12. In addition, the user query may be created through a separate find component 690. The user query is created on a customer or publisher computer 180, 182 (FIG. 2), for example. The IR client 435 and IR service 270 function as previously described in FIG. 12 to provide the software to communicate across the network between the client computer (e.g., 180, 182) and the IR servers. The user query is fed to the search server 780 which provides one or more subqueries to the database server 276 shown in FIG. 12. The database server 276 uses the indexes of the query to access tables such as the Property Keyword table 784 and Document Detail table 786 stored in a number of database partitions 782.

The database is segmented into partitions for efficiency. However, it does not have to be partitioned.

The user query is fed by the IR service to the search server 780 where the query is allocated to a supervisor 1014 such as the one shown in FIG. 20. If the user query refers to one or more titles, then the catalog database 1002 (FIG. 20) is accessed with reference to the tables shown. The Title/Section table 1030 and Section/Search Object ID table 768 are a part of the Container table in the catalog database 1002. The Title/Section table 1030 provides a list of all sections in the title and each section name is used to access the Section/Search Object ID table 768 to locate all search objects in a particular section. Each search object is then mapped to the search object query by the Search Object table 774. The user query is partitioned in the query partitioning function 1032. Each subquery is assigned to a worker thread 1026 as shown in FIG. 20.

The worker thread includes a translation function 1036 to translate a general form of the query into a server specific query. For instance, if the database server understands the SQL language then the user query, in a generalized form, is translated to SQL language. The server specific query is fed to the database server 276 by the worker thread 1026. The database server 276 accesses its specific tables using the indexes provided in the query and returns search results in the way of story identifiers and properties to the supervisor 1014. A map/filter function 1038 in the supervisor 1014 eliminates duplicates of search results. The search results are then packetized by a packetizer function 1040 and fed to the output queue 1018. The query results are passed out of the IR system to the client computer via the IR service 270 and IR client 435. Information (properties) about the retrieved stories such as title and date are presented to the source of the user query, i.e., the viewer, designer or client components.

It will be understood that the information retrieval system of the present invention is designed to handle a large number of queries in an on-line network. However, the invention does not depend on a particular architecture of threads, databases, tables, partitions, and so forth. What has been described is but one presently preferred embodiment.

C. User Ouery (Find Dialog) Interface

1. Overview

Figure 22:
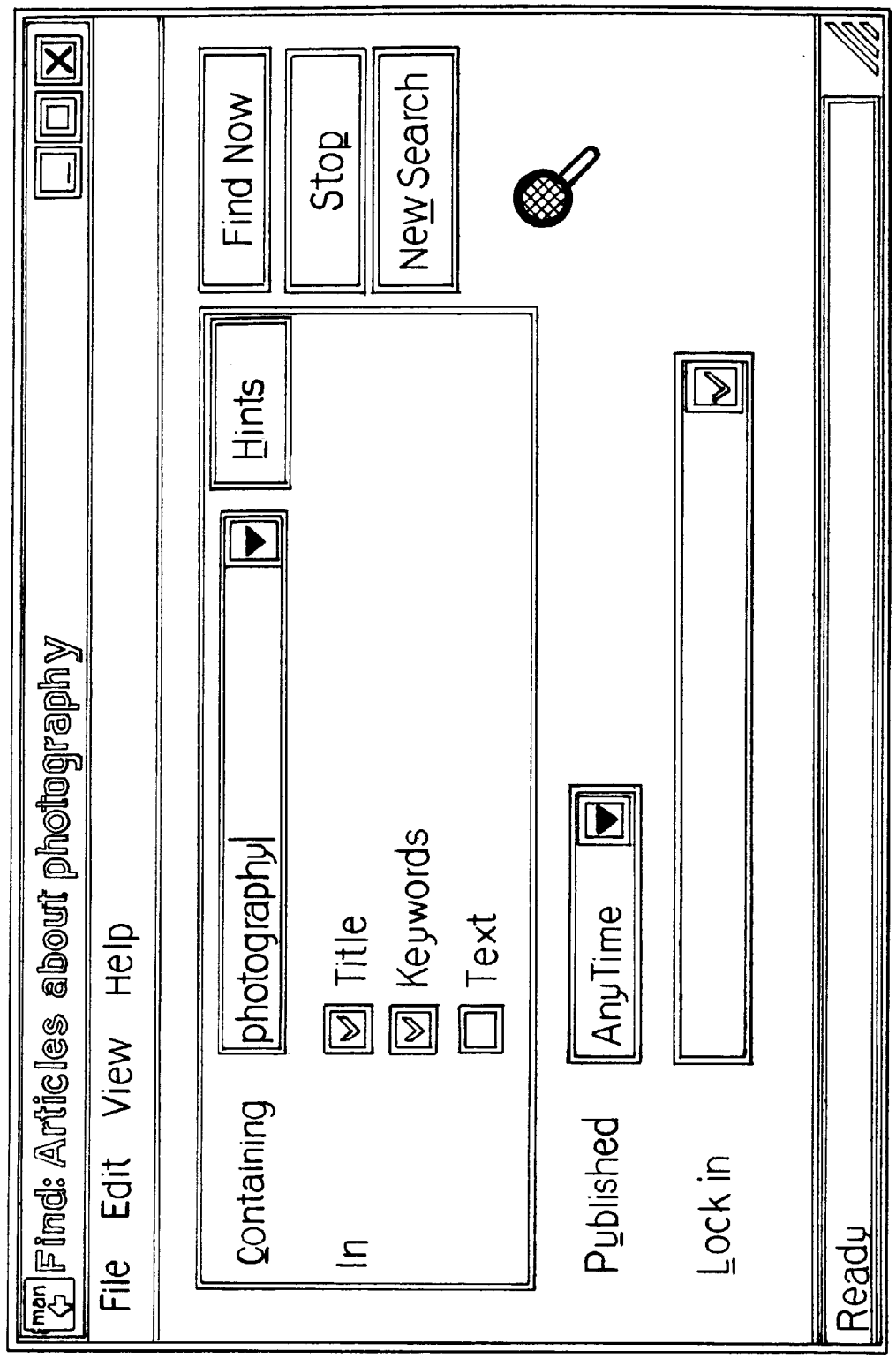
FIG. 22 is a diagram of an exemplary Find dialog screen display which is displayed by the viewer shown in FIG. 2.

Reference is made to FIG. 22. Users of MPS titles are able to search within title content for items that match a text expression. The search expression is matched against the text that authors have entered into a story's property fields using the MPS Document Editor's Properties dialog (see FIG. 24). An MPS search may be saved in a file for later use. The text search expression is generically applied across the standard property fields in the present Document Editor Properties dialog.

The primary tasks that the user may perform with the Find dialog (FIG. 22) include:

Current Title Find. One of the most common uses of this dialog is searching for a story within the current active title. Choosing the Find command from the Viewer launches the Find dialog with the field values defaulted to the title's choosing. The Look In field is set to the current title's name.

Multiple Title Find. The user may "redirect" a Find dialog to search over another single or multiple titles. Articles from the various titles are displayed together in the results list. Clicking on a result opens the story in the appropriate title.

Saving/Editing Searches. Searches may be saved into a file and reopened later to search again.

The Title designer controls branded appearance and navigation. To ensure that title publishers maintain control of their content and navigation, the Find dialog produces a list of hits (effectively shortcuts) into a title. Clicking a hit navigates the user to the story in the branded context of the title after which the user may navigate around the title as the title designer intends. The Find dialog provides a seamless experience of searching whether its for files on a hard disk, services on MSN, or articles within a newspaper.

2. Dialog Buttons and Fields

Containing. The user enters a boolean text search expression in this field. The user may also use the dropdown to select a past search string (the last five are maintained in the present embodiment). The text is then parsed and indexed so that the server side can use it. The parser behaves as follows:

Stop words are ignored. Stop words are words or strings that are ignored by the parser in terms of text which should be found. Note some of these may be interpreted as operators or list separators, so they are pulled out of the string before stop words are stripped out. In one preferred embodiment, the list of stop words in English is: a, an, the. Note this list may be longer or shorter in foreign languages, so the number of strings is not hard-coded.

All queries are case insensitive, even when quotes are used to literalize.

Divide expression into a list of individual terms. Special delimiters are the system-defined list separator character ("listsep" hereafter; assumed to be the comma in this description), and the operators AND and OR. If none of these are present in the entered term, then the list is assumed to be a phrase to be found. For example, 'cartoon music' in the Subject text box gets all places where both words appear together as the phrase, but not just one or the other. If spaces are not the only delimiters in the entered term, then the list of terms is populated based on the special delimiters. 'Foreign policy' and 'gold' would yield a two-term list. 'Larry, Moe, or Curly Sue' would yield a three-term list.

Quotes literalize otherwise delimiting characters or words. Either single or double quote marks can also be used to specifically delimit one word or more, so "foreign policy" gold would be the same as the first example, even though no other delimiter was used.

If OR appears in a keyword edit box, but AND never does, it is assumed all terms are ORed together, as in:

Larry, Moe, or Curly Sue==Larry OR Moe OR Curly Sue

If neither AND or OR appears, or AND appears somewhere in the edit box, any two terms that are not specifically ORed together are assumed to be ANDed. Any conjunctions which appear at the beginning or end of an edit box are discarded.

Symbols. The symbols & and | are interpreted as equivalents to AND and OR respectively.

Order of Operations. Once the boolean logic is resolved, it is inconsequential what order these terms are parsed in.

In. The user may select which portions of the article are to be searched for the expression by checking any of the three checkboxes: Title, Keywords, and Text (body of article). All three choices are checked by default. The corresponding portion of the article's Properties field(s) that is searched is detailed below:

for Title—Title field;

for Keywords—Topic, Place, Author, Person, Organization, Date of Event, Priority; and for Text—Whole text body of the article.

Published. As stories are received at the MSN data center, they are stamped with the Greenwich Mean Time (GMT) time of their arrival. The publisher can specify the publish date and time as a property to the story before publishing. The user may limit the articles retrieved by the Find dialog to those published on a given day or within a range of time. The time range specified by the Find query is normalized at the client to GMT before sending it to the IR server (using the computer clock and local time zone from Win95) so that the time comparison is always done in GMT.

The alphabetized options on the "Published" dropdown control include After, Anytime (default), Before, Between, In the last, and On. Anytime puts no publication date restriction on the articles to be retrieved. The On, After, and Before choices are accompanied by a single date field to the right which displays the current date by default. The date field displays a three character abbreviated day of the week and a MM/DD/YY formatted date. The day of the week, MM, DD, and YY are selectable fields that may be edited via input from the keyboard, arrow up/down, and the spin buttons on the right of the date field. Pressing an alpha key when the day of the week is selected will cycle the day value to the next match (i.e. pressing 'S' will change the value to 'Sun', pressing 'S' again will change it to 'Sat', and so forth). The day of the week and MM/DD/YY track each other when either is changed. As the user switches between any of the options that include the datefield to the right of the option dropdown, the date value does not change.

The user may specify an arbitrary range of time using the "Between" option. This option inserts a new line into the dialog box, shifting the controls down and lengthening the dialog box as necessary. There is no restriction on the order of the dates—either field can be the starting or ending date. By default, the second date (to the right of the "And" caption) displays the same date as the first line.

The "In the last" option produces a two-digit numeric spin control and units dropdown control to the right. This option allows the that to request articles that have been published during the last number (0–99) of hours, days, weeks, or years. When the user chooses "In the last", the default value and unit is "1 week(s)". The units day, week, month, and year are multiplied in to their respective number of hours for evaluation.

> Look In. The user may browse the MSN hierarchy and make a single or multiple discontiguous selection of titles or folders. A concatenation of the selected items names are presented in the dropdown field, abbreviating the list with '. . .' when necessary. The dropdown includes the five most recently used "Look In" values followed by the "More . . ." option which launches an MSN browser. The function of the Look In field is to constrain the scope of the search to within a single title or set of titles. Looking in a parent folder of titles will search all the enclosed titles (transitive-closure assumed).
>
> More . . . The MSN content tree as rendered by the Explorer is presented in a browse dialog for the user to select a single or multiple titles to search within. The tree is purged of all other services but MPS titles to restrict the user's choice.

The hierarchical control allows expansion and collapsing of the hierarchy and single selection of individual titles or folders of titles. When the dialog is closed, the name of the selection appears back in the "Look In" dropdown. A single node in the tree may be chosen; multiple discontiguous selection is not available.

> Find Now. This command actually performs the search of the entered criteria over the titles(s) specified in the Look In field. Find Now is the default button upon entering the dialog so after the user has entered a search expression, s/he presses return to initiate the search. The Find Now button deactivates and a magnifying glass icon animates while the search is being performed.

During the search, intermediate results are presented as they are found, incrementing the item count in the status line. The results are passed to the client asynchronously, so the results are filled in on the fly. Clicking the Stop button halts any further results from being sent to the client, but any hits already made stay in the results pane.

After the search has been completed (or the user has pressed Stop) the Stop button is disabled and the Find Now is re-enabled and becomes the default. The status bar reflects the number of matches found. If the user stopped the search, the status bar reads: "n item(s) found", where n is greater than or equal to 0. If the search completely naturally, it reads: "Finished: n item(s) found".

If the search completed normally (not interrupted), the user's system beeps, using the default beep sound.

> Stop. Stop is only active while the search is in progress. This button terminates the search immediately.
>
> New Search. To allow the user to start a fresh search, this command returns the contents of the "Containing", "In", and "Published" fields to their default values when the dialog was launched. The other fields are not affected.

3. Edit Menu Some of the Edit menu commands and descriptions are as follows:

> Select All—Selects all the items in the result list;
>
> Invert Selection—Inverts the selection set of the result list; and
>
> Remove from List—Removes selected item(s) from the results list.

4. View Menu Some of the View menu commands and descriptions are as follows:

> Arrange Icons—by Name, by Source, by Date (Sorts the result by checked property)
>
> Unopened Items Only—When checked the result list displays only unopened items 5. Results Pane Operations—some of the actions are as follows:

> Sorting. When in Details view, the column headers are pressable buttons, like in an Explorer window. Pressing a column header once sorts that column in ascending order. Clicking on a column already sorted in ascending order re-sorts it in descending order. In this way, the user can toggle their sort order with just regular mouse clicks. There is no feedback in the user interface, other than the sorted items themselves. The column headers are as follows:
>
> small icon—The small version of the source title's custom icon
>
> Title—The name of the item (i.e., article)
>
> Source—Name of MPS Title that contains item
>
> Published—The date and time of day when the item was published.
>
> Context Menus. Right-clicking a selection yields the following context menu. The commands on this menu apply to the whole selection. The commands perform the exact same operation as their equivalents in the dropdown menus.
>
> Open—Opens the selected item in its respective title (single selection only).
>
> Create Shortcut—Create a shortcut to the title of the selected stories on the Desktop.
>
> Print—Prints the selected result item(s).
>
> Open. Available only when a single result is selected, this command will launch the title which contains the selected item and page it to the section that contains the item. The following strategy is used to launch the title.
>
> 1) If the hit is within the current title (i.e., the title that launched the Find dialog), the current title advances to the section that holds the hit.
>
> 2) If the hit lives in a title which isn't the current title, then
>
> a) If the title is currently open in an existing viewer, that viewer advances to the hit.
>
> b) If the title is not open, a new MPS viewer is launched and advances to the hit.

6. Special User Notifications

Special notification if the Find returned no matches. While staying in the background if already there, Find puts up the following alert, so the user knows what happened: "No articles like you described could be found. You can try to find more articles by clearing some of the values in the Find window and then pressing the Find Now button again."

The "New Search" button returns all controls in the dialog back to their original state when the dialog opened. This can either be the default values, or those that were passed in by the application which opened the Find window. To be sure of the user's intent, they are alerted before their search definition is cleared.

There is a maximum number of hits and time allowed with any one query. These maximums are set in a registry key on the server side; since this number directly affects performance, this number is set to be no higher than the maximum load that is anticipated. The initial maximum is 500 hits. When the user's query exceeds either of these limits, the results pane is filled with the first hits found (which may or may not be the most relevant), and the user is alerted that they may be missing some results with an alert such as the following: "There were too many matches to show them all. You can try to reduce the number of matches by adding more specific values to the edit boxes and then pressing the Find Now button again."

7. Saving Find Queries

Performing a Find one time is clearly a great way to browse the content and services the MP system provides. By saving searches and their results on the user's hard drive, the power of integration with the desktop is extended. In effect, users can generate folders which just have content they are interested in. Users can save these queries and rename them via the Win95 shell to names like "Current Events in Bosnia."

When a user chooses the File Save Search command, the query they have defined is saved in a file which is created on their desktop. A one-time notification dialog tells the user where the icon has been created.

The saved file has the extension BBF and is named after the following template: MSN Find #n <title-bar-desc>. In the saved name, n is the highest integer (at least one) which is needed to make the name unique. <Title-bar-desc> is the text after the colon in the title bar. In this case, the user will just about always be able to have a legitimate file name created. The only other things which would make the save fail would be cases like the hard disk being full. In the case there is a problem saving the BBF file, the following alert is displayed: "Your search could not be saved on the desktop. Make sure your hard disk is not full and that there is nothing preventing you from creating a file on the desktop."

When the BBF file is reopened, the state of the dialog (including results, if the "Save Results" option was checked in the Options menu at the time saving) is restored exactly as before, including sizing and positioning. The query is not automatically re-run since the user may simply want to continue reading the old results list. Pressing "Find Now" will run the query with the latest information at that time and recompose the results list.

When the user clicks on a result, it will launch the MPS Viewer with the containing title. If the item is no longer accessible by the title (i.e., the item is no longer in the content database), the viewer issues an appropriate message.

VIII. CONCLUSION

This section summarizes benefits provided by the present invention. Separating the content and design in the MP system enables sending or distributing stylized high-quality publications over low-speed communications links. An information retrieval (IR) server indexes and searches stories in titles. Indexing takes place when a title is released to the network by a publisher workstation. Title property indexing as well as full text indexing of the content of the title are performed. The IR search service may be requested in two different ways by the title viewer at the customer workstation. First, a search is requested for each dynamic control in a title. It is associated with stories retrieved on the basis of a search query defined by the publisher using the search object editor. Second, a search can be initiated by a customer who uses the "Find" dialog to search across all stories in a title, both dynamic and static. The Find dialog can also be used to redirect the search over another single title, multiple titles or folders of titles.

Although the invention has been described with reference to specific embodiments, the description is intended to be illustrative of the invention and is not intended to be limiting. Various modifications and applications may occur to those skilled in the art without departing from the true spirit and scope of the invention as defined in the appended claims.

What is claimed is:

1. A method of computerized searching, comprising the steps of:

storing a plurality of content information of a document in a publication storage device;

publishing a layout of a title of said content information, wherein the layout of said title of said content information is associated with a control, and wherein the control defines a region on a computer display device for displaying results of a query of said content information;

retrieving content information satisfying said query from the publication storage device; and displaying the retrieved content information.

2. The method defined in claim 1, wherein the query is capable of being modified by a user.

3. The method defined in claim 1 wherein the title comprises a plurality of sections of information, and wherein each section.

4. The method defined in claim 1, wherein the publication storage comprises a network server.

5. The method defined in claim 1, wherein the retrieved content information comprises a plurality of stories.

6. The method defined in claim 5, wherein the stories are displayed on a display device.

7. The method defined in claim 1, wherein the title includes a plurality of data layout sections.

8. The method defined in claim 5 additionally comprising the step of navigating to a selected story.

9. A computerized information retrieval system, comprising:

a publication storage, comprising:
   a content storage,
   an indexer for indexing the content, and
   a searcher for satisfying queries on the indexes;

a designer component providing a title with one or more search objects, wherein each search object defines a query; and a viewer accessing the title and causing the search objects to retrieve content to be displayed.

10. The system defined in claim 9, wherein the search object queries are modified by a user find query.

11. The system defined in claim 10, wherein the find query results are incrementally received by the viewer.

12. The system defined in claim 10, wherein the find query results are displayed to a customer thereby facilitating further navigation.

13. The system defined in claim 12, wherein the content includes stories, and wherein each story includes properties.

14. The system defined in claim 13, wherein story properties are displayed.

15. The system defined in claim 9, wherein the viewer executes on a customer computer.

16. The system defined in claim 9, additionally comprising a query cache, wherein the search objects and the retrieved content are stored in the query cache.

17. The system defined in claim 16, wherein the searcher first checks the query cache to determine if a same prior query has been made.

18. The system defined in claim 9, wherein each search object comprises a criteria and at least one source.

19. The system defined in claim 18, wherein each search object query is separated into subqueries.

20. The system defined in claim 19, wherein one of the subqueries comprises the criteria and a selected one source.

21. The system defined in claim 19, wherein the indexer produces database indexes partitioned according to sources and date of publication.

22. The system defined in claim 21, wherein each one of the subqueries is specific to a database partition.

23. The system defined in claim 22, additionally including a plurality of workers, each worker receiving subqueries specific to a database partition.

24. The system defined in claim 23, wherein the subqueries are serially assigned to the workers.

25. The system defined in claim 23, wherein the subqueries are assigned in parallel to the workers.

26. The system defined in 21, additionally including a plurality of workers, each worker receiving subqueries specific to a database server.

27. In a computer network, an indexing system of a title, the system comprising:
    an index server receiving a title having layout and content, wherein said title layout includes search objects, each of said title layout, content and search objects having an associated object identifier, and said content having search properties;
    a catalog database containing tables associating object identifiers with other information including search properties;
    an index service executing on the index server and accessing the catalog database; and
    a database server storing index associations between the search properties and object identifiers provided by the index service.

28. The system defined in claim 27, additionally comprising a cache receiving data from the index service and the database server.

29. The system defined in claim 27, additionally comprising a routing table accessed by the index service.

30. The system defined in claim 27, wherein the routing table is created by the index service.

31. The system defined in claim 27, wherein the database server comprises a plurality of database partitions.

32. The system defined in claim 31, wherein each database partition is characterized by a source and a publication date.

33. The system defined in claim 27, wherein the catalog database includes a container table.

34. The system defined in claim 27, wherein the catalog database includes a object information table.

35. The system defined in claim 27, wherein the catalog database includes a search object table.

36. The system defined in claim 27, wherein the catalog database includes a context table.

37. A computer-implemented method of searching a title, comprising the steps of:
    publishing a title comprising separate content and layout to a publication storage, wherein the layout includes at least one search object;
    creating a user query which modifies the search object; and
    retrieving content from the publication storage satisfying the user query.

38. The method defined in claim 37, additionally comprising the step of displaying results of the query to the user.

39. The method defined in claim 38, wherein the query results are displayed in a results pane on a visual display.

40. The method defined in claim 37, additionally comprising the step of indexing the content.

41. The method defined in claim 40, wherein the indexing step includes determining partitions based on a source and publish date.

42. The method defined in claim 37, wherein the user query includes a source.

43. The method defined in claim 37, wherein the user query includes a criteria.

44. The method defined in claim 37, wherein the retrieving step includes selecting a portion of the content on which the query is to be performed.

45. The method defined in claim 44, wherein the content portion is defined by one or more of the following: title, keywords and text.

46. A method of computerized searching, comprising the steps of:
    publishing a title to a publication storage containing content, wherein the title comprises separate content and layout, and wherein the layout includes a search query;
    retrieving content satisfying the search query from the publication storage; and
    displaying the retrieved content.

47. The method defined in claim 46, wherein the search query is modified by a user find query.

48. The method defined in claim 46, wherein the title comprises a plurality of sections, and wherein each section has at least one control.

49. The method defined in claim 46, wherein the title comprises a publication.

50. The method defined in claim 46, wherein the title comprises a service.

51. The method defined in claim 46, wherein the title comprises an application.

52. The method defined in claim 46, wherein the publication storage comprises a network server.

53. The method defined in claim 46, wherein the publication storage comprises a portion of the Internet.

54. The method defined in claim 46, wherein the retrieving step occurs while the title is being displayed.

55. A computerized method of electronic publication, comprising the steps of:
    creating within a computer a representation of a title of a story;
    storing the representation of the title in a publication storage device; and
    displaying the representation of the title, wherein the computer retrieves story content from the publication storage.

56. The method of claim 55, wherein the retrieved story content is displayed with the story title.

57. The method of claim 55, additionally comprising the step of storing story content in the publication storage device.

58. The method of claim 57, wherein the story content storing occurs before the title storing.

59. The method of claim 57, wherein the title storing occurs before the content storing.

60. The method of claim 55, wherein a story search query is modified during the displaying step.

61. The method of claim 60, wherein the search query is limited by one or more tagged fields.

62. The method of claim 55, wherein the search query comprises a search criteria and at least one source.

63. In a computer network, a search system, comprising:
- a search object server for storing the location of search objects in a title and search queries associated with the search objects;
- a search server for decomposing the search queries into a plurality of subqueries; and
- a database server for receiving subqueries from the search server and providing object identifiers responsive to each subquery.

64. A computer-implemented method of searching a title using a search query, comprising the steps of:
- storing content in a publication storage;
- checking a search cache for the search query and results representative of content identification;
- retrieving the results of the search query from the search cache if the search query is present in the search cache;
- creating one or more subqueries based on the search query;
- checking the search cache for the presence of one of the subqueries and a result of the subquery if the search query is not present in the search cache;
- retrieving the results of the subquery from the search cache if the subquery is present in the search cache;
- applying the subquery to a database server;
- retrieving the results of the subquery from the database server if the subquery is not present in the search cache; and
- retrieving content from the publication storage corresponding to the retrieved results.

65. In a computer network, an information retrieval system, comprising:
- a publication storage, comprising:
  - a story storage,
  - an indexer for indexing the stored stories, and
  - a searcher for satisfying queries on the indexes;
- a designer providing a title with one or more search objects, wherein each search object defines a query; and
- a viewer accessing the title and causing the search objects to retrieve stories to be displayed.

* * * * *

UNITED STATES PATENT AND TRADEMARK OFFICE
CERTIFICATE OF CORRECTION

PATENT NO. : 5,907,837
DATED : May 25, 1999
INVENTOR(S) : Patrick J. FERREL et al.

It is certified that error appears in the above-indentified patent and that said Letters Patent is hereby corrected as shown below:

Column 35, line 20, delete "Ouery" and insert --Query--.
Column 36, line 61, delete "OUERY" and insert --QUERY--.
Column 38, line 23, delete "Ouery" and insert --Query--.
Column 39, line 15, delete "Ouery" and insert --Query--.

Signed and Sealed this

Twenty-sixth Day of October, 1999

Attest:

Q. TODD DICKINSON

*Attesting Officer*    *Acting Commissioner of Patents and Trademarks*